(12) United States Patent
    Aubin-Marchand et al.

(10) Patent No.:  US 12,673,736 B2
(45) Date of Patent:  Jul. 7, 2026

(54) MULTI-FEATURE TRACK SYSTEM WITH ENHANCED PERFORMANCE

(71) Applicant: SOUCY INTERNATIONAL INC., Drummondville (CA)

(72) Inventors: Jeremie Aubin-Marchand, St-Hugues (CA); Yan Roger, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 1032 days.

(21) Appl. No.: 17/575,478

(22) Filed: Jan. 13, 2022

(65) Prior Publication Data

US 2022/0219769 A1      Jul. 14, 2022

Related U.S. Application Data

(60) Provisional application No. 63/275,668, filed on Nov. 4, 2021, provisional application No. 63/136,796, filed on Jan. 13, 2021.

(51) Int. Cl.
    B62D 55/04       (2006.01)
    B62D 55/084      (2006.01)
    B62D 55/15       (2006.01)
(52) U.S. Cl.
    CPC ......... B62D 55/04 (2013.01); B62D 55/0845 (2013.01); B62D 55/15 (2013.01)
(58) Field of Classification Search
    CPC ..... B62D 55/04; B62D 55/0845; B62D 55/15
    See application file for complete search history.

(56) References Cited

U.S. PATENT DOCUMENTS

| | | | | |
|---|---|---|---|---|
| 3,912,336 | A * | 10/1975 | Ritter, Jr. ........... | B62D 55/0845 |
| | | | | 74/609 |
| 3,913,985 | A * | 10/1975 | Orr .................... | B62D 55/0845 |
| | | | | 180/9.62 |
| 6,299,264 | B1 * | 10/2001 | Kautsch ................. | B62D 55/15 |
| | | | | 305/193 |
| 7,438,367 | B2 * | 10/2008 | Allsop ................... | B60B 7/002 |
| | | | | 301/108.1 |
| 7,946,661 | B1 * | 5/2011 | Freeman ............ | B62D 55/0885 |
| | | | | 305/110 |
| 8,616,779 | B2 * | 12/2013 | Liu ..................... | B60B 27/0073 |
| | | | | 384/544 |
| RE45,491 | E * | 4/2015 | Freeman ............ | B62D 55/0885 |
| | | | | 305/110 |
| 9,656,705 | B2 * | 5/2017 | Kalmes ................. | B62D 55/15 |
| 11,667,340 | B2 * | 6/2023 | Suanno ................. | B62D 55/15 |
| | | | | 305/100 |
| 2004/0160115 | A1 * | 8/2004 | Allsop ..................... | B60B 7/08 |
| | | | | 301/108.1 |
| 2021/0276637 | A1 * | 9/2021 | Suanno ................. | B62D 55/14 |

* cited by examiner

*Primary Examiner* — Valentin Neacsu
*Assistant Examiner* — Michael R Stabley
(74) *Attorney, Agent, or Firm* — BCF LLP

(57) ABSTRACT

The present technology generally relates to multi-feature track systems exhibiting enhanced performance, vehicles having track systems, rear track system configurations, support structures for track systems, tensioners for track systems, wheels and wheel assemblies for track systems, seal assemblies, protective cover assemblies, mounting attachments for track systems and endless tracks for track systems.

5 Claims, 39 Drawing Sheets

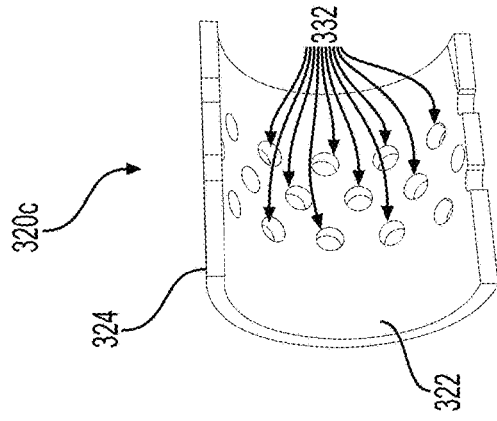
*FIG. 14B*
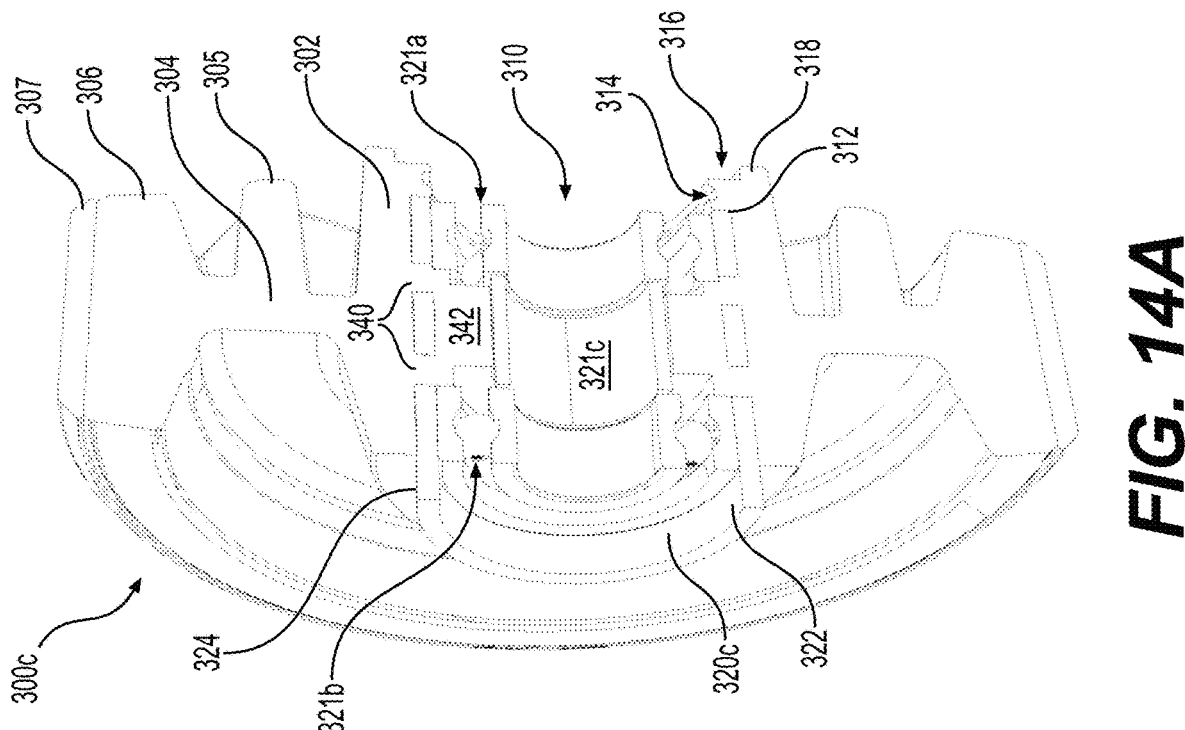
*FIG. 14A*

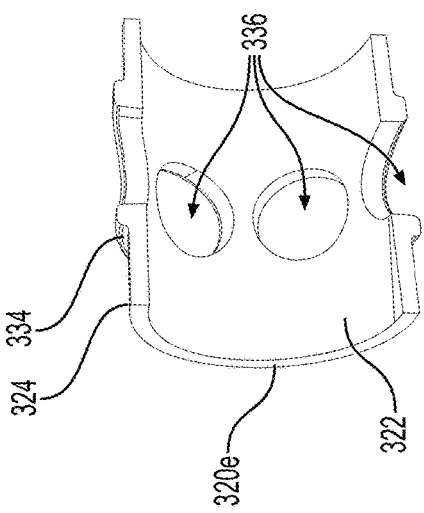
FIG. 16B
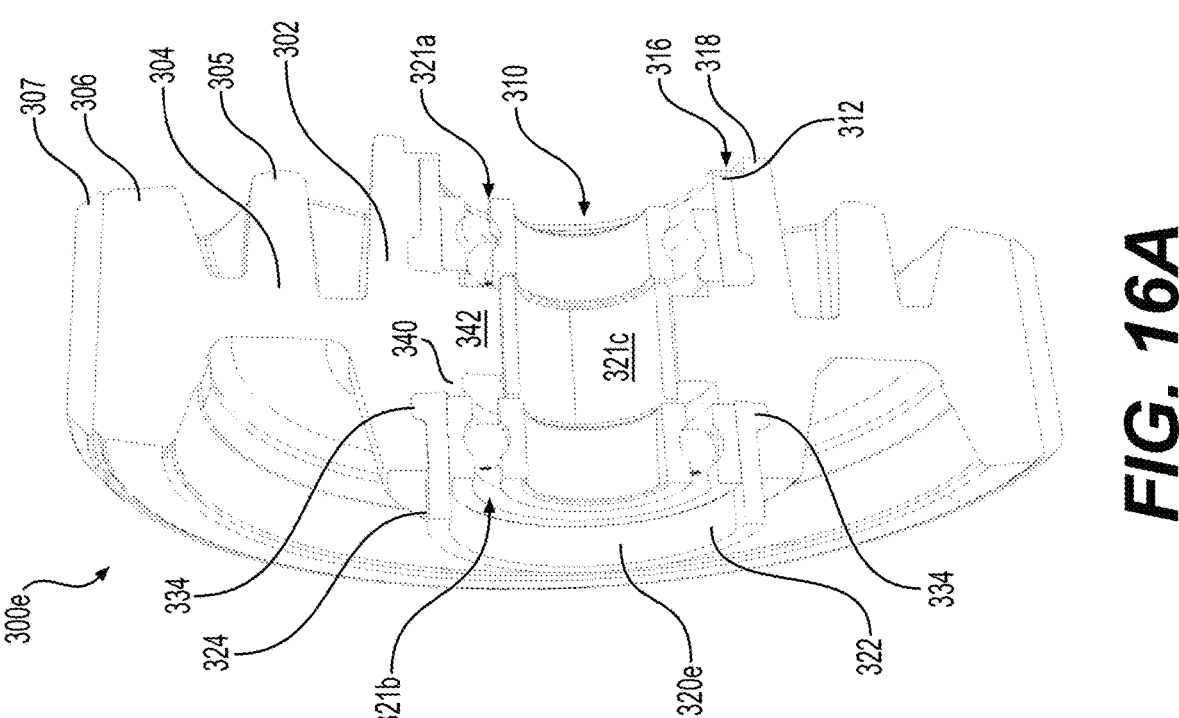
FIG. 16A

FIG. 29 *(PRIOR ART)*

MULTI-FEATURE TRACK SYSTEM WITH ENHANCED PERFORMANCE

REFERENCE TO RELATED APPLICATION

The present application claims priority to U.S. Provisional Patent Application 63/136,796, filed on Jan. 13, 2021; and to U.S. Provisional Patent Application 63/275,668, filed on Nov. 4, 2021, the content of both of which is incorporated herein by reference.

TECHNICAL FIELD

The present technology relates to track systems, vehicles having track systems, rear track system configurations, support structures for track systems, tensioners for track systems, wheels and wheel assemblies for track systems, seal assemblies, protective cover assemblies, mounting attachments for track systems and endless tracks for track systems.

BACKGROUND

Certain off-road vehicles, such as all-terrain vehicles (ATVs and UTVs), may be equipped with track systems which enhance their traction and floatation on soft, slippery and/or irregular grounds (e.g., soil, mud, sand, ice, snow, etc.) on which they operate. Track systems typically provides a larger contact area (patch) on the ground compared to the size of the contact area (patch) of a wheel on the ground. Floatation over soft, slippery and/or irregular ground surfaces is increased and the lower portion of the vehicle is maintained at a greater distance from the ground surface.

Track systems, due to the loads they bear and the conditions under which they are used may require maintenance operations and can require replacement of some parts, such as support wheel assemblies. These maintenance operations can be long, can occur often and can be expensive. Not performing these maintenance operations can reduce lifespan of other components of the track system. Furthermore, replacement of parts of the track can be expensive.

In order to reduce the aforementioned drawbacks, there is a desire for a track system and parts thereof that can, inter alia, reduce maintenance operations and enhance lifespan of various parts of the track system.

SUMMARY

It is an object of the present technology to ameliorate at least some of the inconveniences present in the prior art.

According to one aspect of the present technology, there is provided a protective cover assembly connectable to a wheel of a track system, where the wheel has a hub defining a hub aperture. The protective cover assembly includes an outer cap for obstructing the hub aperture, and a sealing member configured to sealingly connect the outer cap and to the wheel.

In some embodiments, the track system is a track system of an off-road vehicle.

In some embodiments, the protective cover assembly is removably connectable to the wheel of the track system.

In some embodiments, the outer cap includes a flange configured to obstruct the hub aperture, and a connecting portion extending from the flange. The connecting portion is configured to be at least partially received in the hub aperture.

In some embodiments, the connecting portion has a first connector, the hub has a second connector selectively connectable to the first connector, and connection of the first and second connectors secures the outer cap relative to the hub.

In some embodiments, the outer cap is configured to be screwed to the hub.

In some embodiments, the outer cap is configured to connect to the hub by a snap-fit configuration.

In some embodiments, the protective cover assembly further includes a retaining member configured to be received in the hub aperture. The retaining member retains the outer cap and the sealing member in the hub aperture.

In some embodiments, the wheel is one of a drive wheel, a support wheel and an idler wheel.

According to another aspect of the present technology, there is provided a wheel assembly for a track system. The wheel assembly includes a wheel, a sleeve and at least one bearing. The wheel has a hub defining a hub aperture, a body extending radially outwardly from the hub, and a rim extending radially outwardly from the body. The sleeve is disposed within the hub aperture and engages a radially inner surface of the hub. The sleeve extends along at least a portion of the hub aperture, and defines a sleeve aperture. The at least one bearing is received within the sleeve aperture.

In some embodiments, the at least one bearing is configured to connect to an axle.

In some embodiments, the hub is molded around the sleeve.

In some embodiments, the hub is made of a first material, the sleeve is made of a second material, and the second material is more rigid than the first material.

In some embodiments, the sleeve defines a plurality of apertures.

In some embodiments, the hub has a plurality of protrusions configured to be received in the plurality of apertures.

In some embodiments, the protrusions merge to form a radially extending portion.

In some embodiments, the at least one bearing defines a radial bearing surface area, the sleeve defines a radial sleeve surface area, and the radial sleeve surface area is at least about 1.25 times greater than the radial bearing surface area.

According to another aspect of the present technology, there is provided a seal assembly operationally connected to a wheel of a track system. The wheel has a hub defining a hub aperture. The seal assembly includes a sealing cap, a first seal and a second seal. The sealing cap defines a sealing cap aperture configured to receive an axle therethrough. The sealing cap also defines a sealing cap recess. The first seal is disposed in the sealing cap recess, and has a first side engageable to the wheel and a second side engageable the sealing cap. The second seal is disposed radially inwardly of the first seal, and has a third side engageable to the sealing cap and a fourth side.

In some embodiments, the seal assembly further including a third seal surrounding the aperture of the sealing cap.

In some embodiments, the third seal is an adhesive.

In some embodiments, the first seal has at least one lip extending from the second side of the first seal.

In some embodiments, the at least one lip is three lips.

In some embodiments, the sealing cap has a recessed section defining the sealing cap aperture, an intermediate section extending radially from the recessed section, and a surrounding section extending radially from the intermediate section.

According to another aspect of the present technology, there is provided a track system including a frame, a drive wheel assembly, a plurality of support wheel assemblies and an endless track. The frame defines a longitudinal center plane. The drive wheel assembly is rotationally connected to the frame. The plurality of support wheel assemblies are rotationally connected to the frame. A first support wheel assembly of the plurality of support wheel assemblies is disposed longitudinally forward from a remaining of the plurality of support wheel assemblies, the first support wheel assembly defining a first support wheel diameter. A second support wheel assembly of the plurality of support wheel assemblies is disposed adjacent and longitudinally rearward from the first support wheel assembly, the second support wheel assembly defining a second support wheel diameter. The first support wheel diameter is greater than the second support wheel diameter. The endless track surrounds the frame, the drive wheel assembly and the plurality of support wheel assemblies.

In some embodiments, the track system further includes an idler wheel assembly disposed longitudinally forward and vertically above the first support wheel assembly, the idler wheel assembly defining an idler wheel diameter, and the first support wheel diameter is greater than the idler wheel diameter.

In some embodiments, the track system is configured to connect to an off-road vehicle.

In some embodiments, the track system is a rear track system.

In some embodiments, the drive wheel assembly defines a driving axle axis, and the endless track defines a contact patch with a ground surface, and a majority of the contact patch is disposed longitudinally forward of the driving axle axis.

According to another aspect of the present technology, there is provided a frame, a drive wheel assembly, a plurality of support wheel assemblies, an idler wheel assembly and an endless track. The frame defines a longitudinal center plane. The drive wheel assembly is rotationally connected to the frame. The plurality of support wheel assemblies are rotationally connected to the frame. A first support wheel assembly of the plurality of support wheel assemblies is disposed longitudinally forward from a remaining of the plurality of support wheel assemblies. The first support wheel assembly defines a first support wheel diameter. The idler wheel assembly is disposed longitudinally forward and vertically above the first support wheel assembly, the idler wheel assembly defining an idler wheel diameter. Then endless track surrounds the frame, the drive wheel assembly, the idler wheel assembly and the plurality of support wheel assemblies. The idler wheel diameter is smaller than the first support wheel diameter.

According to another aspect of the present technology, there is provided track system for an off-road vehicle, the track system including a frame, a drive wheel assembly, a plurality of support wheel assemblies and an endless track. The frame defines a longitudinal center plane. The drive wheel assembly is rotationally connected to the frame. The drive wheel assembly has a plurality of longitudinally spaced track engaging members, each one of the plurality of longitudinally spaced track engaging members extending along a first length in a direction generally perpendicular to the longitudinal center plane. The plurality of support wheel assemblies is rotationally connected to the frame, each one of the plurality of support wheel assemblies including a first wheel and a second wheel, the first and second wheel being spaced from one another in a direction generally perpendicular to the longitudinal center plane by a first separating distance. The endless track surrounds the frame, the drive wheel assembly and the plurality of support wheel assemblies. The first length is approximately equal to the first separating distance.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14A is a perspective view of a cross-section of alternative embodiments of the wheel and the sleeve of FIG. 12;

FIG. 14B is a perspective view of a cross-section of the sleeve of FIG. 14A;

FIG. 16A is a perspective view of a cross-section of alternative embodiments of the wheel and the sleeve of FIG. 12;

FIG. 16B is a perspective view of a cross-section of the sleeve of FIG. 16A;

DETAILED DESCRIPTION

Introduction

Figure 1A:
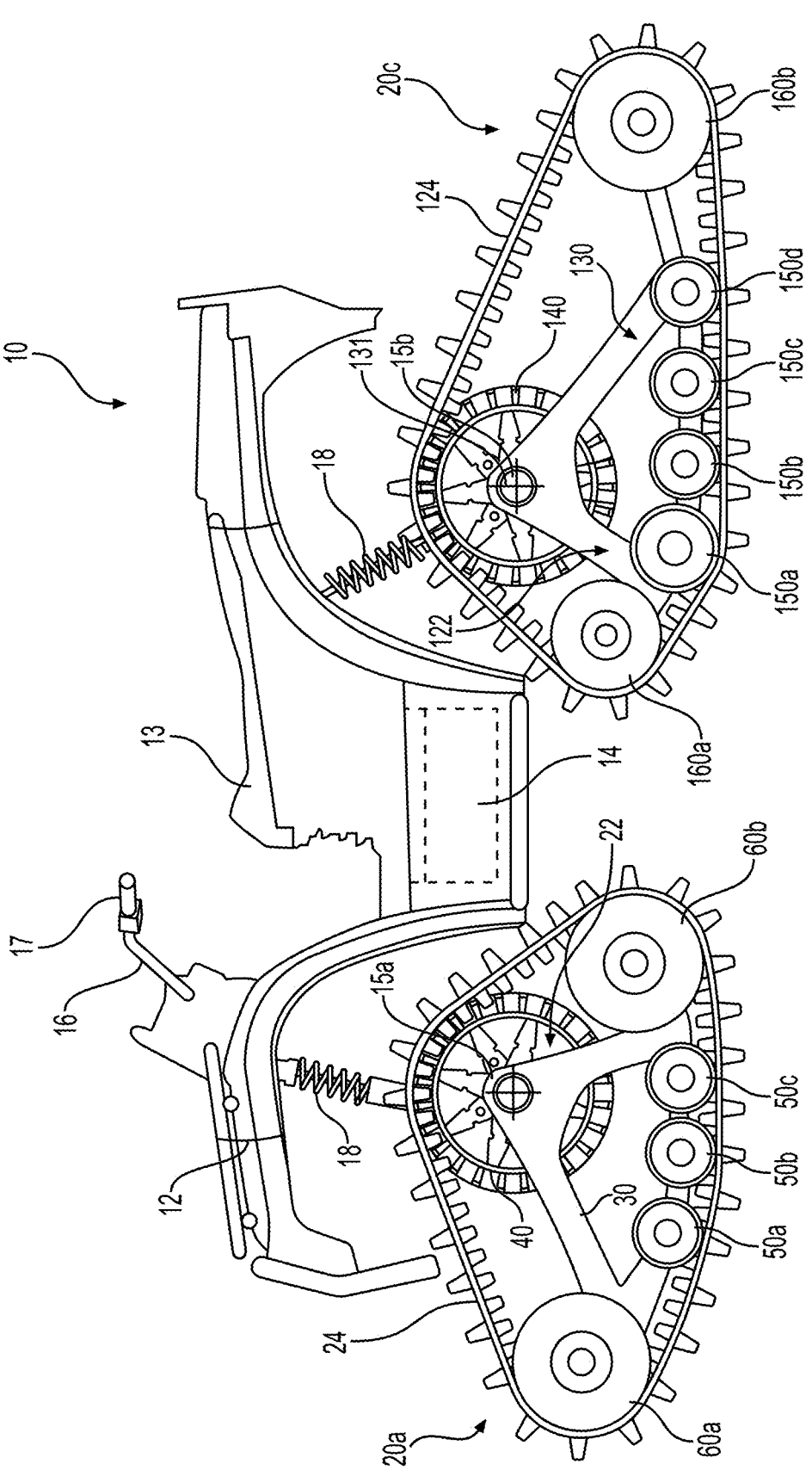
FIG. 1A is a left side elevation view of a vehicle having track systems according to embodiments of the present technology.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B"

is to be taken as specific disclosure of each of (i) A, (ii) B and (iii) A and B, just as if each is set out individually herein.

For purposes of the present application, terms related to spatial orientation when referring to a track system and components in relation to the track system, such as "vertical", "horizontal", "forwardly", "rearwardly", "left", "right", "above" and "below", are as they would be understood by a driver of a vehicle to which the track system is connected sitting thereon in an upright driving position, with the vehicle steered straight-ahead and being at rest on flat, level ground.

Generally, the present technology relates to track systems and various features thereof such as layouts of the track systems, support structures of track systems, tensioners for track systems, support and idler wheel assemblies of the track systems, wheels for track systems, seal assemblies for wheel assemblies of track systems, outer caps for wheel assemblies of track systems, drive wheel assemblies of track systems, mounting attachments for track systems, and endless tracks of track systems.

Off-Road Vehicle

Figure 1B:
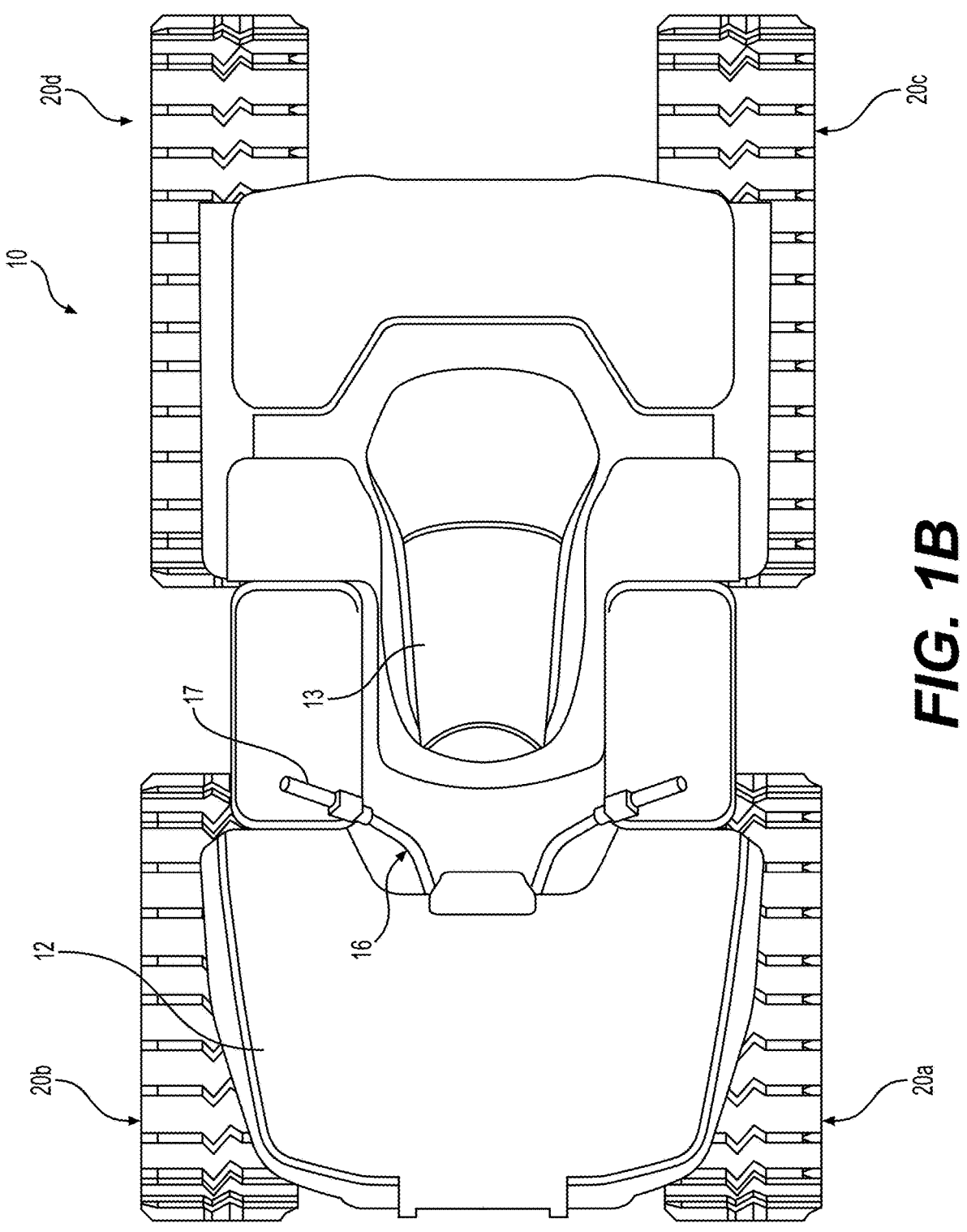
FIG. 1B is a top plan view of the vehicle of FIG. 1A.

Referring to FIGS. 1A and 1B, the present technology will be described with reference to a vehicle 10. The vehicle 10 is an off-road vehicle 10. More precisely, the vehicle 10 is an all-terrain vehicle (ATV) 10. It is contemplated that in other embodiments, the off-road vehicle 10 could be as a snowmobile, a side-by-side vehicle, a utility-task vehicle (UTV) or another type of recreational vehicles. A person skilled in the art will understand that it is also contemplated that some aspects of the present technology in whole or in part could be applied to other types of vehicles such as, for example, agricultural vehicles, industrial vehicles, military vehicles or exploratory vehicles for examples. The ATV 10 has four track systems 20a, 20b, 20c, 20d in accordance with embodiments of the present technology. The track systems 20a, 20b are front track systems, and the track systems 20c, 20d are rear track systems. In some embodiments, the off-road vehicle 10 could have more or less than four track systems.

The ATV 10 includes a frame 12, a straddle seat 13 disposed on the frame 12, a powertrain 14 (shown schematically), a steering system 16, a suspension system 18, and the four track systems 20a, 20b, 20c, 20d.

As will be described below, in various embodiments, the track systems 20a, 20b, 20c, 20d may have various features to enhance their traction and/or other aspects of their use and/or performance, such as, for example, features to ameliorate their manoeuverability, to better adapt to ground, and/or to improve overall ride quality.

The powertrain 14, which is supported by the frame 12, is configured to generate power and transmit said power to the track systems 20a, 20b, 20c, 20d via driving axles (not shown), thereby driving the ATV 10. More precisely, the front track systems 20a, 20b are operatively connected to a front axle 15a and, the rear track systems 20c, 20d are operatively connected to a rear axle 15b. It is contemplated that in some embodiments, the powertrain 14 could be configured to provide its motive power to both the front and the rear axles 15a, 15b, to only the front axle 15a or to only the rear axle 15b (i.e., in some embodiments, the front axle and/or rear axle could be a driving axle).

The steering system 16 is configured to enable an operator of the ATV 10 to steer the ATV 10. To this end, the steering system 16 includes a handlebar 17 that is operable by the operator to direct the ATV 10 along a desired course. In other embodiments, the handlebar 17 could be replaced by another steering device such as, for instance, a steering wheel. The steering system 16 is configured so that in response to the operator handling the handlebar 17, the front track systems 20a, 20b to change their orientation relative to the frame 12, thereby causing the ATV 10 to turn in a desired direction.

The suspension system 18, which is connected between the frame 12 and the track systems 20a, 20b, 20c, 20d, allows relative motion between the frame 12 and the track systems 20a, 20b, 20c, 20d, and can enhance handling of the ATV 10 by absorbing shocks and helping to maintain adequate traction between the track systems 20a, 20b, 20c, 20d and the ground.

The track systems 20a, 20b, 20c, 20d are configured to compensate for and/or otherwise adapt to the suspension system 18 of the ATV 10. For instance, the track systems 20a, 20b, 20c, 20d are configured to compensate for and/or otherwise adapt to alignment settings, namely camber (i.e., a camber angle, "roll"), caster (i.e., a caster angle, "steering angle" and/or toe (i.e., a toe angle, "yaw"), which are implemented by the suspension system 18. As the ATV 10 could have been originally designed to use wheels instead of the track systems, the alignment settings could originally have been set to optimize travel, handling, ride quality, etc. of the ATV 10 with the use of wheels. Since the track systems 20a, 20b, 20c, 20d are structurally different and behave differently from wheels, the track system 20a, 20b, 20c, 20d may be configured to compensate for and/or otherwise adapt to the alignment settings to enhance their traction and/or other aspects of their performances and/or use.

Track System

Referring to FIGS. 1A, 1B, 2A and 2B, the track systems 20a, 20b, 20c, 20d will now be generally described.

Focusing first on the front track systems 20a, 20b, and referring particularly to FIG. 2A, since the front track systems 20a, 20b are similar (i.e., generally symmetrical about a longitudinal center plane of the ATV 10), only the front track system 20a, will be described herewith. The track system 20a is a front left track system that is operatively connected to the ATV 10. In some instances, the front left track system 20a could be configured to replace a front left wheel of the ATV 10.

The track system 20a, which has a front longitudinal end 21a and a rear longitudinal end 21b, includes a track-engaging assembly 22 and an endless track 24 that is disposed around the track-engaging assembly 22. The track-engaging assembly 22 includes a frame 30, a drive wheel assembly 40, three support wheel assemblies 50a, 50b, 50c and front and rear idler wheel assemblies 60a, 60b. It is contemplated that in some embodiments, there could be more or less than three support wheel assemblies and/or more or less than two idler wheel assemblies. In the present embodiment, each of the support wheel assemblies 50a, 50b, 50c and front and rear idler wheel assemblies 60a, 60b includes left and right wheels. Other configurations of the support and idler wheel assemblies are contemplated.

Figure 2A:
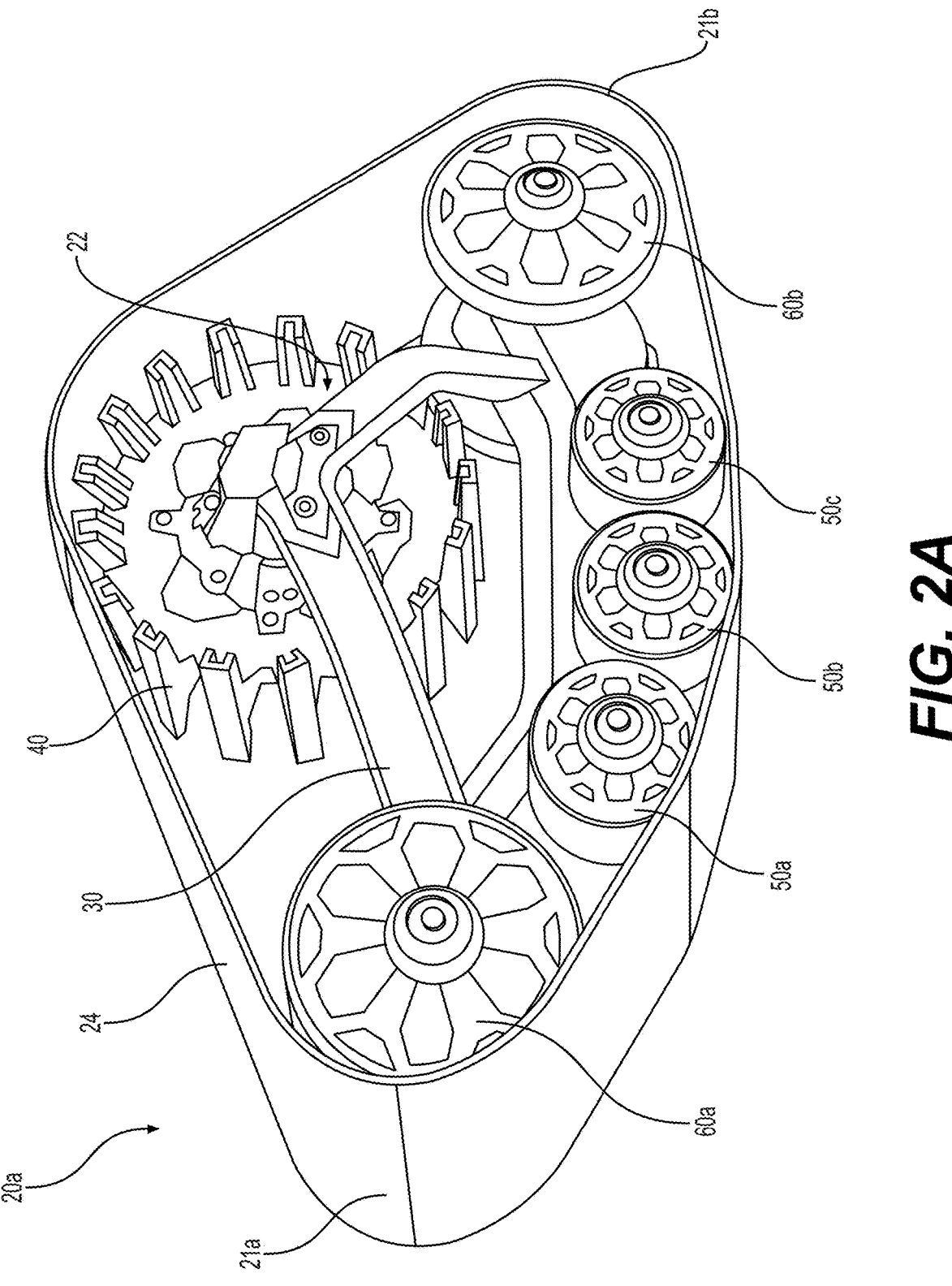
FIG. 2A is a perspective view taken from a front, bottom, left side of a front track system according to an embodiment of the present technology of the vehicle of FIG. 1A.

As shown in FIG. 2A, the front and rear idler wheel assemblies 60a, 60b are elevated relative to the support wheel assemblies 50a, 50b, 50c, and the support wheel 50a is elevated relative to the support wheel assemblies 50b, 50c. The elevation of the front idler wheel 60a, and the support wheel 50a can, in some instances, help the track system 20a to overcome obstacles (i.e., increase approach angle) and/or help the track system 20a to steer (i.e. minimize ground contacting surface). The same applies for the elevation of the rear idler wheel 60b as well (i.e. increase departure angle). In some embodiments, the front idler wheel assembly 60a and/or the rear idler wheel assembly 60b could bear weight, and thus could be considered to be support wheel assemblies. In some embodiments, the track system 20a includes an anti-rotation connector (not shown) as known in the art to limit a pivotal movement of the track system 20a relative to the frame 12 of the ATV 10. In some embodiments, the anti-rotation connector includes a resilient element such as a spring, or a member made of flexible material such as rubber, and a damper. The anti-rotation connector is connected between the frame 30 of the track system 20a and the frame 12 of the ATV 10. In some embodiments, the anti-rotation connector could be omitted. In some embodiments, one or more of the support wheels 50a, 50b, 50c could be elevated relative to the other support wheels (e.g., support wheel 50a is elevated relative to support wheels 50b and 50c).

Figure 2B:
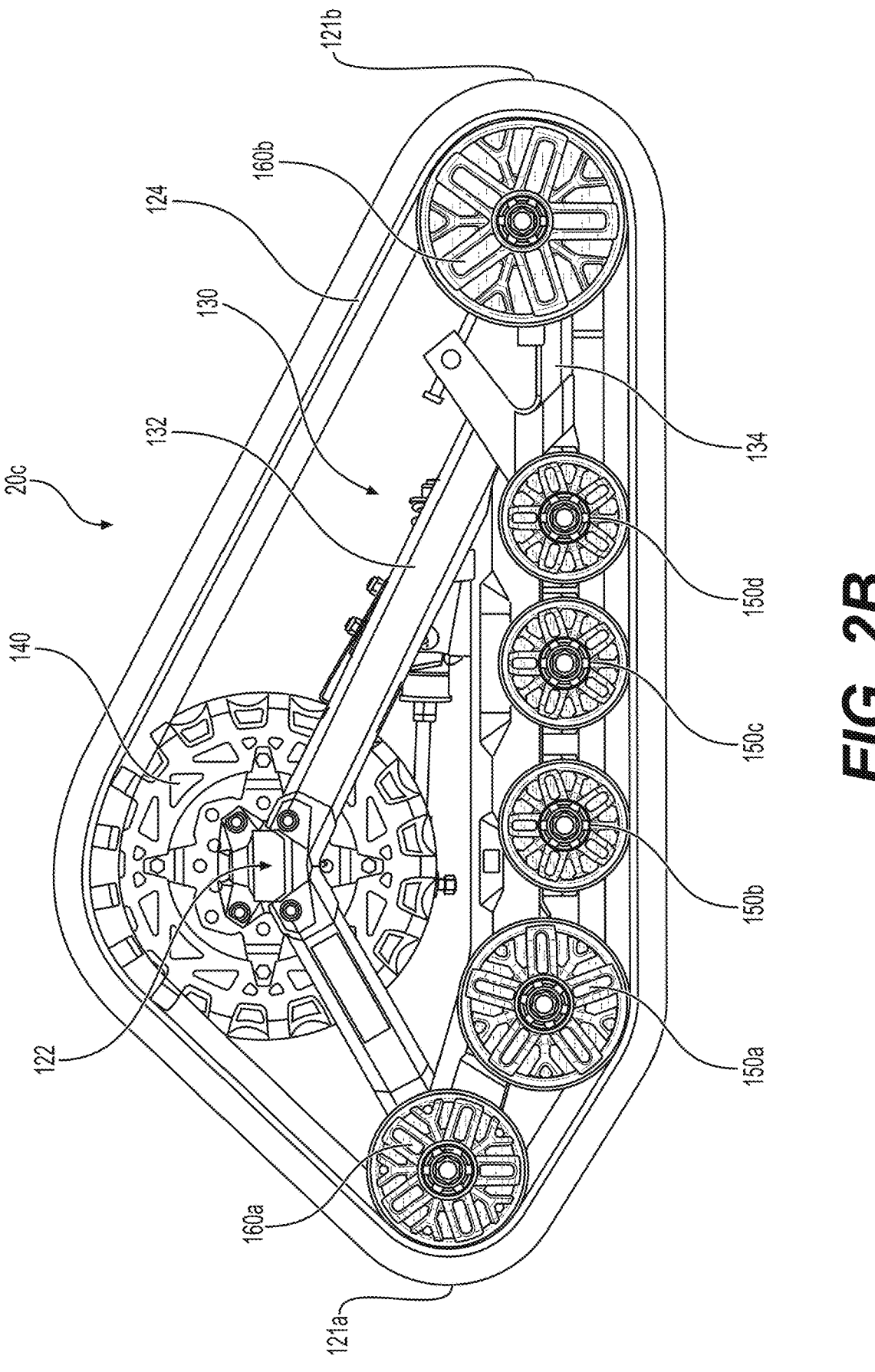
FIG. 2B is a left side elevation view of a rear track system according to an embodiment of the present technology of the vehicle of FIG. 1A.

Turning now particularly to FIG. 2B, as the rear track systems 20c, 20d are similar (i.e., generally symmetrical about a longitudinal center plane of the ATV 10), only the rear track system 20c will be described herewith. The track system 20c is a rear left track system configured to operatively connect to the ATV 10. In some instances, the rear left track system 20a is configured to replace a rear left wheel of the ATV 10.

The track system 20c, which has a front longitudinal end 121a and a rear longitudinal end 121b, includes a track-engaging assembly 122 and an endless track 124 disposed around the track-engaging assembly 122. The track-engaging assembly 122 includes a frame 130, a drive wheel assembly 140, four support wheel assemblies 150a, 150b, 150c, 150d and front and rear idler wheel assemblies 160a, 160b. As will be described in greater detail below, the diameter of the support wheel assembly 150a is larger than the diameter of the support wheel assemblies 150b, 150c, 150d. In other words, the leading support wheel assembly 150a has a larger diameter than the other support wheel assemblies 150b, 150c, 150d. As shown in FIG. 2B, by way of support wheel assembly 105a having a larger diameter than the diameter of support wheel assemblies 150b, 150c, 150d, the axis of rotation of the support wheel assembly 150a is elevated (i.e., vertically above) relative to the axis of rotation of support wheel assemblies 150b, 150c, 150d. It is contemplated that in some embodiments, there could be more or less than three support wheel assemblies and/or more or less than two idler wheel assemblies. In the present embodiment, each of the support wheel assemblies 150a, 150b, 150c, 150d and front and rear idler wheel assemblies 160a, 160b includes left and right wheels. Other configurations of the support and idler wheel assemblies are contemplated.

In the embodiment shown in FIG. 2B, the front and rear idler wheel assemblies 160a, 160b are elevated relative to the support wheel assemblies 150b, 150c, 150d. In some embodiments, the support wheel assembly 150a could be elevated relative to the support wheel assemblies 150b, 150c, 150d as well. The elevation of the front idler wheel assembly 160a can, in some instances, assist the track system 20c to overcome obstacles (i.e., increase approach angle). The same applies for the elevation of the support wheel assembly 150a (i.e., increase approach angle) and for the elevation of the rear idler wheel 60b as well (i.e., increase departure angle). As will be described in greater detail below, the configuration of the support wheel assemblies 150a, 150b, 150c, 150d and the front and rear idler wheel assemblies 160a, 160b could be different. In some embodiments, the front idler wheel assembly 160a and/or the rear idler wheel assembly 160b could bear weight, and thus could be considered to be support wheel assemblies. In some embodiments, the track system 20c also includes an anti-rotation connector (shown in FIG. 7) as known in the art to limit a pivotal movement of the track system 20c relative to the frame 12 of the ATV 10. In some embodiments, the anti-rotation connector includes a resilient element such as a spring, or a member made of flexible material such as rubber, and a damper. The anti-rotation connector is connected between the frame 130 of the track system 20c and the frame 12 of the ATV 10. In some embodiments, the anti-rotation connector could be omitted.

Rear Track Configuration

Referring to FIGS. 3A, 3B, 3C, 4, 5 and 6, various configurations of the track system 20c will be described. As mentioned above, it is understood that the configurations described herewith with reference to the track system 20c also apply to the track system 20d. The configuration of a track system is sometimes referred to as a layout of the track system.

The configuration of the track system 20c can vary, depending on which aspect of the overall performance of the track system 20c is to be prioritized. The configuration, and thus aspects of the overall performance, of the track system 20c, can change depending on, for example, the size of the support wheel assemblies 150a, 150b, 150c, 150d, the size of the front and rear idler wheel assemblies 160a, 160b, the positioning of the support wheel assemblies 150a, 150b, 150c, 150d, the positioning of the front and rear idler wheel assemblies 160a, 160b, as well as the number of the support wheel assemblies 150a, 150b, 150c, 150d and the number of the idler wheel assemblies 160a, 160b. The positioning and size of the drive wheel assembly 140 can also impact the overall performance of the track system 20c. Some of these configurations, without being limited to these configurations, are shown in FIGS. 3A, 3B, 3C and 4.

Figures 3A, 3B, 3C:
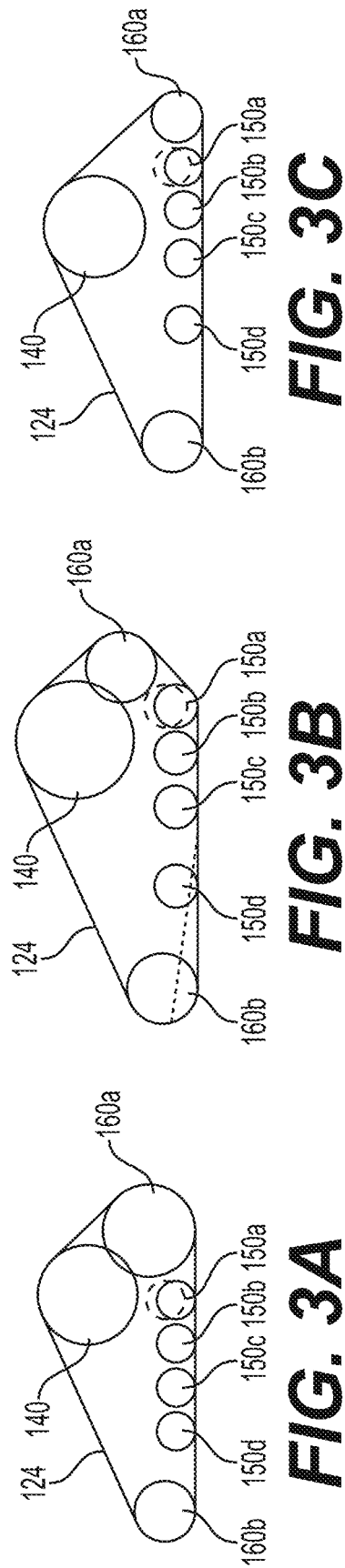
FIG. 3A is a schematic right side elevation view of the rear track system of FIG. 2B in a first configuration.
FIG. 3B is a schematic right side elevation view of the rear track system of FIG. 2B in a second configuration.
FIG. 3C is a schematic right side elevation view of the rear track system of FIG. 2B in a third configuration.

Referring to FIG. 3A, in some instances, increasing the diameter of one or both of the idler wheel assemblies 160a, 160b increases the durability of the track system 20c. An increase in diameter of an idler wheel assembly (e.g., front idler wheel assembly 160a as shown in FIG. 3A,) reduces stresses generated in the endless track 124 where the endless track 124 surrounds the idler wheel assembly due to the endless track 124 having a larger radius of curvature at that point. Additionally, increasing the distance between the support wheel assemblies 150a, 150b, 150c, 150d, the idler wheel assemblies 160a, 160b and the drive wheel assembly 140 generally results in increasing the contact surface (i.e., "contact patch") between the endless track 124 and the ground (for example: increasing the distance between each one of the support wheel assemblies 150a, 150b, 150c, 150d; increasing the distance between the support wheel assemblies 150a, 150b, 150c, 150d and any one of the idler wheel assemblies 160a; 160b; increasing the distance between the support wheel assemblies 150a, 150b, 150c, 150d and the drive wheel assembly 140; increasing the distance between any one of the idler wheel assemblies 160a, 160b and the drive wheel assembly 140; increasing the distance between the support wheel assemblies 150a, 150b, 150c, 150d and the drive wheel assembly 140; and/or increasing the distance between the support wheel assemblies 150a, 150b, 150c, 150d, the idler wheel assemblies 160a, 160b and the drive wheel assembly 140). An increase in the area of contact between the endless track 124 and the ground reduces pressure in the endless track 124, which increases durability of the track system 20c.

Referring to FIG. 3B, positioning the front idler wheel assembly 160a in an uplifted position relative to the ground (and thus relative to the support wheels 150a, 150b, 150c, 150*d*) is believed to improve the ability of the track system 20*c* to climb over obstacles. The uplifted position of the front idler wheel assembly 160*a* provides a greater "approach angle", which facilitates obstacle climbing.

Referring to FIG. 3C, decreasing the diameter of one of the front and rear idler wheel assemblies 160*a*, 160*b* (front idler wheel assembly 160*a* in the present embodiment) so that the diameter thereof is substantially similar to the diameter of the support wheel assemblies 150*a*, 150*b*, 150*c*, 150*d* and positioned so that the front idler wheel assembly 160*a* is generally level with the support wheel assemblies 150*a*, 150*b*, 150*c*, 150*d* which is believed to improve traction and floatability of the track system 20*c*, as the contact surface between the endless track 124 and the ground increases. In such embodiments, the front idler wheel assembly 160*a* is considered as a support wheel.

Figure 4:
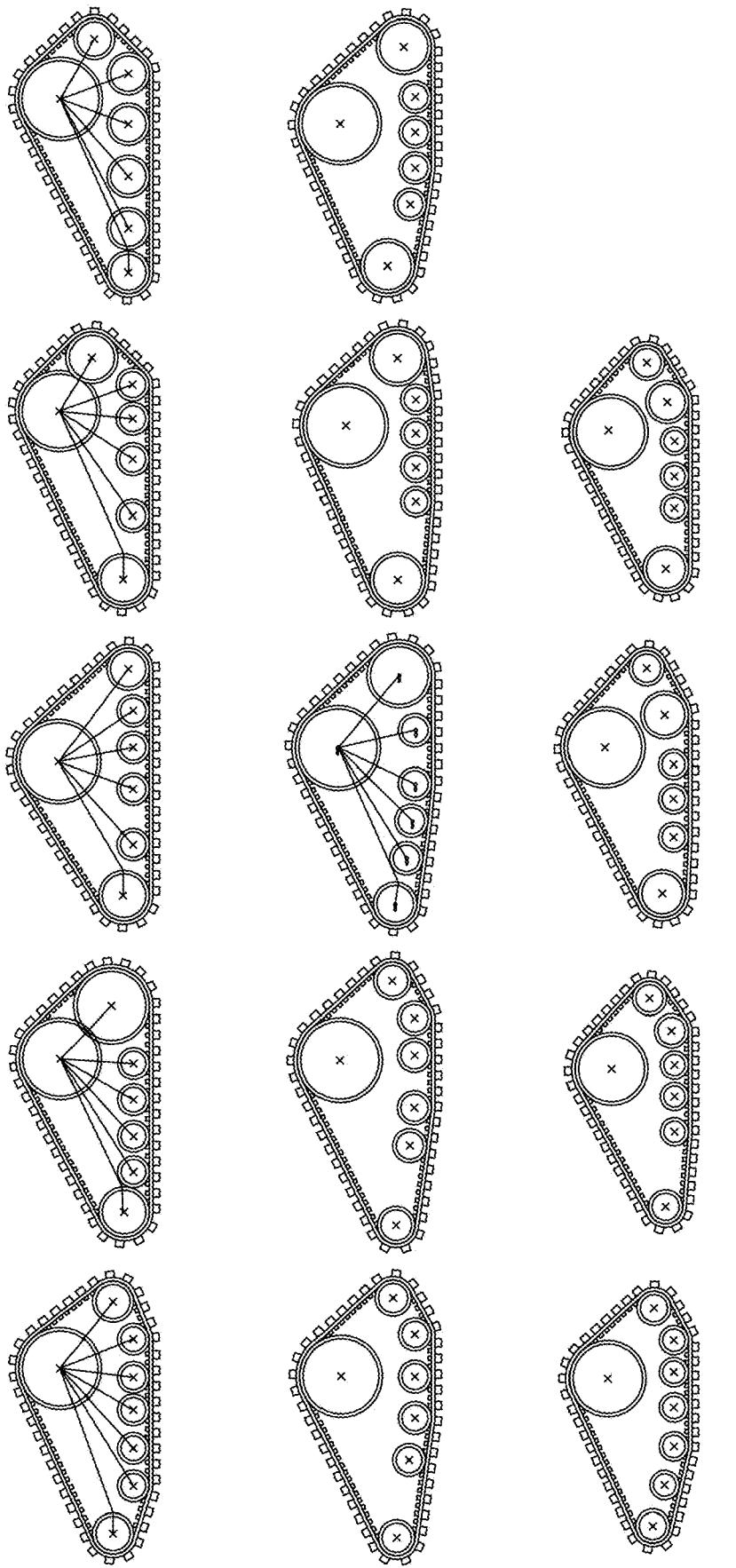
FIG. 4 is a plurality of right side elevation views of various configurations of the rear track system of FIG. 2B.

Referring to FIG. 4, various configurations of the track system 20*c* are shown, where each configuration slightly modifies one of the aspects of the overall performance of the track system 20*c*, such as the durability, the obstacle crossing, the traction and floatability.

Figure 5:
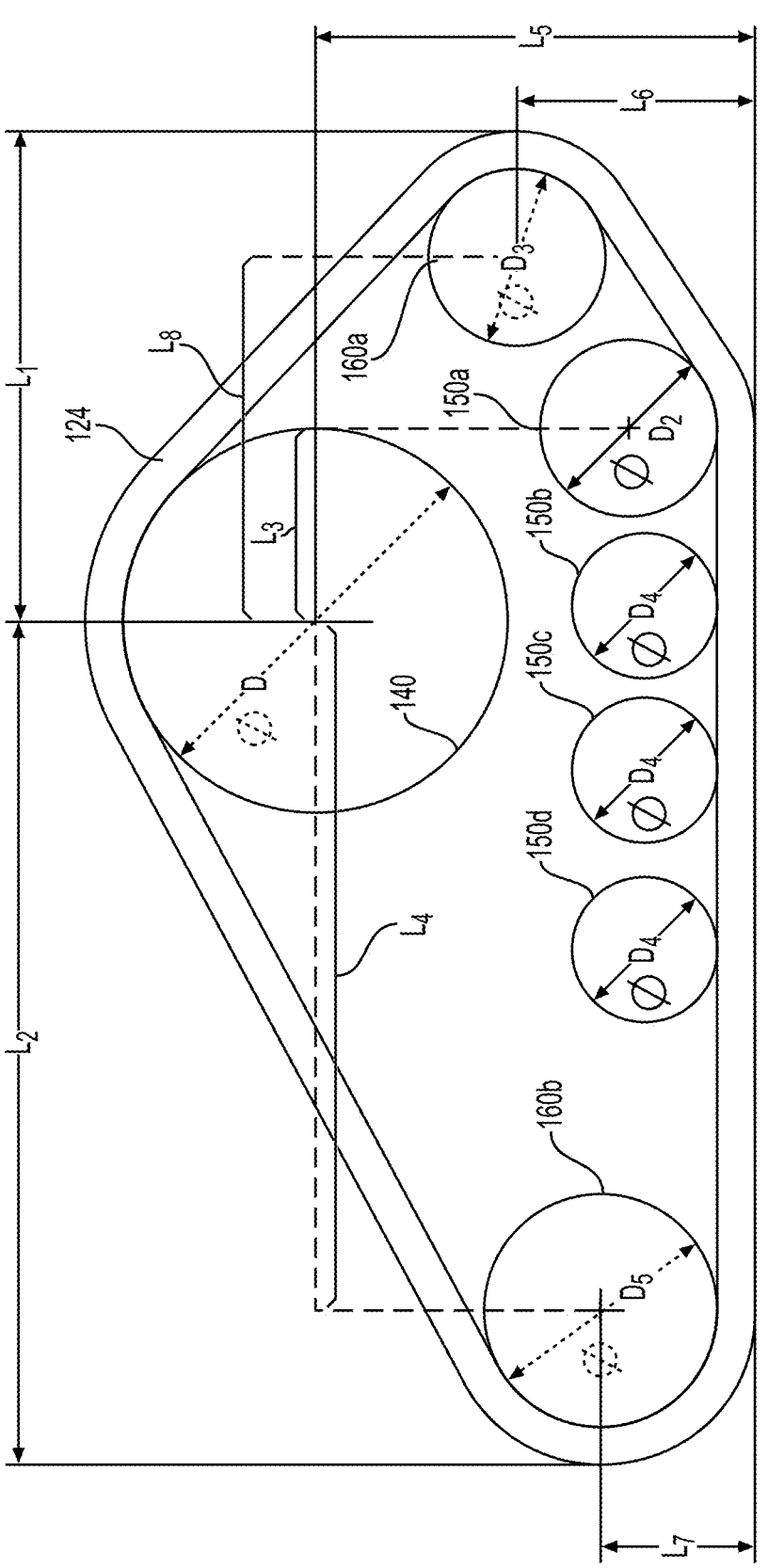
FIG. 5 is a schematic right side elevation view of the rear track system of FIG. 2B in an alternative configuration.

Referring to FIG. 5, a first embodiment of the configuration of the track system 20*c* is shown. This configuration is particularly suited for durability and traction/floatation purposes. In this configuration, the diameter of the leading support wheel assembly 150*a* is larger than the diameter of the other support wheel assemblies 150*b*, 150*c*, 150*d*, which as will be described below, is believed to improve durability of the track system 20*c*. Additionally, the rear idler wheel assembly being substantially level with the support wheel assemblies 150*a*, 150*b*, 150*c*, 150*d* increases the contact surface between the endless track 124 and the ground, thereby enhancing traction/floatation. A length L1 is measured between a center of the drive wheel assembly 140 and the front longitudinal end 121*a*. A length L2 is measured between the center of the drive wheel assembly 140 and the rear longitudinal end 121*b*. A length L3 is measured between the center of the drive wheel assembly and the center of the support wheel assembly 150*a*. A length L4 is measured between the center of the drive wheel assembly and the center of the rear idler wheel assembly 160*b*. A length L5 is measured between the center of the drive wheel assembly and the ground (i.e., bottom of the endless track 124). A length L6 is measured between the center of the leading idler wheel assembly 160*a* and the ground (i.e., bottom of the endless track 124). A length L7 is measured between the center of the rear idler wheel assembly 160*b* and the ground (i.e., bottom of the endless track 124). A length L8 is measured between the center of the drive wheel assembly 140 the center of the front idler wheel assembly 160*b*. In the present embodiment, L1 is about 483 mm, L2 is about 830 mm, L3 is about 150 mm, L4 is about 673 mm, L5 is about 439 mm, L6 is about 241 mm, L7 is about 157 mm and L8 is about 354 mm. The drive wheel assembly 140*d* defines a diameter D1. The support wheel assembly 150*a* defines a diameter D2. The front idler wheel assembly 160*a* defines a diameter D3. The support wheel assemblies 150*b*, 150*c*, 150*d* define diameter D4. It is contemplated that in some embodiments, each of the support wheel assemblies 150*b*, 150*c*, 150*d* could define diameters different from one another. The rear idler wheel assembly 160*b* defines a diameter D5. In the present embodiment, D1 is about 377 mm, D2 is about 175 mm, D3 is about 175 mm, D4 is about 144 mm and D5 is about 230 mm. Various ratios can be derived from these dimensions.

Figure 6:
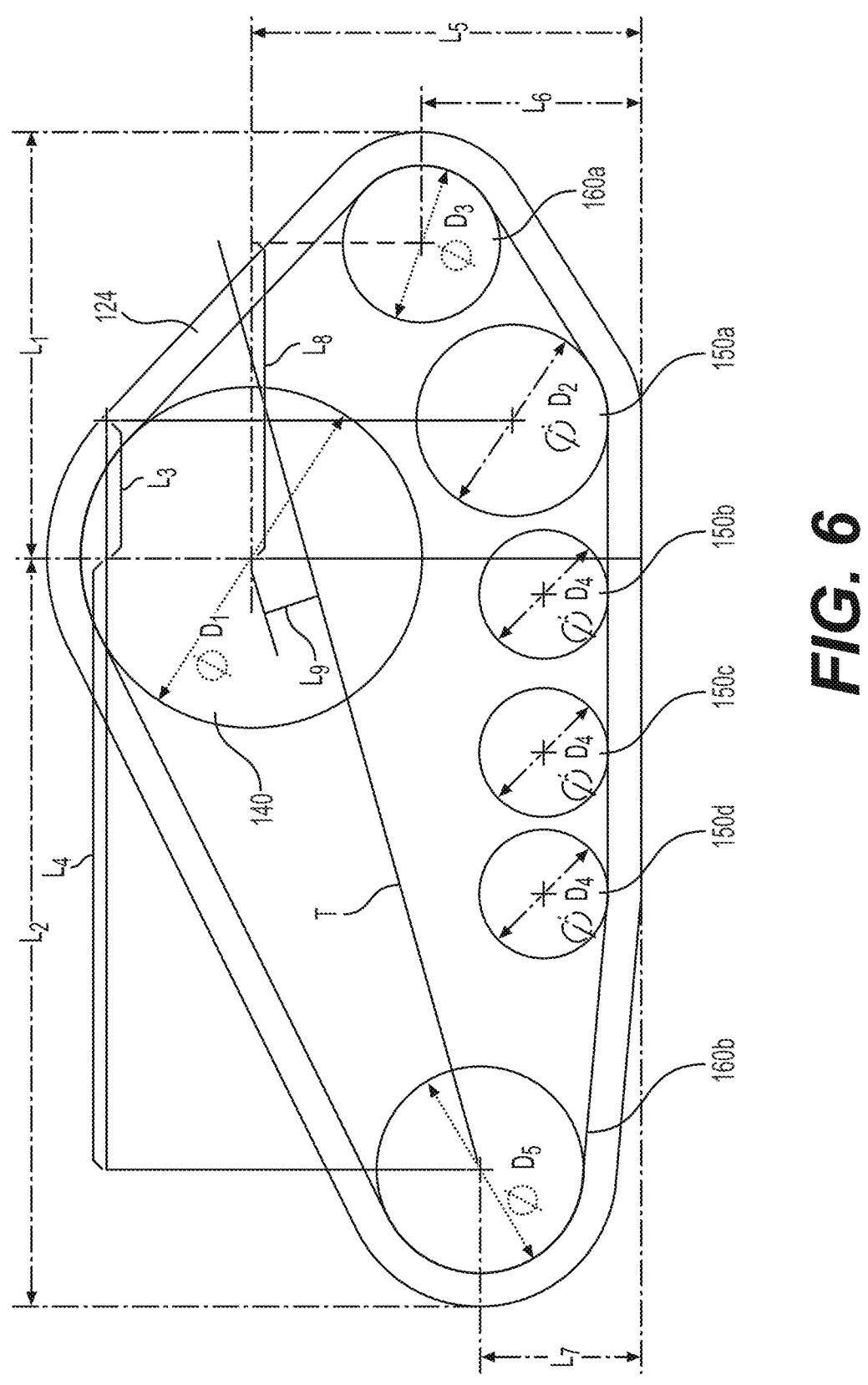
FIG. 6 is a schematic right side elevation view of the rear track system of FIG. 2B in an alternative configuration.

Referring to FIG. 6, a second embodiment of the configuration of the track system 20*c* is shown. This configuration is particularly suited from a rolling resistance perspective, it has less vibration and less where when compared to the configuration of the first embodiment shown in FIG. 5 (i.e., less energy required to operate track system 20*c*), because most the support wheel assembly having most of the weight is larger, so force is spread on a larger portion of the endless track. In this embodiment, the leading support wheel assembly 150*a* has a diameter that is larger than the diameter of the other support wheel assemblies 150*b*, 150*c*, 150*d* which, as will be described below, is believed to improve durability of the track system 20*c*. Furthermore, the rear idler wheel assembly 160*b* is positioned slightly vertically above the support wheel assemblies 150*a*, 150*b*, 150*c*, 150*d*, which extends the contact patch without the rear idler wheel assembly 160*b* necessarily engaging with the ground. Thus, while the contact surface area increases, since the rear idler wheel assembly 160*b* does not necessarily engage with the ground, the endless track 124 is subjected to less wear than if the rear idler wheel assembly 160*b* were to be level with the support wheel assemblies 150*a*, 150*b*, 150*c*, 150*d*, and engaged the ground. In the present embodiment, L1 is about 474 mm, L2 is about 845 mm, L3 is about 150 mm, L4 is about 691 mm, L5 is about 439 mm, L6 is about 249 mm, L7 is about 154 mm. Additionally, in the present embodiment, D1 is about 378 mm, D2 is about 215 mm, D3 is about 175 mm, D4 is about 144 mm and D5 is about 230 mm. In another contemplated embodiment, L1 is about 457 mm, L2 is about 854 mm, L3 is about 150 mm, L4 is about 700 mm, L5 is about 439 mm, L6 is about 249 mm, L7 is about 154 mm, D1 is about 378 mm, D2 is about 215 mm, D3 is about 175 mm, D4 is about 144 mm and D5 is about 230 mm. But it is to be appreciated that L1-L7 and D1-D5 could have other values in other embodiments without departing from the present technology.

Additionally, the position of the rear idler wheel assembly 160*b* is adapted to add pressure on the track 124 behind the rear axle, such that the resulting tensile force T in the endless track 124, shown schematically in FIG. 6, in the endless track 124 is below the rear axle 15*b*. A length L9 is measured between the tensile force T and the center of the drive wheel assembly 140. In the present embodiment, L9 is about 110 mm. This can progressively increase traction, when high torque is applied to the drive wheel assembly 140, for instance such as in snowy conditions. But it is to be appreciated that L9 could have other values in other embodiments without departing from the present technology.

In some embodiments, the configuration of the track system 20*c* could be adapted so that a larger portion of the contact surface between the endless track 124 and the ground is located in front of the axle of the ATV 10 to which the track system 20*c* is operatively connected (rear axle 15*b*). This, inter alia, avoids the need for a powerful anti-rotation connector.

As shown in FIGS. 2A, 2B, 5, 6 and 7, the track system 20*c*, is longitudinally asymmetrical about a vertical plane V that passes through the rear axle and that is generally perpendicular to a longitudinal center plane of the track system 20*c*. More precisely, generally, the rear axle 15*b* is closer to the front longitudinal end 121*a* of the track system 20*c* than to the rear longitudinal end 121*b* of the track system 20*c*. As a result, there is an unequal load distribution of the load borne by the track system 20*c*, as the loads are greater toward the front longitudinal end 121*a* of the track system 20*c* than toward the rear longitudinal end 121*b* of the track system 20*c*. As a result, the load exerted on the support wheel assembly 150*a* is generally greater than the load exerted on the other support wheel assemblies 150*b*, 150*c*, 150*d*. This, in turn, results in a higher pressure being applied on the endless track 124 below the support wheel assembly 150*a* than below the support wheels 150*b*, 150*c*, 150*d* when the support wheel assemblies 150*a*, 150*b*, 150*c*, 150*d* have a similar size.

In the present embodiment, being that the support wheel assembly 150*a* has a larger diameter than the support wheel assemblies 150*a*, 150*b*, 150*c*, 150*d*, the area of contact between the support wheel assembly 150*a* and the endless track 124 increases longitudinally. An increase in the area of contact between the support wheel assembly 150*a* and the endless track 124 results in a reduction of the pressure applied by the support wheel assembly 150*a* to the endless track 124. Thus, wear on the endless track 124 and on the support wheel assembly 150*a* is reduced. This is particularly beneficial, as the leading support wheel assemblies are generally the first part of track systems that need to be replaced due to wear.

Furthermore, an increase in the diameter of the support wheel assembly 150*a* can reduce the slippage between the endless track 124 and the ground where the endless track 124 initially engages the ground (i.e., below the support wheel assembly 150*a*) as the contact area between the endless track 124 and the ground is increased. A reduction in slippage reduces wear on the endless track 124.

In addition, the larger diameter of the support wheel assembly 150*a* implies a larger lateral surface of the wheel, which in turn reduces wear caused by the support wheel assembly 150*a* and lugs 610 disposed on the endless track 124. As such, wear on the support wheel assembly 150*a* is reduced. In other words, a wheel with a larger diameter that engages the lug 610 undergoes wear, but slower than the wear undergone by a wheel with a smaller diameter, as a larger diameter will have less revolutions than the smaller diameter for a given distance. This is particularly beneficial, because the leading support wheel assemblies are generally the first part of track systems that need to be replaced due to wear.

It is believed that a wheel with a larger diameter travels a larger horizontal distance when overcoming an obstacle of a given height, when compared to a wheel with a smaller diameter, such that the vertical upward and downward motions resulting from the overcoming of obstacles is spread over a larger horizontal distance when the wheel has a larger diameter, which therefore enhances ride quality by reducing vibrations and shocks.

Components of the Track System

Various components of the track systems 20*a*, 20*b*, 20*c*, 20*d* will now be described in greater detail. Although there are differences between the front track systems 20*a*, 20*b* and the rear track systems 20*c*, 20*d*, the components will be described with reference to the rear track systems 20*c*, 20*d* (particularly track system 20*c*). It is understood that the components described herewith with reference to the rear track systems 20*c*, 20*d* have counterpart components configured to connect to the front track systems 20*a*, 20*b*. For instance, the frames 30, 130 are generally similar, and thus, only the frame 130 will be described herewith.

Frame

Figure 7:
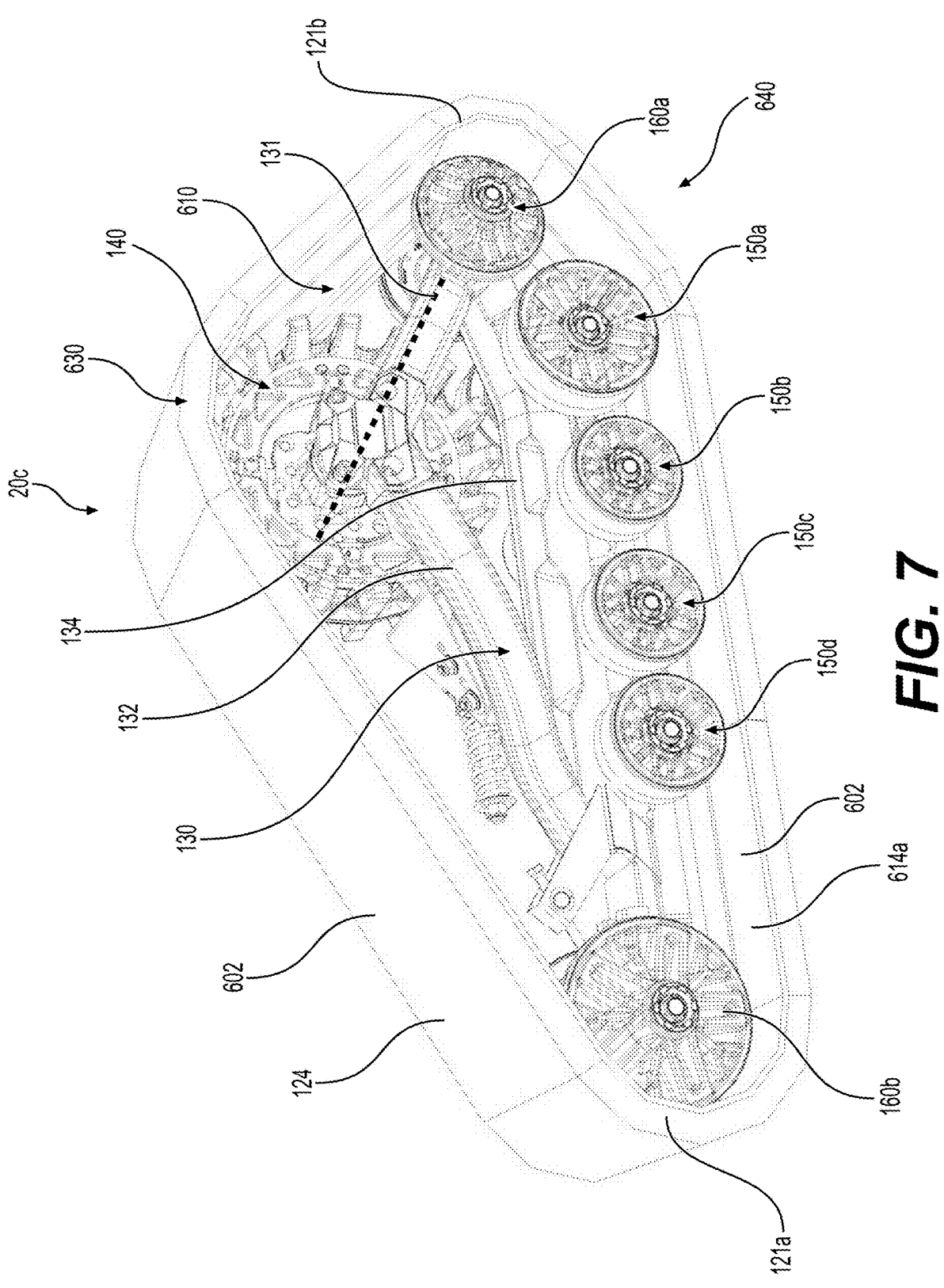
FIG. 7 is a perspective view taken from a rear, top right side of the rear track system of FIG. 2B.

Referring to FIGS. 2B and 7, the frame 130 of the track system 20*c* will be described in greater detail. The frame 130 is pivotable about a pivot axis 131 (i.e. pitch), which can facilitate motion of the track system 20*c* on uneven terrain, and enhance traction thereof. More particularly, in the present embodiment, the pivot axis 131 is aligned with the rear axle 15*b*, and aligned with an axis of rotation of the drive wheel assembly 140. In other embodiments, the pivot axis 131 of the frame 130 could be offset from the axis of rotation of the drive wheel assembly 140. In yet other embodiments, the frame 130 could be fixed (i.e., not pivotable).

In this embodiment, the frame 130 includes an upper frame portion 132 and a lower frame portion 134. The upper frame portion 132 is configured to rotationally connect with the drive wheel assembly 140, and the lower frame portion 134 is configured to rotationally connect with the support wheel assemblies 150*a*, 150*b*, 150*c*, 150*d* and with the front and rear idler wheel assemblies 160*a*, 160*b*. More precisely, the front idler wheel assembly 160*a* is connected to the lower frame portion 134 at a front longitudinal end 121*a* of the track system 20*c*, and the rear idler wheel assembly 160*b* is connected to the lower frame portion 134 at a rear longitudinal end 121*b* of the track system 20*c*. The support wheel assemblies 150*a*, 150*b*, 150*c*, 150*d* are rotationally connected to the lower frame portion 134 and are disposed longitudinally between the front and rear idler wheel assemblies 160*a*, 160*b*. In some embodiments, two or more of the support wheel assemblies 150*a*, 150*b*, 150*c*, 150*d* could be connected to the lower frame portion 134 via a tandem pivot assembly, as generally known in the art.

Support Structures

Referring to FIGS. 8A, 8B, 8C, 9A, 9B, 10A, 10B and 10C, various embodiments of the connecting configuration between the support wheel assemblies 150*a*, 150*b*, 150*c*, 150*d* and the frame 130 will be described.

Figure 8A:
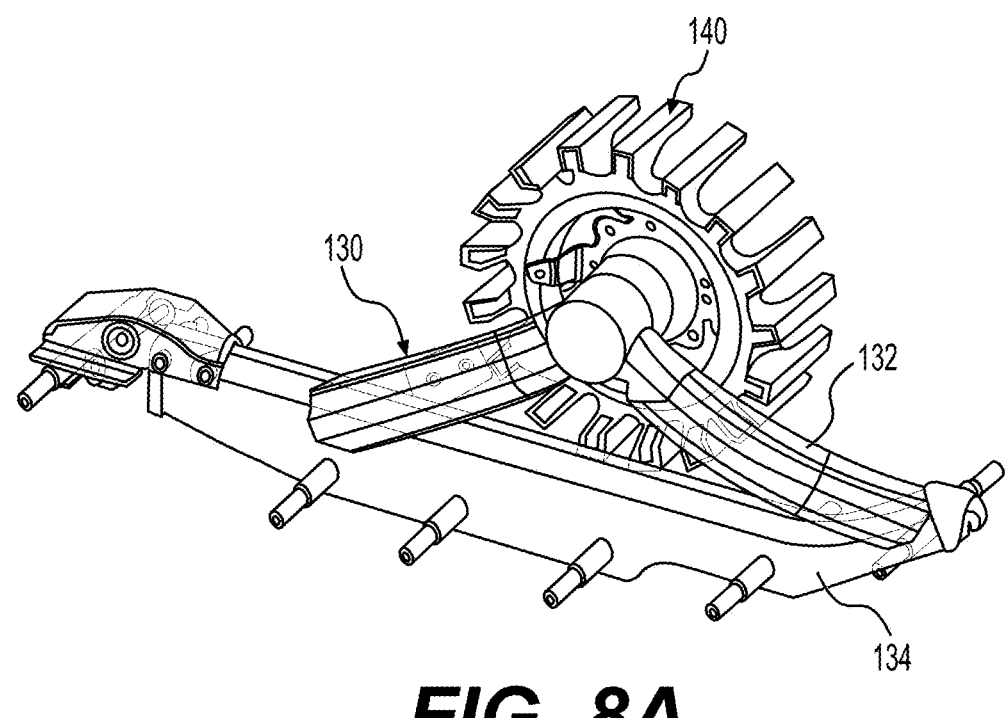
FIG. 8A is a perspective view taken from a front, top, right side of a portion of an alternative embodiment of the rear track system of FIG. 2B.

In the embodiment shown in FIG. 8A, the support wheel assemblies 150*a*, 150*b*, 150*c*, 150*d* are connected to the lower frame portion 134, such that each axle of the support wheel assemblies 150*a*, 150*b*, 150*c*, 150*d* is fixed relative to the lower frame portion 134. It is contemplated that the axles of the support wheel assemblies 150*a*, 150*b*, 150*c*, 150*d* could be connected to the lower frame portion 134 in various ways such as welding or casting.

Figure 8B:
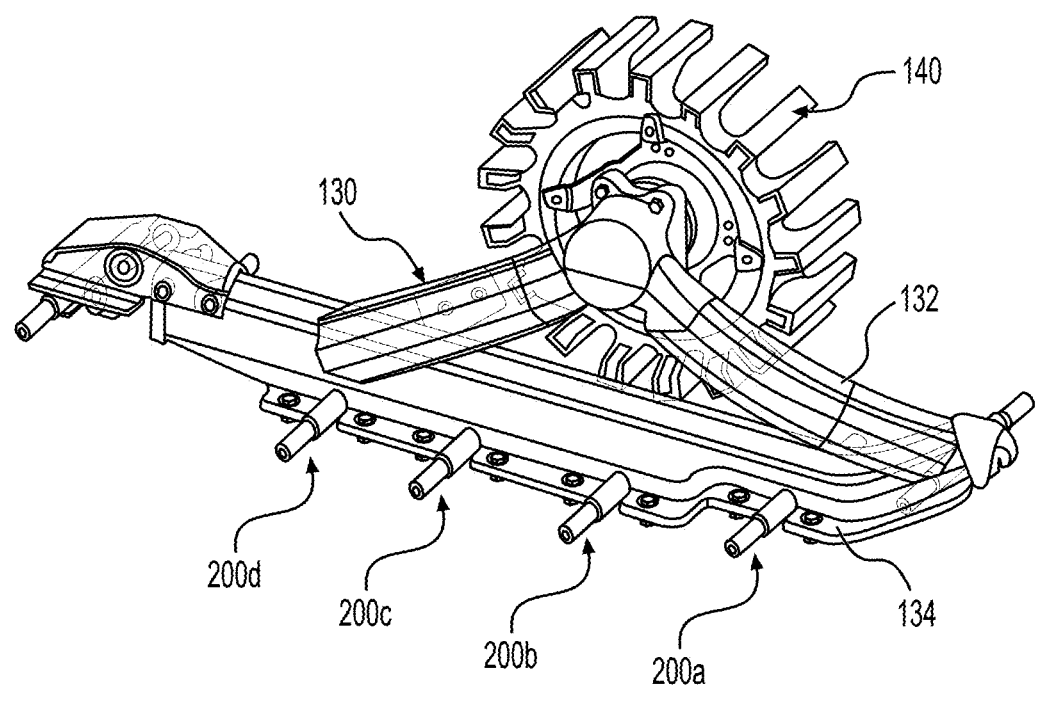
FIG. 8B is a perspective view taken from a front, top, right side of a portion of an alternative embodiment of the rear track system of FIG. 2B and having support structures according to an embodiment of the present technology.
Figure 9A:
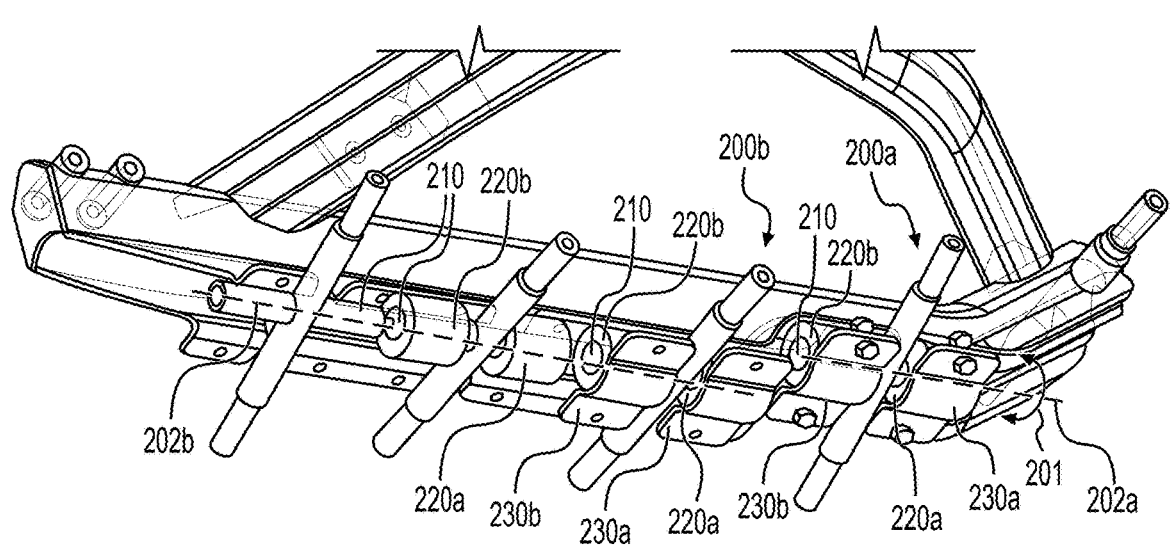
FIG. 9A is a perspective view taken from a rear, bottom, right side of the portion of the rear track system of FIG. 8B.

In the embodiment shown in FIGS. 8B and 9A, the support wheel assemblies 150*a*, 150*b*, 150*c*, 150*d* are pivotally connected to the lower frame portion 134, such that each axle of the support wheel assemblies 150*a*, 150*b*, 150*c*, 150*d* is pivotable relative to the lower frame portion 134. More precisely, the support wheel assemblies 150*a*, 150*b*, 150*c*, 150*d* are respectively connected to the lower frame portion 134 by support structures 200*a*, 200*b*, 200*c*, 200*d*.

As the support structures 200*a*, 200*b*, 200*c*, 200*d* are similar, only the support structure 200*a* will be briefly described herewith. As best seen on FIGS. 10A to 10*c*, the support structure 200*a* includes a longitudinal shaft 210, leading and trailing resilient members 220*a*, 220*b*, and leading and trailing connecting members 230*a*, 230*b*. The shaft 210 is operatively connected to the axle of the support wheel assembly 150*a*, the leading and trailing resilient members 220*a*, 220*b* are connected to the shaft 210 and are resiliently deformable, and the leading and trailing connecting members 230*a*, 230*b* are configured to connect the shaft 210 and the leading and trailing resilient members 220*a*, 220*b* to the lower frame portion 134. The leading and trailing connecting members 230*a*, 230*b* are configured to not interfere with the pivotal movement of the support wheel assembly 150*a*. When the leading and trailing resilient members 220*a*, 220*b* are resiliently deformed in a circumferential direction (shown by arrow 201 in FIG. 9A) about a longitudinal axis 202*a*, due to a pivotal movement of the axle of the support wheel assembly 150*a*, the leading and trailing resilient members 220*a*, 220*b* bias the shaft 210, and thus the axle of the support wheel assembly 150*a*, toward an initial position. Thus, the support structure 200*a* may improve load distribution of the track system 20*c* and may help the track system 20*c* to overcome obstacles. The leading and trailing resilient members 220*a*, 220*b* of the support structures 200*b*, 200*c*, 200*d* are resiliently deformed in a circumferential direction shown by arrow 201 about a longitudinal axis 202*b*. The longitudinal axis 202*a* is vertically higher than the longitudinal axis 202*b* to accommodate for the larger diameter of the support wheel assembly 150*a*.

Figure 10A:
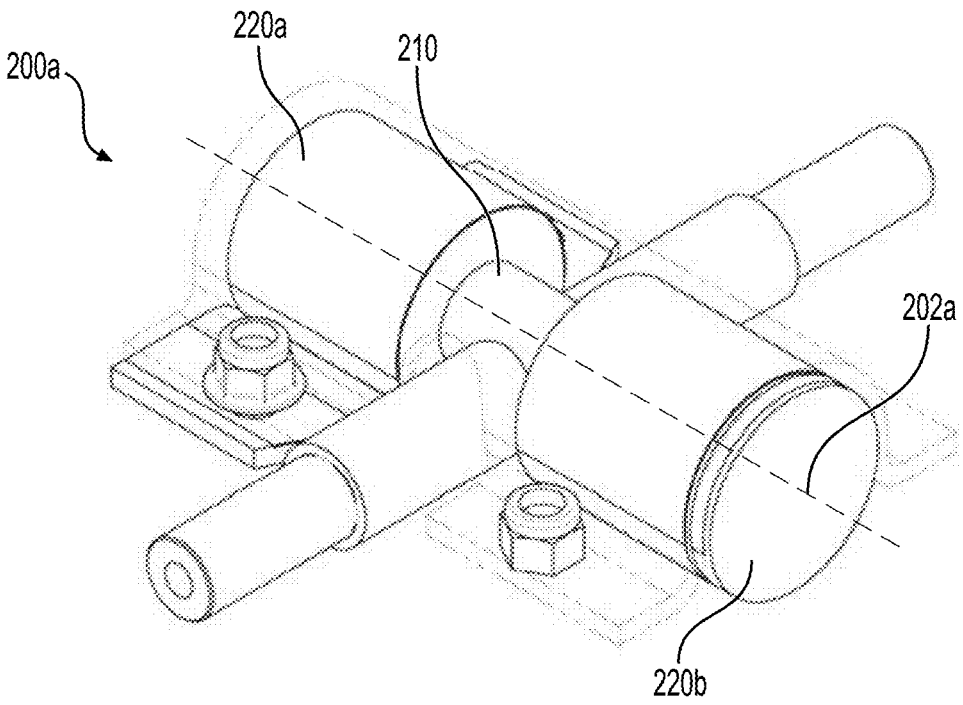
FIG. 10A is a perspective view of the support structure of FIG. 8B in a first position.
Figure 10B:
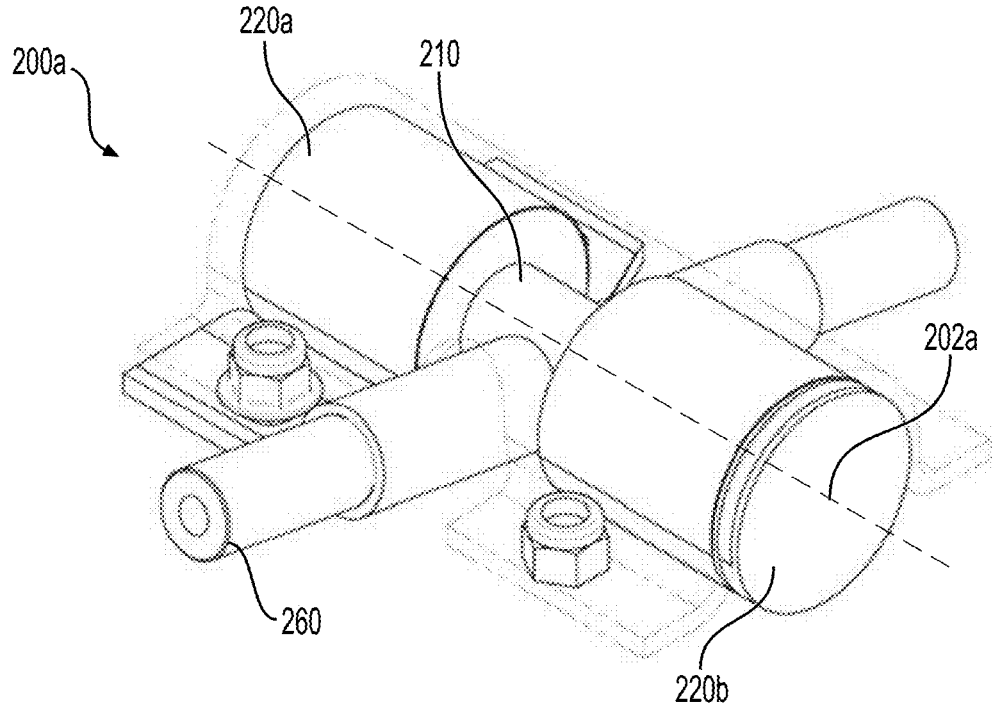
FIG. 10B is a perspective view of the support structure of FIG. 8B in a second position.
Figure 10C:
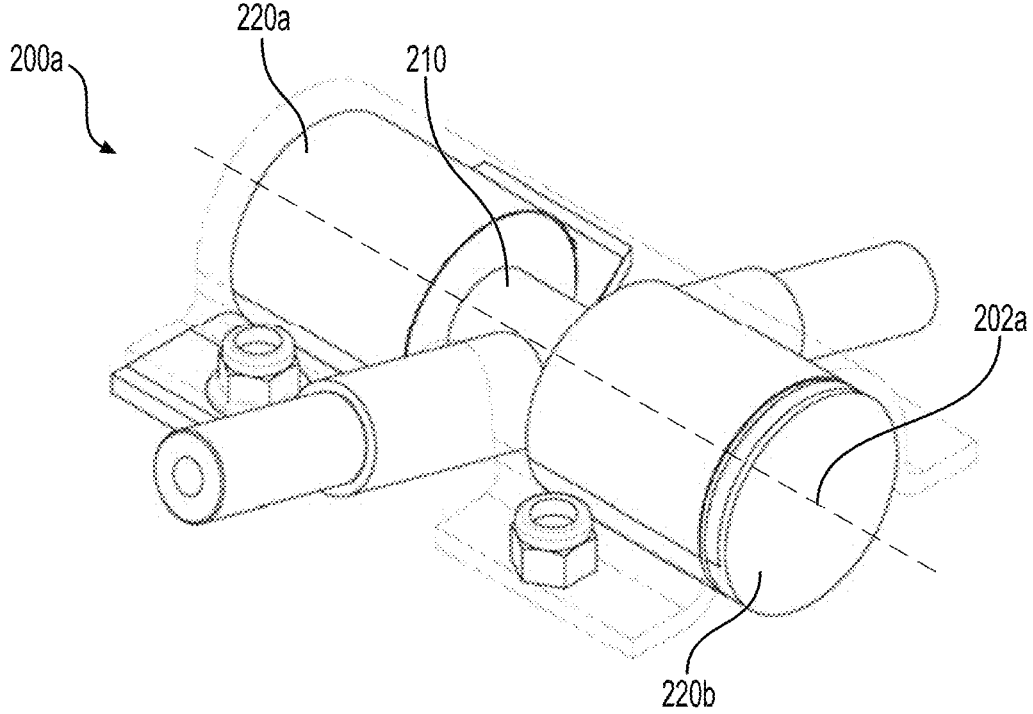
FIG. 10C is a perspective view of the support structure of FIG. 8B in a third position.

For example, referring to FIG. 10A, the support structure 200*a* is in an initial resting position. When the left side wheel of the support wheel assembly 150*a* encounters an obstacle, the left side wheel moves upwardly (shown in FIGS. 10B and 10C), thereby causing the right side wheel to move downwardly and causing the leading and trailing resilient members 220*a*, 220*b* to deform circumferentially. The leading and trailing resilient members 220*a*, 220*b*, once offset from their initial position, apply biasing forces to the shaft 210 to bias the shaft 210 toward the initial position, which can help the support wheel assembly 150*a* overcome the obstacle that made the left side wheel move upwardly. The support structure 200*a* can also help improve load distribution of the track system 20*c*. The support structures 200*a*, 200*b*, 200*c*, 200*d* and other embodiments thereof, are described in U.S. Provisional Application No. 63/080,139 filed Sep. 18, 2020 entitled "Support Structure for Connecting at Least One Support Wheel Assembly to a Frame Member of a Track System and Track System Having the Same", which is incorporated by reference herein in its entirety.

Figure 8C:
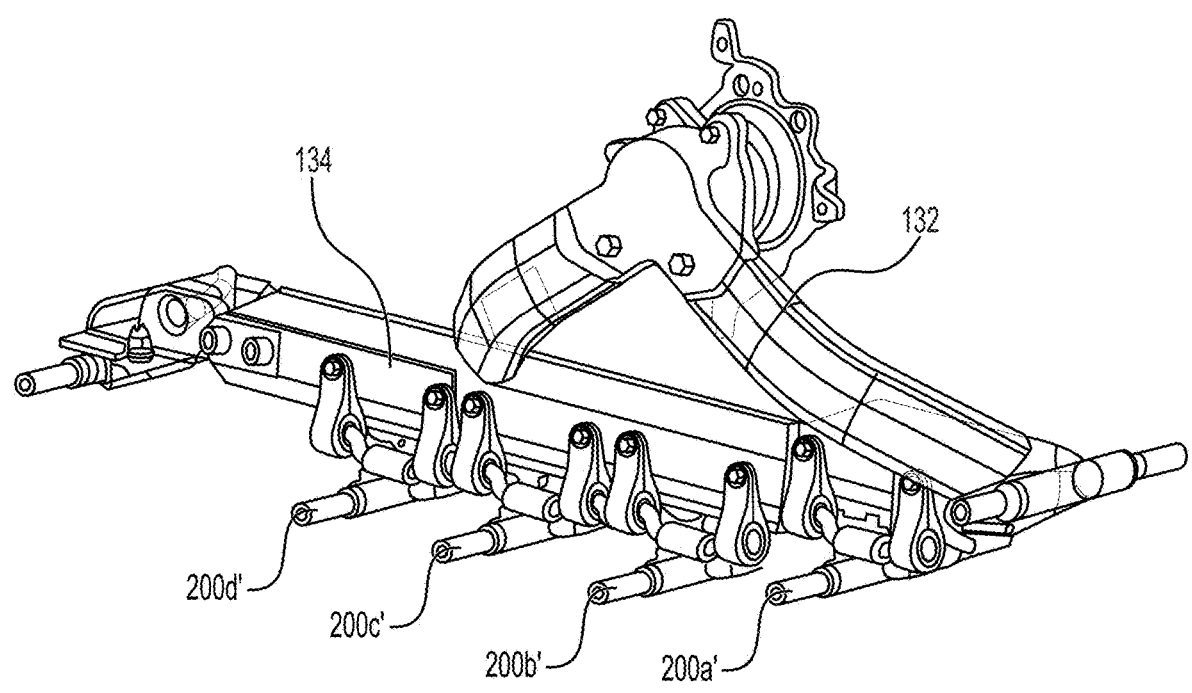
FIG. 8C is a perspective view taken from a front, top, right side of a portion of an alternative embodiment of the rear track system of FIG. 2B and having support structures according to another embodiment of the present technology.
Figure 9B:
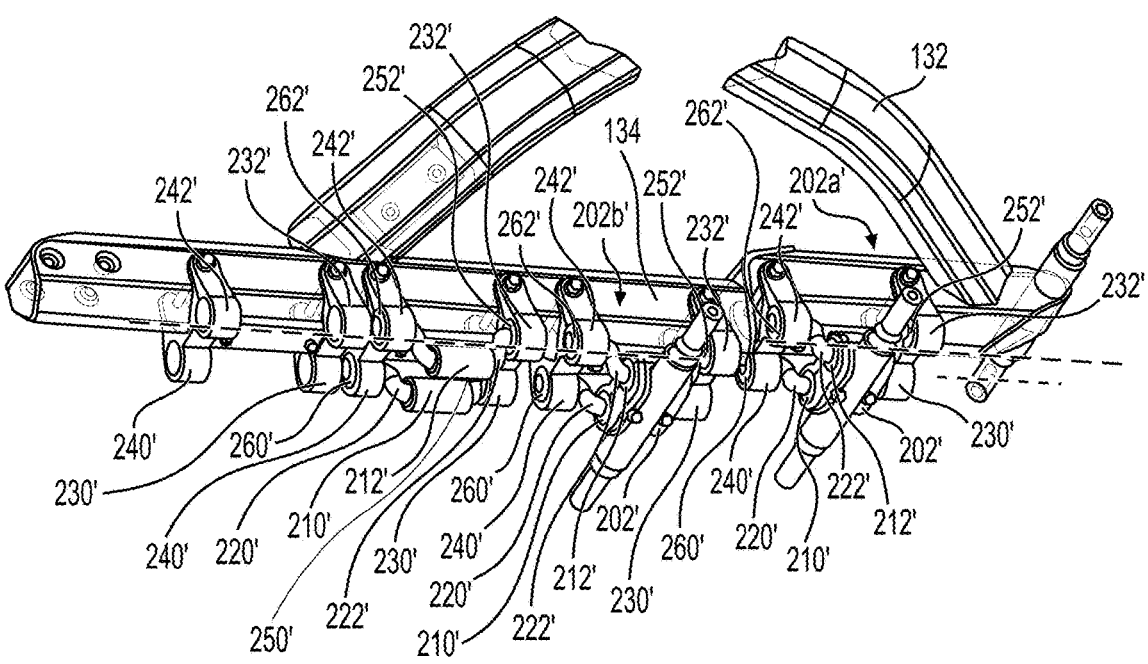
FIG. 9B is a perspective view taken from a rear, bottom, right side of the portion of the rear track system of FIG. 8C.

In the embodiment shown in FIGS. 8C and 9B, the support wheel assemblies 150*a*, 150*b*, 150*c*, 150*d* are also pivotally connected to the lower frame portion 134, such that each axle of the support wheel assemblies 150*a*, 150*b*, 150*c*, 150*d* is pivotable relative to the lower frame portion 134. More precisely, the support wheel assemblies 150*a*, 150*b*, 150*c*, 150*d* are respectively connected to the lower frame portion 134 by support structure 200*a'*, 200*b'*, 200*c'*, 200*d'*.

As the support structures 200*a'*, 200*b'*, 200*c'*, 200*d'* are similar, only the support structure 200*a'* will be described herewith. The support structure 200*a'* includes a connecting portion 202' that is operatively connected to the axle of the support wheel assembly 150*a*. In some embodiments, the axle of the support wheel assembly 150*a* and the connecting portion 202' could be integral.

The support structure 200*a'* also includes left and right resilient members 210', 212' that are respectively disposed in left and right apertures defined in the connecting portion 202'.

The support structure 200*a'* further includes left and right shafts 220', 222' that extend generally longitudinally and that are connected to, respectively, the left and right resilient members 210', 212'. Thus, the left and right shafts 220', 222' extend through the left and right apertures defined in the connecting portion 202'. The left and right shafts 220', 222' may be bent to create an offset between the left and right resilient members 210', 212' and the left and right leading connecting portions 230', 232', and the left and right trailing connecting portions 240', 242'. This offset forms a virtual pivoting point below the axle of the support wheel 150*a*, thus closer to the endless track 124 which may help reducing wear on said endless track 124.

The support structure 200*a'* also includes left and right leading connecting portions 230', 232', and left and right trailing connecting portions 240', 242'.

The support structure 200' also includes left and right leading resilient members 250', 252' that are respectively disposed in apertures defined in the left and right leading connecting portions 230', 232'.

The support structure 200' also includes left and right trailing resilient members 260', 262' that are respectively disposed in apertures defined in the left and right trailing connecting portions 240', 242'.

The left shaft 220' is connected to the lower frame portion 134 by the left leading and trailing connecting portion 230', 240'. The left leading and trailing resilient members 250', 260' are disposed between the left shaft 220' and the left leading and trailing connecting portion 230', 240'.

The right shaft 222' is connected to the lower frame portion 134 by the right leading and trailing connecting portion 232', 242'. The right leading and trailing resilient members 252', 262' are disposed between the right shaft 222' and the right leading and trailing connecting portion 232', 242'.

As described hereabove with reference to support structure 200*a*, the support structure 200*a'* is configured to allow pivotal motion of the support wheel assembly 150*a*. When the axle of the support wheel assembly 150*a* pivots, the resilient members 210', 210', 250', 252', 260', 262' resiliently deform. Upon deformation, the resilient members 210', 210', 250', 252', 260', 262' bias the axle of the support wheel assembly 150*a* toward an initial position. Thus, the support structure 200*a'* may enhance load distribution of the track system 20*c*, and can help the track system 20*c* to overcome obstacles, as described hereabove.

Briefly, in the embodiment shown in FIGS. 8B, 8C, 9A and 9B, the support structures 200*a*, 200*b*, 200*c*, 200*d*, 200*a'*, 200*b'*, 200*c'*, 200*d'* are configured to allow movement of each axle of the support wheel assemblies 150*a*, 150*b*, 150*c*, 150*d* (i.e., axis of rotation of the wheels of the support wheel assemblies), relative to the frame 130 and/or to the drive wheel assembly 140. Thus, upon impact (e.g. due to an obstacle crossing) on one of the support wheel assemblies 150*a*, 150*b*, 150*c*, 150*d*, the axis of rotation of the one of the support wheel assemblies 150*a*, 150*b*, 150*c*, 150*d*, is movable relative to the frame 130 and/or to the drive wheel assembly 140 from an initial/rest position to a plurality of directions that are transversal to one another. In some embodiments, translational movements relative to the frame 130 are allowed.

In other embodiments, the support structures 200*a*, 200*b*, 200*c*, 200*d*, 200*a'*, 200*b'*, 200*c'*, 200*d'* and other embodiments thereof are described in U.S. Provisional Application No. 63/080,135 filed Sep. 18, 2020 entitled "Support Structure for Connecting at Least One Support Wheel Assembly to a Frame Member of a Track System and Track System Having the Same", which is incorporated by reference herein in its entirety.

Tensioner

Figures 11A, 11B, 11C:
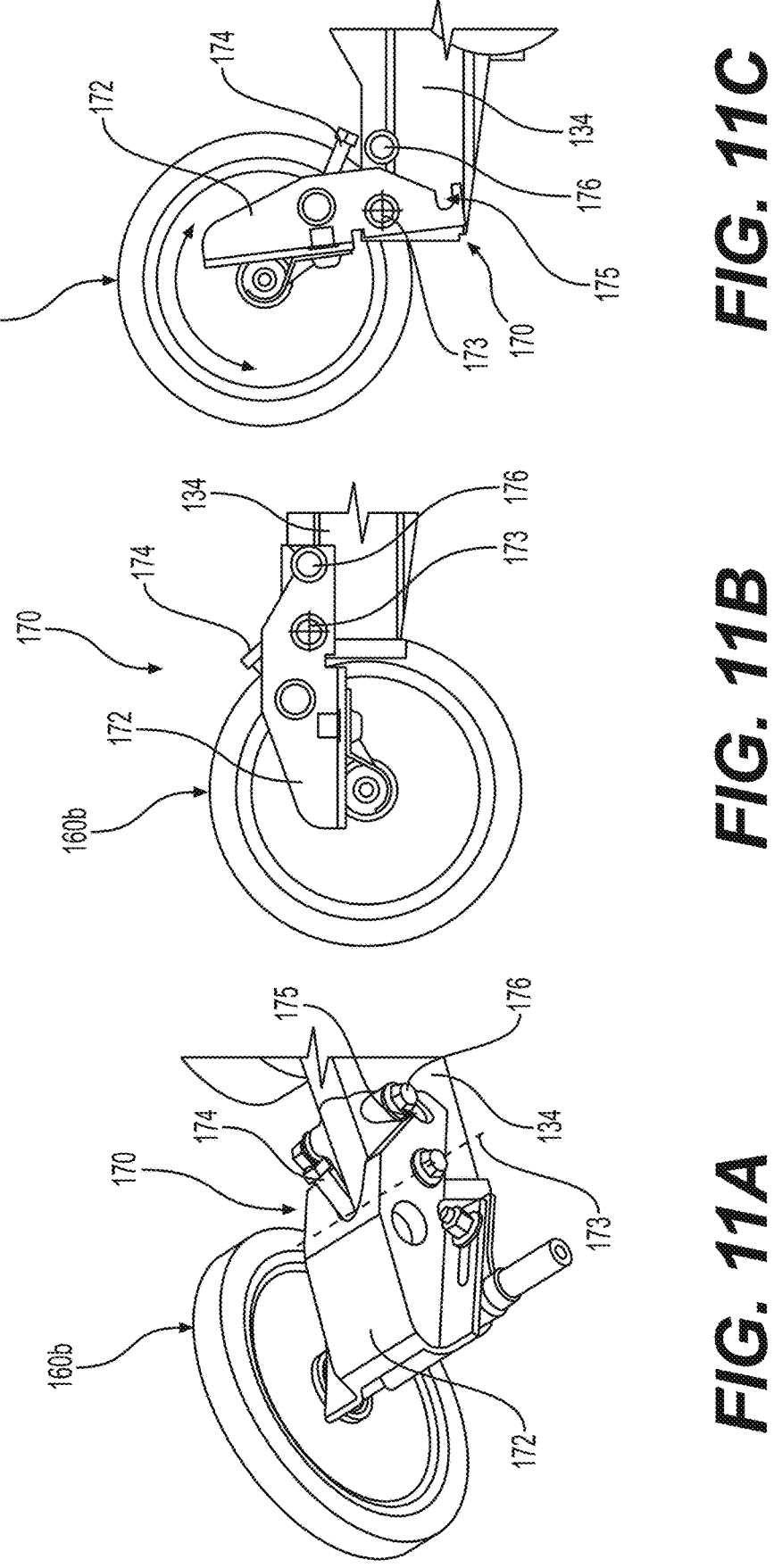
FIG. 11A is a perspective view taken from a rear, top, right side of a tensioner according to an embodiment of the present technology.
FIG. 11B is a right side elevation view of the tensioner of FIG. 11A in a first position.
FIG. 11C is a right side elevation view of the tensioner of FIG. 11A in a second position.

Referring to FIGS. 11A, 11B, 11C, in the present embodiment, the track system 20*c* also includes a tensioner 170 configured to adjust and maintain tension in the endless track 124. In some embodiments, the tensioner 170 could be omitted. The tensioner 170 is connected to the lower frame portion 132, at a rear end 121*b* of the track system 20*c*, and the trailing idler wheel assembly 160*b* is connected to the tensioner 170. In other words, the trailing idler wheel assembly 160*b* is connected to frame 130 by the tensioner 170. In some embodiments, the tensioner 170 could be connected to the front idler wheel assembly 160*a*. The trailing idler wheel assembly 160*b* is selectively movable, relative to the lower frame portion 134, away and toward therefrom (i.e., longitudinally forward and longitudinally rearward) such that the tension in the endless track 124 can be increased and decreased. When a desired tension is reached in the endless track 124, the tensioner 170 can also be locked to maintain the desired tension.

The tensioner 170 includes a body 172 and an adjuster 174.

The body 172 is pivotally connected to the lower frame member 134. More precisely, the body 172 can pivot about pivot axis 173 to induce tension or releasing tension in the endless track 124. The body 172 is also configured to connect to the axle of the rear idler wheel assembly 160b. The body 172 defines a recess 175 configured to engage a locking member 176 when the body 172 is in a nominal position. In the present embodiment, the locking member 175 is a fastener.

The adjuster 174, which is operatively connected to the body 172, is configured to engage and move the axle of the rear idler wheel assembly 160b away and toward the frame 130 to adjust tension within the endless track 124.

In FIG. 11A, the tensioner 170 is in an intermediate position. In FIG. 11B, the tensioner 170 in an extended position (nominal position) and is locked therein by the locking member 175. In the extended position, the endless track 124 is under tension. In FIG. 12C, the tensioner 170 in a contracted position, and tension in the endless track 124 has been released.

Support and Idler Wheel Assemblies

Referring to FIGS. 12, 13A, 13B, 14A, 14B, 15A, 15B, 16A, 16B, 17 and 18, the support and idler wheel assemblies 150a, 150b, 150c, 150d, 160c, 160d will now be described in greater detail. It is understood that the support and idler wheel assemblies described herewith, could be used with the front track systems 20a, 20b.

The support and idler wheel assemblies 150a, 150b, 150c, 150d, 160c, 160d are configured to support part of the weight of the ATV 10, to guide the endless track 124, and/or to adjust tension in the endless track 124. Each of the support and idler wheel assemblies 150a, 150b, 150c, 150d, 160c, 160d include laterally spaced left and right wheels 300a (only left wheel 300a shown in FIGS. 12, 13A, 13B, 14A, 14B, 15A, 15B, 16A, 16B, 17 and 18) that are configured to engage the endless track 124 on, respectively, wheel paths 614a, 614b (shown in FIGS. 28 and 30) of an inner side 600 of the endless track 124. The left and right wheels 300a, are rotationally connected to an axle by bearings 321a, 321b, as will be described below. On an inner side of each of the left and right wheels 300a (i.e., side of the left and right wheels 300a facing each other and facing a longitudinal center plane of the track system 20c), there is a seal assembly 400 connected to the left and right wheels 300a. On an outer side of each of the left and right wheels 300a (i.e., side of the left and right wheels 300a facing away from each other and facing away from the longitudinal center plane of the track system 20c) there is a protective cover assembly 450 connected to the left and right wheels 300a.

As will be described in greater detail below, the seal assembly 400 and the protective cover assembly 450 are configured to protect the wheels 300a from debris and water. Being that debris and water can cause wear and failure over time, the seal assembly 400 and the protective cover assembly 450 can help extend life of the support and idler wheel assemblies 150a, 150b, 150c, 150d, 160c, 160d.

Wheels

In some embodiments, the present technology provides wheels with enhances properties. Being that the left and right wheels 300a of the support and idler wheel assemblies 150a, 150b, 150c, 150d, 160c, 160d are similar and being that left and right wheels 300a of the support wheel assembly 150a are similar, only the left wheel 300a will be described herewith. Thus, it is understood that the features of the left wheel 300a described herebelow can be applied to various wheels such as a right wheel, a support wheel, an idler wheel or a single wheel.

Figure 12:
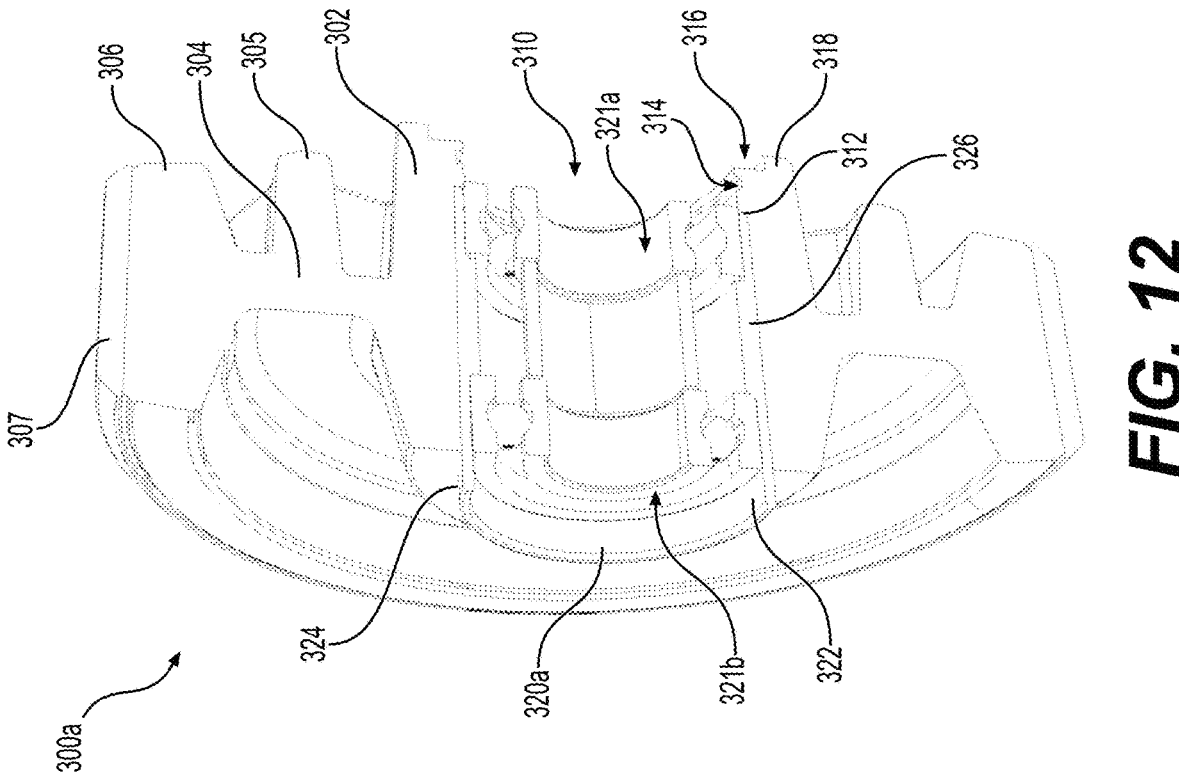
FIG. 12 is a perspective view of a cross-section of a wheel and a sleeve of the track systems of FIG. 1A according to embodiments of the present technology.

Referring to FIG. 12, a first embodiment of the wheel 300a is shown. The wheel 300a includes a hub 302, a body 304 and a rim 306. The body 304 extends radially outwardly from the hub 302 to the rim 306. In the present embodiment, the hub 302, the body 304 and the rim 306 are integral. In other embodiments, one or more of the hub 302, the body 304 and the rim 306 could be separate parts connected to one another.

The hub 302 defines a hub aperture 310. Towards one end of the hub aperture 310, the hub 302 has a shoulder 312. The hub 302 further defines a groove 314 configured to receive a retaining ring. Additionally, the hub 302 defines a receiving portion 316 configured to receive a portion of the protective cover assembly 450, which will be described in greater detail below. In addition, the hub 302 has a circular lip 318 surrounding the receiving portion 316. It is contemplated that in some embodiments, the shoulder 312, the groove 314, the receiving portion 316 and/or the circular lip 318 could be omitted. It is also contemplated that in some embodiments, the hub 302 could have more features, such that it could be configured to receive additional components such as retaining rings, caps and/or sleeves.

The wheel body 304 has a rib 305 extending perpendicularly therefrom. It is believed that the rib 305 strengthens the wheel 300a. However, it is contemplated that in some embodiments, the rib 305 could be omitted. It is also contemplated that in some embodiments, the body 304 could define recesses and/or apertures to reduce manufacturing costs of the wheel 300a.

An outer layer 307 is disposed around the rim 304. The outer layer 307 is configured to increase friction between the wheel and the endless track 124. Additionally, the outer layer 307 can help reduce wear on the rim 306 of the wheel. In some embodiments, a shape of the outer layer 307 could be configured to reduce wear on the endless track 124. In some embodiments, the outer later 307 could be omitted.

The hub 302, the body 304 and the rim 306 are made of a first material. It is contemplated that in some embodiments, one or more of the hub 302, the body 304 and the rim 306 could be made of two or more different material. In the present embodiment, the first material is a polymeric material such as Ultra High Molecular Weight Polyethylene (UHMW-PE, UHMW). It is understood the that first material could be another material.

The outer layer 307, which is made of a second material different from the first material, is typically softer (e.g., rubber) than the material of the hub 302, the body 304 and the rim 306. In some cases, however, the material of the outer layer 307 (i.e., the second material) could be more rigid (e.g., nylon) than the material of the hub 302, the body 304 and the rim 306.

The wheel 300a includes a sleeve 320a that is generally tubular and that is configured to be received in the hub aperture 310. One end of the sleeve 320a abuts the shoulder 312 of the hub 302. The sleeve 320a has an inner surface 322 and an outer surface 324. The sleeve 320a has, projecting from the inner surface 322, a central abutting portion 326. In some embodiments, the central abutting portion 326 could be omitted. As will be described below, the sleeve 320a could include various features in addition to the central abutting portion 321, such as protrusions, raised portions, cavities, through apertures, grooves and/or shoulders. The other end of the sleeve 320a projects outwardly from wheel hub 302. As will be described below, a seal of the sealing assembly 400 can be disposed around the portion of the sleeve 320a projecting outwardly from the wheel 302.

The sleeve 320a is typically made of a third material that is more rigid than the first and second material. For instance, in some embodiments, the sleeve 320a can be made of a metallic material (e.g., steel). In other embodiments, the sleeve 320a could be made of polymeric material. In such embodiments, the sleeve 320a can be manufactured by injection process, which is generally cost-efficient. It is understood that other manufacturing processes could be used as well. In some other embodiments, the sleeve 320a could be made of a composite material including at least a matrix material such as polymeric resin, UHMW or other plastics and a reinforcing material such as glass fiber and carbon fiber. Composite materials with high creep resistance are particularly suited for construing the sleeve 320a.

In the present embodiment, the hub 302 is molded around the sleeve 320a. It is contemplated that in some embodiments, the hub 302 could not be molded around the sleeve 320a, and could be connected differently, such as, for instance, with an adhesive or by being press-fitted within the hub aperture 310. Molding the hub 302 around the sleeve 320a can reduce manufacturing costs when compared to mechanically and/or chemically connecting the sleeve 320a to the hub 302. Additionally, molding the hub 302 around the sleeve 320a provides a strong connection between the hub 302 and the sleeve 320a (i.e., the sleeve 320a is rotationally fixed relative to the hub 302). In some embodiments, an adhesive, a plating and/or a fastener can be used in addition to the molding connection to further strengthen the connection between the sleeve 320a and the hub 302.

The sleeve 320a is configured to receive two bearings 321a, 321b therein, where the two bearings 321a, 321b are configured to connect to an axle. It is contemplated that in some embodiments, the sleeve 320a could be configured to receive a single bearing or three or more bearings. In some instances, the bearings 321a, 321b are received in the sleeve 320a in a pressfit configuration. When the bearings 321a, 321b are received in the sleeve 320a, the bearings 321a, 321b respectively abut first and second ends of the central abutting portion 326 upon reaching pre-determined positions. Thus, the central abutting portion 326 help position the bearings 321a, 321b within the sleeve 320a.

Between the two bearings 321a, 321b, the wheel 300a also includes a central sleeve 321c configured to connect to the axle. The central sleeve 321c can help to distribute load applied to the bearings 321a, 321b to increase durability of the wheel 300. In other words, the central sleeve 321c could act as a reinforcing element. Also, the central sleeve 321c can help keep the bearings 321a, 321b in place. Furthermore, the central sleeve 321c can help prevent the bearing to rotate on the shaft.

During use, the wheel 300a sustains impacts due to bumps, road conditions, weight of the ATV 10, and other obstacles. These impacts can damage the hub 302, and require replacement of the wheel 300a even if the rest of the wheel 300a (e.g., the body 304, the rim 306 and the outer layer 307) is in good condition. For instance, due to a hard impact, the axle can become loose in the hub 302. This is particularly problematic when the hub 302 is made of polymeric material that can deform more easily. The sleeve 320a is configured to spread the effects of these impacts along a length of the hub 302. In other words, the sleeve 320a helps to distribute the force resulting from these impacts along a larger area than when the sleeve is not present, thereby reducing pressure induced in the hub 302. Thus, the sleeve 320a reduces stress peaks in the hub 302. The sleeve 320a being made of a generally rigid material, as described above, can help the sleeve 320a to distribute the force sustained by the impacts without causing deformation of one or more portion of the wheel as well as without causing deformation of the sleeve 320a itself. In some embodiments, the sleeve 320a increases the area of contact surface between the bearings 321a, 321b and the hub 302 by at least about 1.25 times. In other embodiments, the sleeve 320a increases the area of contact surface between the bearings 321a, 321b and the hub 302 by at least about 1.5 times. In yet other embodiments, the sleeve 320a increases the area of contact surface between the bearings 321a, 321b and the hub 302 by at least about 2.0 times. In other embodiments, the sleeve 320a increases the area of contact surface between the bearings 321a, 321b and the hub 302 by at least about 2.5 times.

Figure 13B:
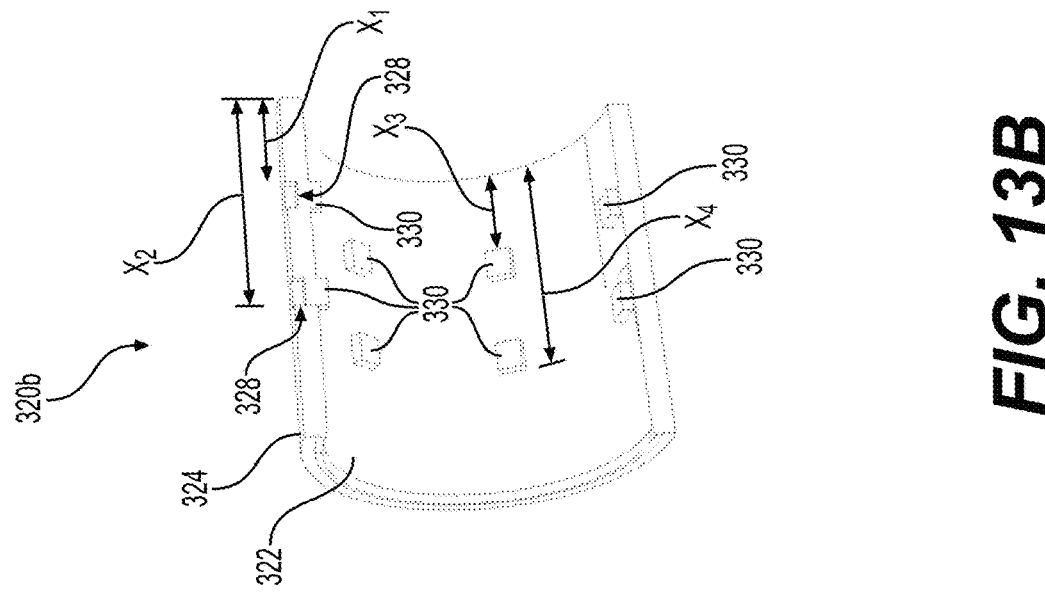
FIG. 13B is a perspective view of a cross-section of the sleeve of FIG. 13A.
Figure 13A:
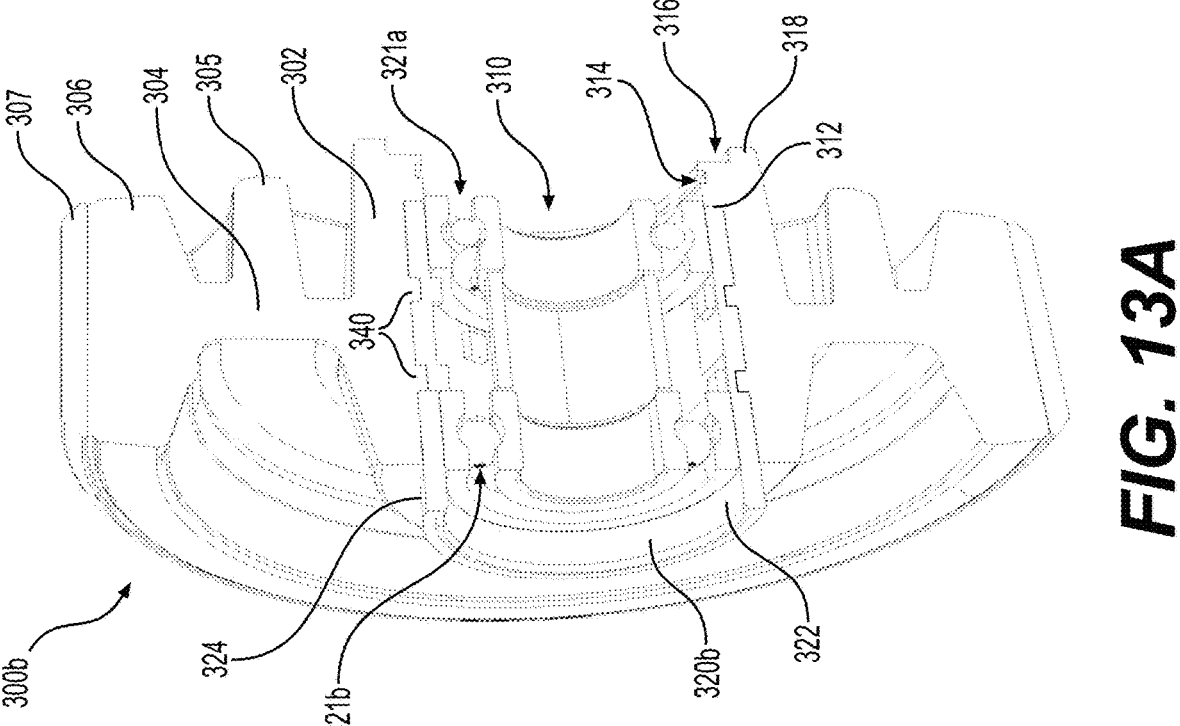
FIG. 13A is a perspective view of a cross-section of alternative embodiments of the wheel and the sleeve of FIG. 12.

Referring to FIGS. 13A and 13B, alternative embodiments of the wheel 300a and the sleeve 320a, namely wheel 300b and sleeve 320b, are shown. Features of the wheel 300b and the sleeve 320b that are similar to those of the wheel 300a and the sleeve 320a have been labeled with the same reference numerals and will not be described again in detail.

In this embodiment, the sleeve 320b does not have the central abutting portion 326. Instead, the sleeve 320b defines two sets of angularly spaced (i.e., circumferentially spaced) cavities 328 on the outer surface 324 of the sleeve 320b, and two sets of angularly spaced (i.e., circumferentially spaced) sleeve protrusions 330 on the inner surface 322 of the sleeve 320b. Each one of the cavities 328 is aligned with one of the sleeve protrusions 330. It is contemplated that this might not be the case in other embodiments.

The cavities 328 are equally angularly spaced, and the cavities 328 of the two sets of cavities are angularly aligned (i.e., cavities 328 of one set are not angularly offset from cavities 328 of the other set). The first set is at a distance X1 from one end of the sleeve 320b, and the second set is at a distance X2 from the one end of the sleeve 320b. Other configurations could be considered as well. For instance, the cavities 328 of one set could be angularly offset from the cavities 320b of the other set.

Similarly, the sleeve protrusions 330 are equally angularly spaced, and the sleeve protrusions 330 of the two sets of sleeve protrusions are angularly aligned (i.e., sleeve protrusions 330 of one set are not angularly offset from the sleeve protrusions 330 of the other set). The first set is at a distance X3 from one end of the sleeve 320b, and the second set is at a distance X4 from the one end of the sleeve 320b. Other configurations could be considered as well. For instance, the sleeve protrusions 330 of one set could be angularly offset from the sleeve protrusions 330 of the other set. When the bearings 321a, 321b are received in the sleeve 320b, the bearings 321a, 321b abut the sleeve protrusions 330 upon reaching a pre-determined position. Thus, the sleeve protrusions 330 help position the bearings 321a, 321b within the sleeve 320b.

In the present embodiment, the hub 302 of the wheel 300b has, extending radially from the inner surface 322 thereof, hub protrusions 340. The hub protrusions 340 are configured to be received in the cavities 328, thereby providing a mechanical lock between the sleeve 320b and the hub 302 of the wheel 300b for restraining relative movement therebetween. In some embodiments, the interlocking connection between the wheel 300b and the sleeve 320b is facilitated by the wheel 300b being molded around the sleeve 320b.

Referring to FIGS. 14A and 14B, alternative embodiments of the wheels 300*a*, 300*b* and the sleeves 320*a*, 320*b*, namely wheel 300*c* and sleeve 320*c*, are shown. Features of the wheel 300*c* and the sleeve 320*c* that are similar to those of the wheels 300*a*, 300*b* and the sleeve 320*a*, 320*b* have been labeled with the same reference numerals and will not be described again in detail.

In this embodiment, the sleeve 320*c* does not have the central abutting portion 326. Instead, the sleeve 320*c* defines three rows of through apertures 332. The through apertures 332 of each one of the three rows are angularly spaced (i.e., circumferentially spaced) by equal angular increments. The through apertures 332 of the intermediate row are angularly offset from the through apertures 332 of the other rows. Other configurations could be considered. For instance, in some embodiments, the through apertures 332 of the three rows could all be aligned. The plurality of through apertures 332 can be made in various ways, such as, for example, punching or drilling.

In this embodiment, the hub 302 of the wheel 300*c* also has the hub protrusions 340 that extend radially from the inner surface 322 of the hub 302. However, in this embodiment, the hub protrusions 340 extend through the through apertures 332, and then merge to form a radially-extending portion 342 (feasible as, in this embodiment, the wheel 300 is molded around the sleeve 320).

The connection between the hub protrusions 340 and the through apertures 332, as described above, provides a mechanical lock between the sleeve 320 and the hub 302 for restraining relative movement therebetween, whereas the radially-extending portion 342 is configured to engage with the central sleeve 321*c*. The engagement between the radially-extending portion 342 and the central sleeve 321*c* can further help distribute the forces induced by impacts along the hub 302. Additionally, when the bearings 321*a*, 321*b* are received in the sleeve 320*c*, the bearings 321*a*, 321*b* abut the hub protrusions 340 upon reaching a pre-determined position. Thus, the hub protrusions 340 help position the bearings 321*a*, 321*b* within the sleeve 320*c*. It is contemplated that in some embodiments, the bearings 321*a*, 321*b* could abut the radially-extending portion 342, such that the radially-extending portion 342 could help position the bearings 321*a*, 321*b*.

Figure 15B:
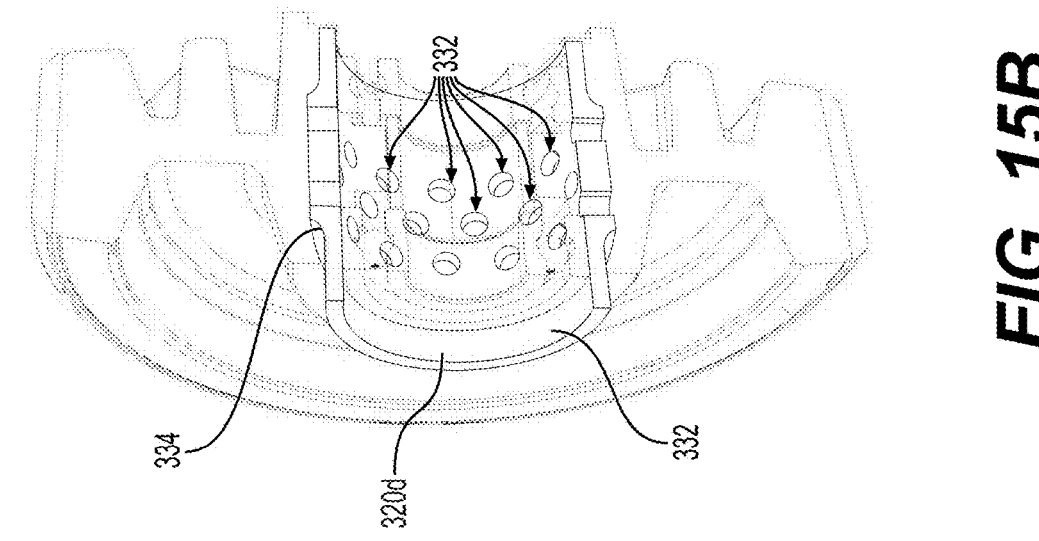
FIG. 15B is a perspective view of a cross-section of the sleeve of FIG. 15A.
Figure 15A:
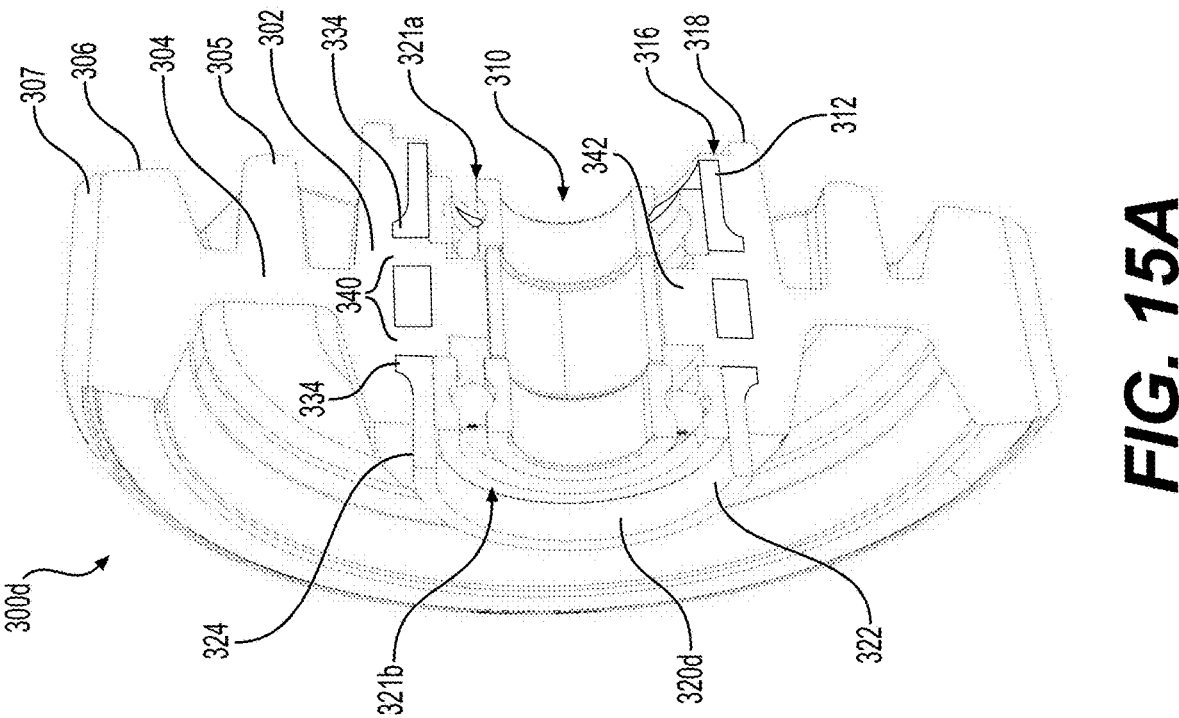
FIG. 15A is a perspective view of a cross-section of alternative embodiments of the wheel and the sleeve of FIG. 12.

Referring to FIGS. 15A and 15B, alternative embodiments of the wheels 300*a*, 300*b*, 300*c* and the sleeves 320*a*, 320*b*, 320*c*, namely wheels 300*d* and sleeve 320*d*, are shown. Features of the wheel 300*d* and the sleeve 320*d* that are similar to those of the wheels 300*a*, 300*b*, 300*c* and the sleeves 320*a*, 320*b*, 320*c* have been labeled with the same reference numerals and will not be described again in detail.

In this embodiment, the sleeve 320*d* does not have the central abutting portion 326. Instead, the sleeve 320*d*, like the sleeve 320*c*, defines three rows of the through apertures 332. The through apertures 332 of each of the three rows are angularly spaced, and the through apertures 332 of the intermediate row are angularly offset from the through apertures 332 of the other rows. The sleeve 320*d* also has a raised portion 334 extending from the outer surface 324 thereof. The raised portion 334 is disposed generally at a center of the sleeve 320*d*.

In this embodiment, the hub 302 of the wheel 300*d* also has the hub protrusions 340 that extend radially from the inner surface 322 of the hub 302. The hub protrusions 340 merge to form the radially-extending portion 342 (feasible as, in the present embodiment, the wheel 300*d* is molded around the sleeve 320*d*). The hub 302 is also configured to receive the raised portion 334 (also feasible as the wheel 300*d* is molded around the sleeve 320*d*).

The connection between the hub protrusions 340 and the through apertures 332 as well as the connection between the raised portion 334 and the hub 302 provide a mechanical lock between the sleeve 320*d* and the hub 302 for restraining relative movement therebetween, whereas the radially-extending portion 342 is configured to engage with the central sleeve 321*c*. The engagement between the radially-extending portion 342 and the central sleeve 321*c* can further help distribute the forces induced by impacts along the hub 302.

Referring to FIGS. 16A and 16B, alternative embodiments of the wheels 300*a*, 300*b*, 300*c*, 300*d* and the sleeves 320*a*, 320*b*, 320*c*, 320*d*, namely wheel 300*e* and sleeve 320*e*, are shown. Features of the wheel 300*e* and the sleeve 320*e* that are similar to those of the wheels 300*a*, 300*b*, 300*c*, 300*d* and the sleeves 320*a*, 320*b*, 320*c*, 320*d* have been labeled with the same reference numerals and will not be described again in detail.

In this embodiment, the sleeve 320*e* does not have the central abutting portion 326. However, like in the sleeve 320*d*, the sleeve 320*e* has the raised portion 334 that extends from the outer surface 324. In this embodiment, the sleeve 320*e* defines a single row of angularly spaced (i.e., circumferentially spaced) through apertures 336. The through apertures 336 are larger in diameter than the through apertures 334 of the sleeves 320*c*, 320*d*. In some instances, the through apertures 336 are angularly spaced by equal angular increments. Additionally, the through apertures 336 are defined within the raised portion 334. In some embodiments, the through apertures 336 could be defined elsewhere than within the raised portion 334.

In this embodiment, the hub 302 of the wheel 300*e* has the hub protrusions 340 that extend radially from the inner surface 322 of the hub 302. In the present embodiment, the hub protrusions 340 are configured to extend through the through apertures 336. The hub protrusions 340 merge to form the radially-extending portion 342 (the hub 302 could be molded around the sleeve 320*e*). The hub 302 is also configured to receive the raised portion 334 (the hub 302 could be molded around the sleeve 320*e*). In this embodiment, the groove 314 is omitted from the wheel 300*e*. It is contemplated that in some embodiments, the groove 314 could be defined in the wheel 300*e*.

The connection between the hub protrusions 340 and the through apertures 336 as well as the connection between the raised portion 334 and the hub 302 provide a mechanical lock between the sleeve 320*e* and the hub 302 for restraining relative movement therebetween, whereas the radially-extending portion 342 is configured to engage with the central sleeve 321*c*. The engagement between the radially-extending portion 342 and the central sleeve 321*c* can further help spread the forces induced by impacts along the hub 302.

Figure 17:
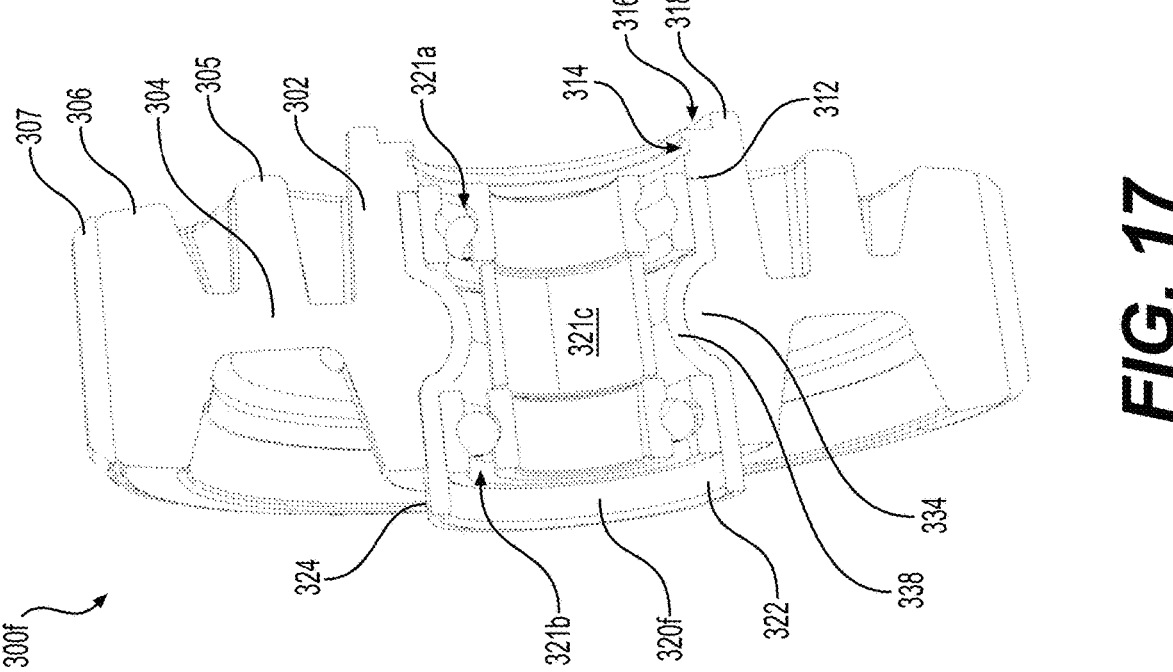
FIG. 17 is a perspective view of a cross-section of alternative embodiments of the wheel and the sleeve of FIG. 12.

Referring to FIG. 17, alternative embodiments of the wheels 300*a*, 300*b*, 300*c*, 300*d*, 300*e* and the sleeves 320*a*, 320*b*, 320*c*, 320*d*, 320*e*, namely wheel 300*f* and sleeve 320*f*, are shown. Features of the wheel 300*f* and the sleeve 320*f* that are similar to those of the wheels 300*a*, 300*b*, 300*c*, 300*d*, 300*e* and the sleeves 320*a*, 320*b*, 320*c*, 320*d*, 320*e* have been labeled with the same reference numerals and will not be described again in detail.

In this embodiment, the sleeve 320*f* does not have the central abutting portion 326. However, the sleeve 320*f* has a concave portion 338. In other embodiments, the sleeve 320*f* could have a convex portion. In some embodiments, the concave portion 338 could be configured to engage the central sleeve 321*c*.

In this embodiment, the hub 302 of the wheel 300f has an engaging portion 344 that is complementary to the concave portion 338.

The engagement between the concave portion 338 and the engaging portion 344 provides a mechanical lock between the sleeve 320f and the hub 302 for restraining relative movement therebetween.

Figure 18:
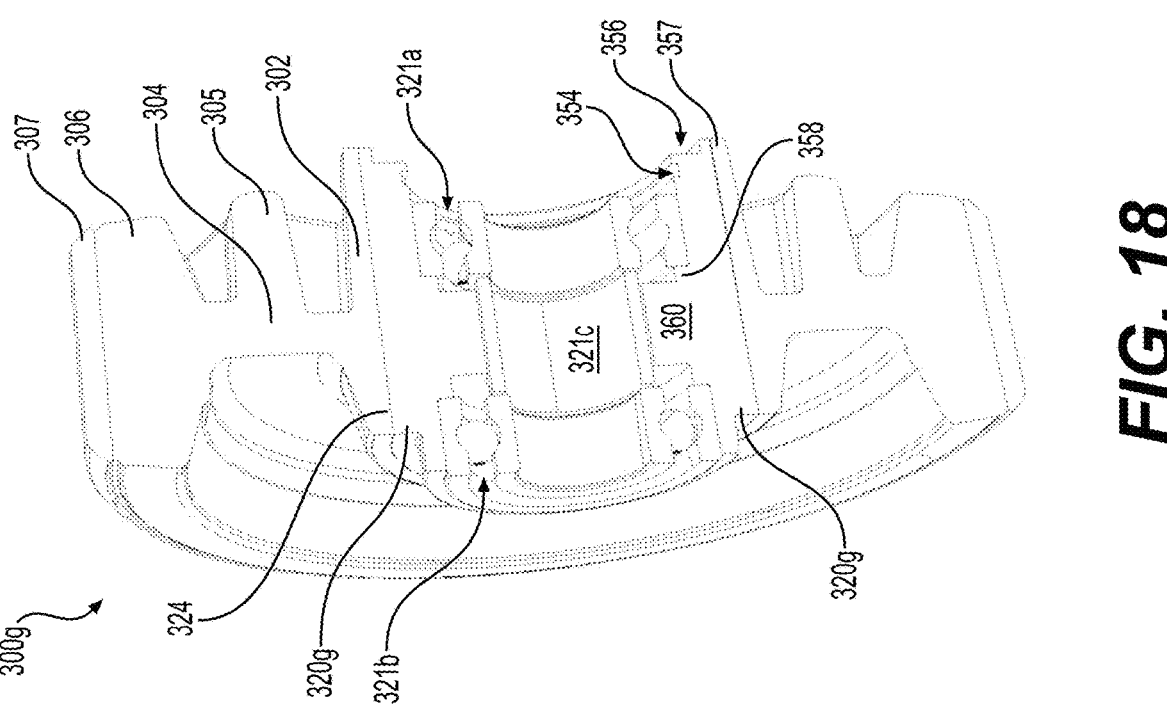
FIG. 18 is a perspective view of a cross-section of alternative embodiments of the wheel and the sleeve of FIG. 12.

Referring to FIG. 18, alternative embodiments of the wheels 300a, 300b, 300c, 300d, 300e, 300f and the sleeves 320a, 320b, 320c, 320d, 320e, 320f, namely wheel 300g and sleeve 320g, are shown. Features of the wheel 300g and the sleeve 320g that are similar to those of the wheels 300a, 300b, 300c, 300d, 300e, 300f and the sleeves 320a, 320b, 320c, 320d, 320e, 320f have been labeled with the same reference numerals and will not be described again in detail.

In this embodiment, as will be described below, the sleeve 320g includes features that were part of the hub 302 of the wheels 300, 300a, 300b, 300c, 300d, 300d. Specifically, the wheel 300g does not have the shoulder 312, does not define the groove 314 and does not define the receiving portion 316. Instead, the sleeve 320g defines a groove 354 configured to receive a retaining ring. Additionally, the sleeve 320g defines a receiving portion 356 configured to receive a portion of the protective cover assembly 450. Surrounding the receiving portion 356, the sleeve 320g has a lip 357. The sleeve 320g also includes a central abutting portion 358 which extends radially from the inner surface 322 of the sleeve 320g, and a radially-extending portion 360, which extends radially from the central abutting portion 358.

When the bearings 321a, 321b are received in the sleeve 320g, the bearings 321a, 321b abut first and second ends of the central abutting portion 358 upon reaching a pre-determined position. Thus, the central abutting portion 358 help position the bearings 321a, 321b within the sleeve 320g.

The radially-extending portion 360 is configured to engage with the central sleeve 321c, which can help spread effects of impacts of obstacles, bumps, or the like, along the hub 302.

Although, cavities, protrusions, through apertures, concave portions are described in relation with the configurations of the wheels of the present technology, it is understood that other such variations and/or combination thereof could be considered without departing from the scope of the present technology. As mentioned above, these features can help to restrain relative movement between the hub 302 of the wheels 300a, 300b, 300c, 300d, 300e, 300f, 300g and the respective sleeves 320a, 320b, 320c, 320d, 320e, 320f, 320g. The mechanical interlocking relationship is facilitated by the hub 302 being molded around the sleeves 320a, 320b, 320c, 320d, 320e, 320f, 320g. In some embodiments, the mechanical interlocking relationship could restrain all degrees of freedom of movement of the hub 302 relative to the sleeves 320a, 320b, 320c, 320d, 320e, 320f, 320g. In other embodiments, the mechanical interlocking relationship could restrain one or more, but not all, degrees of freedom of movement of the hub 302 relative to the sleeve 320a, 320b, 320c, 320d, 320e, 320f, 320g.

Seal Assembly

Figure 19A:
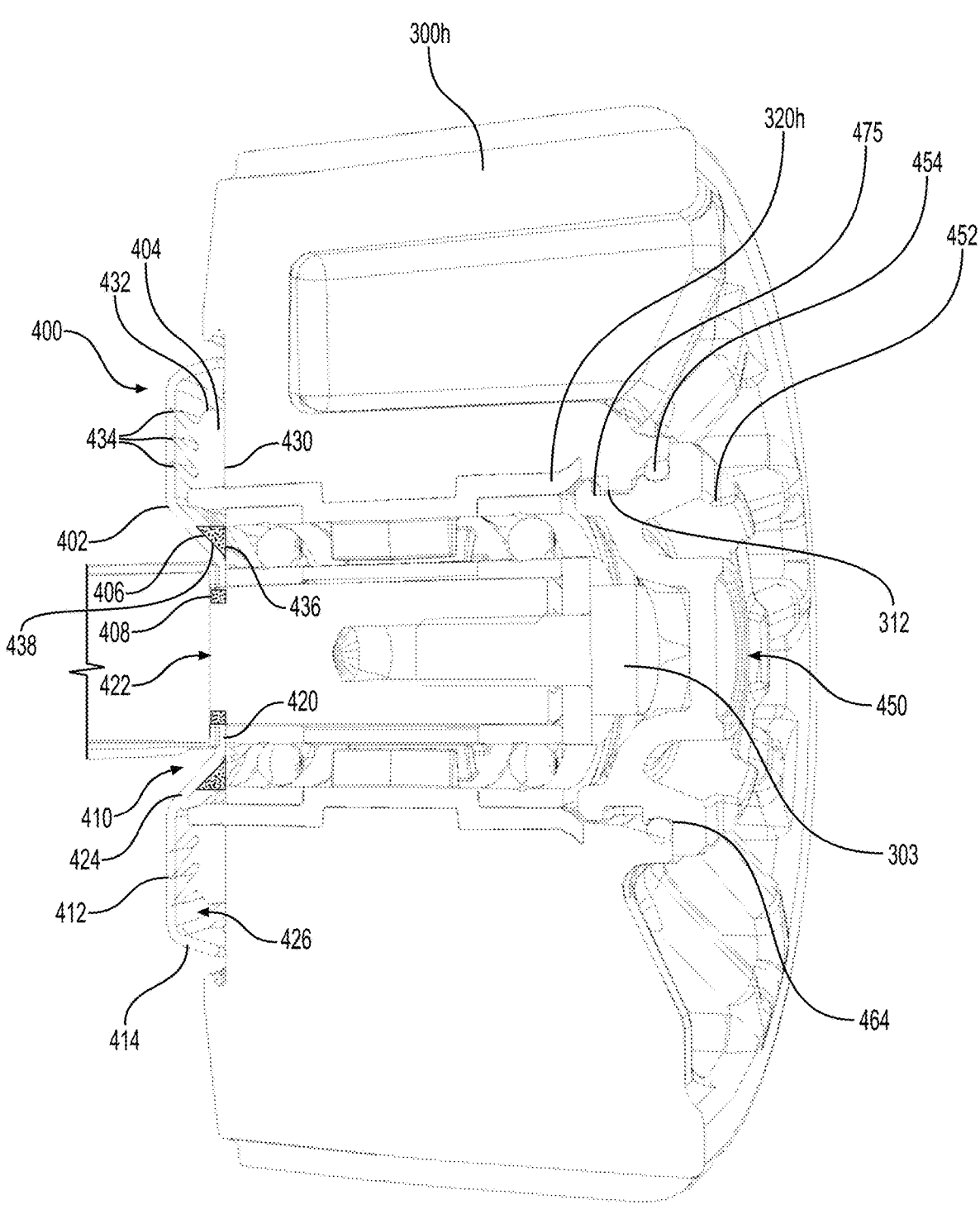
FIG. 19A is a perspective view of a cross-section of a wheel assembly of the track systems of FIG. 1A according to an embodiment of the present technology, the wheel assembly including a seal assembly and a protective cover assembly.
Figure 19B:
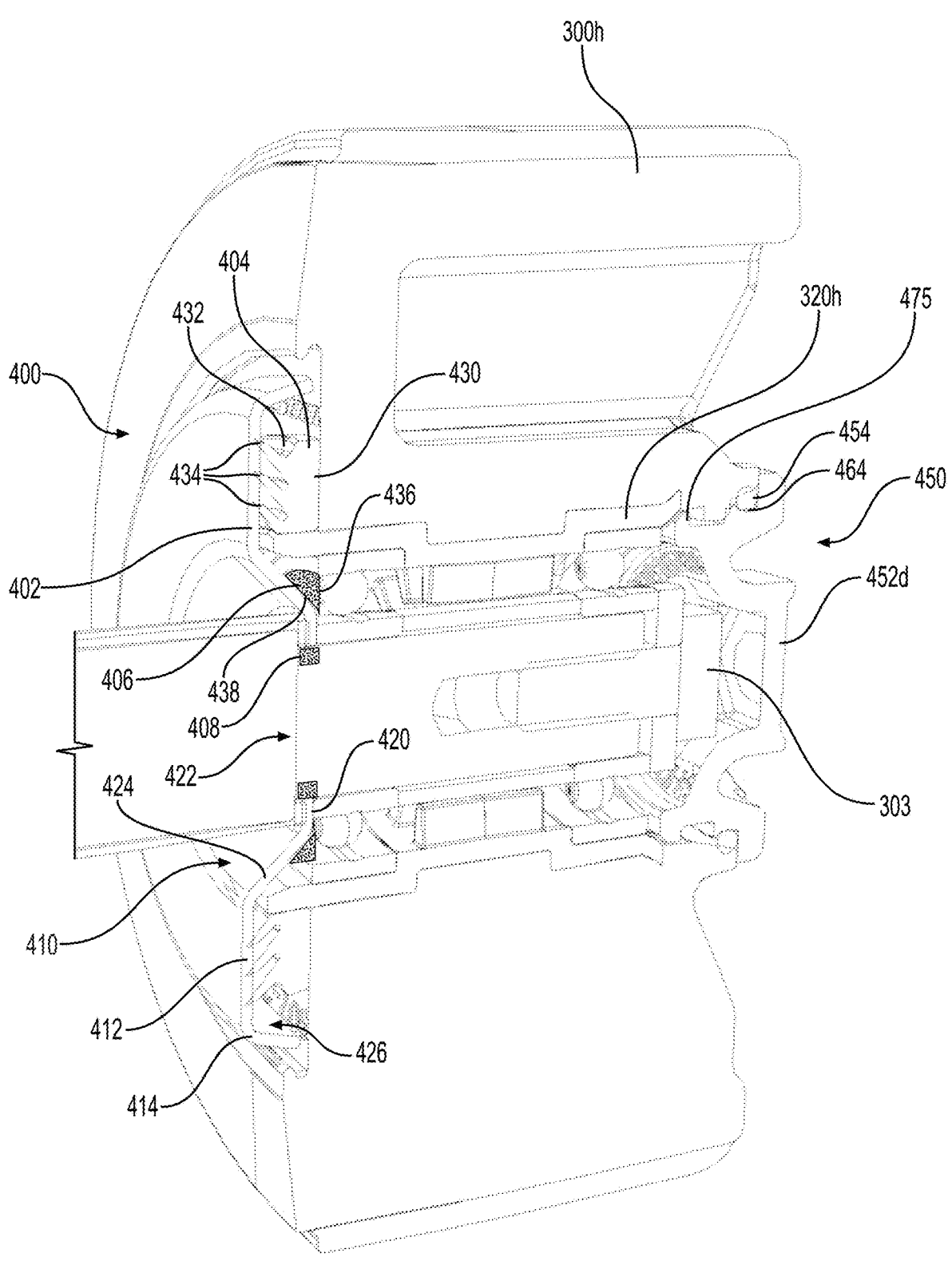
FIG. 19B is a perspective view of a cross-section of the wheel assembly of FIG. 19A.

Referring to FIGS. 19A and 19B, the seal assembly 400 will now be described in greater detail. As mentioned above, the seal assembly 400 is present in each of the support and idler wheel assemblies 150a, 150b, 150c, 150d, 160a, 160b. As mentioned above, it is understood that the seal assembly described herewith could be used with support and idler wheel assemblies 50a, 50b, 50c, 60a, 60b of the front track systems 20a, 20b. It is contemplated that in some embodiments, the seal assembly 400 could be present in only some of the support and idler wheel assemblies 150a, 150b, 150c, 150d, 160c, 160d. Being that the seal assembly 400 of each of the support and idler wheel assemblies 150a, 150b, 150c, 150d, 160c, 160d is similar, the seal assembly 400 will be described with reference to the support wheel assembly 150a.

The support wheel assembly 150a shown in FIGS. 19A and 19B include alternative embodiments of the wheels 300a, 300b, 300c, 300d, 300e, 300f, 300g and the sleeves 320a, 320b, 320c, 320d, 320e, 320f, 320g, namely wheel 300h and sleeve 320h. The wheel 300h is connected to an axle by a fastener 303, as shown in FIGS. 19A and 19B. The fastener 303 is selectively connected to the wheel 300h such that the wheel 300h can be disconnected from the axle. As will be described below, this can facilitate maintenance operations of the wheel 300h. The wheel 300h and the sleeve 320h will not be described any further herewith. Furthermore, it is understood that the seal assembly 400 according to the present technology could be used with wheels different from the wheels 300a, 300b, 300c, 300d, 300e, 300f, 300g described hereabove. For instance, the seal assembly 400 could be used with wheels not having a sleeve.

The seal assembly 400 is disposed on an inner side of the wheel 300h (i.e., side facing a longitudinal center plane of the track system 20c). The seal assembly 400 includes a sealing cap 402, a face seal 404, a bearing seal 406 and an inner seal 408.

The sealing cap 402, which is typically made of sheet metal, has an annular shape. More precisely, the sealing cap 402 has an inner recessed section 410, an intermediate section 412 extending radially outwardly from the inner recessed section 410 and a surrounding section 414 extending radially outwardly from the intermediate section 412.

Focusing first on the inner recessed section 410, the inner recessed section 410 has a planar portion 420 surrounding, and thus defining, an aperture 422 that is configured to receive the wheel axle of the wheel assembly 105a therethrough. The inner recessed section 410 also has an angled portion 424 that extends radially outwardly from the planar portion 420 at an angle therefrom (i.e., away from the wheel 300h).

The intermediate section 412 is generally planar, and extends radially outwardly from the angled portion 424. The intermediate section 412 is generally parallel with the planar portion 420.

The surrounding section 414, which extends radially outwardly from the intermediate section 412, is angled such that the surrounding section 414 extends toward the wheel 300h. The surrounding section 414 is configured to abut the wheel 300h.

The angled portion 424 of the inner recessed section 410, the intermediate section 412 and the surrounding section 414 define, together, an annular inner recess 426, which, as will be described below, is configured to receive the face seal 404 when the seal assembly 400 is connected to the wheel 300h.

The face seal 404, which is annular for receiving the axle of the wheel assembly 150a therethrough, is made of an elastomeric material such as rubber. The face seal 404 has a first side 430 that is generally flat and a second side 432 from which lips 434 extend generally perpendicularly to the first side 430. Although three lips are shown in this embodiment, it is contemplated that in some embodiments, there could be one, two or four or more lips. However, having two or more lips 434 typically provide a better barrier against dust, water and debris than a single lip. As shown in FIGS. 19A and 19B, when the seal assembly 400 is connected to the wheel 300h, an inner radial surface of the face seal 404 tightly engages the portion of the sleeve 320*h* extending from the hub aperture 310. Additionally, the lips 434 are resiliently deformed by the sealing cap 402, thereby providing the seal. The first side 430 of the face seal 404 engages the wheel 300*h*.

The bearing seal 406, which is also annular for receiving the axle of the wheel assembly 150*a* therethrough, is made of an elastomeric material such as rubber. The bearing seal 406 has a first side 436 and a second side 438. When the seal assembly 400 is assembled, the first side 436 engages the inner bearing 321*a*, and the second side 438 engages the sealing cap 402.

The inner seal 408, which is also annular for receiving the axle of the wheel assembly 150*a* therethrough, is disposed on a radially inner surface of the planar portion 420 (i.e., around the aperture 422). The inner seal 408 is configured to sealingly engage the wheel axle of the wheel assembly 150*a*. In some embodiments, the inner seal 408 could be an adhesive such as Loctite.

When the seal assembly 400 is connected with the wheel 300*h*, the inner bearing 408 is disposed on the inner radial surface of the planar portion 420 and is in sealing engagement with the axle of the wheel assembly 150*a*. The first side 436 of the seal bearing 406 engages the bearing 321*a* and the second side 438 engages the angled portion 424 of the sealing cap. The seal bearing 406 is compressed, such that the seal bearing 406 is in sealing engagement with the bearing 321*a* and the sealing cap 402. The face seal 404 is received in the inner recess 426, the first side 430 engages the wheel 300 and the second side 432 engages the intermediate section 412. The face seal 404 is compressed, such that the face seal 404 is in sealing engagement with the wheel 300 and the sealing cap 402. The surrounding section 414 engages the wheel 300, thereby enclosing the face seal 404 within the inner recess 426.

In the present embodiment of the seal assembly 400, the seal cap 400 and the inner seal 408 are connected to the axle (i.e., the axle is received through the aperture 422, the inner seal 408) and both the face seal 404 and the bearing seal 406 are connected to the wheel 300*h* or the seal cap 402, before the wheel 300*h* is connected to the axle. As the wheel 300*h* is connected to the axle, the face seal 404 and the bearing seal 406 are compressed, thereby sealing the inner side of the wheel 300*h*.

The seal assembly 400 prevents water and debris from entering within the hub 302 of the wheel 300*h* from the inner side thereof. This can extend life of the wheel 300*h*. In some embodiments, the life of the wheel 300*h* can be extended by about 13 times compared to conventional wheels. In some embodiments, the life of the wheel 300*h* can be extended by about 10 times. In some embodiments, the life of the wheel 300*h* can be extended by about 7 times. In some embodiments, the life of the wheel 300*h* can be extended by about 5 times. In some embodiments, the life of the wheel 300*h* can be extended by about 3 times. In some embodiments, the life of the wheel 300*h* can be extended by about 2 times.

Additionally the seal assembly 400 allows for easy cleaning of wheel 300*h*. Indeed, often times, track systems 20*c* and features thereof, including the wheel 300*h*, can get dirty. For instance, the wheel 300*h* can accumulate snow, mud, rocks and/or sand thereon. Cleaning the wheel 300*h* with a power washer is generally not recommended by manufacturers of conventional wheels, as water can infiltrate within the hub 302 and impact the bearings connecting the wheel 300*h* to the axle. The seal assembly 400 allows for cleaning the wheel 300*h* with a power washer, such that cleaning is facilitated.

Furthermore, track systems are often used in environments, where portions thereof are submerged in water, snow and/or mud. The seal assemblies 400 of the present technology are particularly useful in such environments to extend life of the wheels to which the seal assemblies 400 are connected.

In some embodiments, the hub 302 could have a lip partially overlapping the sealing cap 402, to further prevent debris from entering into the hub 302.

Figure 20:
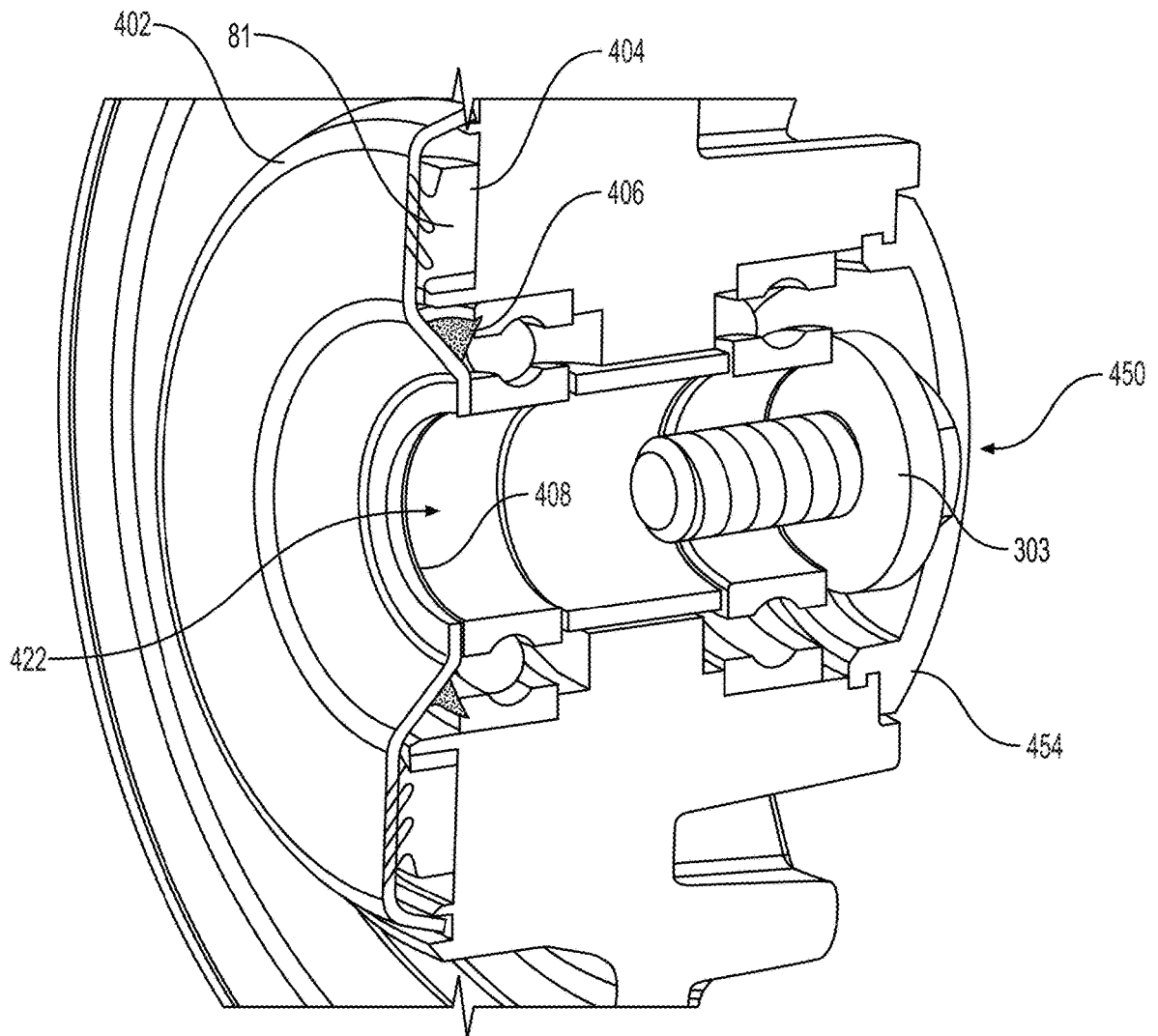
FIG. 20 is a perspective view of a cross-section of an alternative embodiment of a wheel assembly of the track systems of FIG. 1A.

Referring to FIG. 20, the seal assembly 400 used with a wheel without a sleeve 75 is shown. As the seal assembly 400 is similar, it will not be described in detail again.

Protective Cover Assembly

Referring to FIGS. 19A, 19B, 25A, 25B, 26A, 26B and 27, the protective cover assembly 450 will now be described in greater detail. As mentioned above, each one of the support and idler wheel assemblies 150*a*, 150*b*, 150*c*, 150*d*, 160*c*, 160*d* has the protective cover assembly 450 disposed opposite to the seal assembly 400. It is contemplated that in some embodiments, only some of the support and idler wheel assemblies 150*a*, 150*b*, 150*c*, 150*d*, 160*c*, 160*d* could have the protective cover assembly 450. As will be described below, the protective cover assembly 450 could also be connected to the drive wheel assembly 140 and/or the drive wheel assembly 40.

Figure 25A:
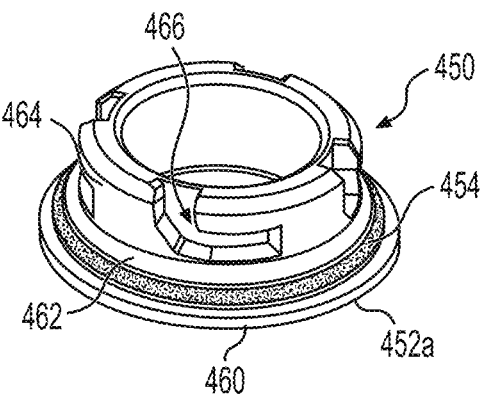
FIG. 25A is a perspective view taken from a top of an alternative embodiment of the protective assembly of FIG. 19A.
Figure 25B:
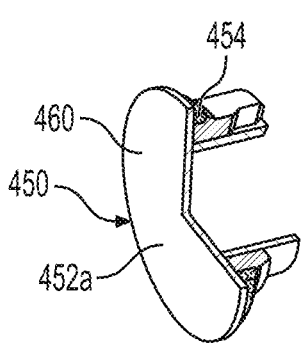
FIG. 25B is a perspective view taken from a front, top, right side of the protective assembly of FIG. 25A.

Referring to FIGS. 25A and 25B, a first embodiment of the protective cover assembly 450 includes an outer cap 452*a* and a sealing member 454. It is contemplated that in some embodiments, as will be described below, the protective cover assembly 450 could include additional members such as retaining members.

The outer cap 452*a* has an outer flange 460, a seal engaging portion 462 and a connecting portion 464.

The outer flange 460 is generally flat, and is configured and sized to surround the hub 302 of one of the wheels 300*a*, 300*b*, 300*c*, 300*d*, 300*e*, 300*f*, 300*g*, 300*h*. In other words, the outer flange 260 has a larger diameter larger than the diameter of the hub aperture 310. It is contemplated that in some embodiments, the outer flange 462 could adopt another shape than being flat (e.g., could be domed).

Extending generally perpendicularly from the outer flange 460, the seal engaging portion 462 is generally circular, and has a diameter smaller than the diameter of the outer flange 460. The seal engaging portion 462 is configured to engage with the sealing member 454. It is contemplated that in some embodiments, the seal engaging portion 462 could define a groove configured to retain the sealing member 454.

Figure 22A:
FIG. 22A is a close-up perspective view taken from a top, rear, right side of a portion of the track system of FIG. 7.
Figure 22B:
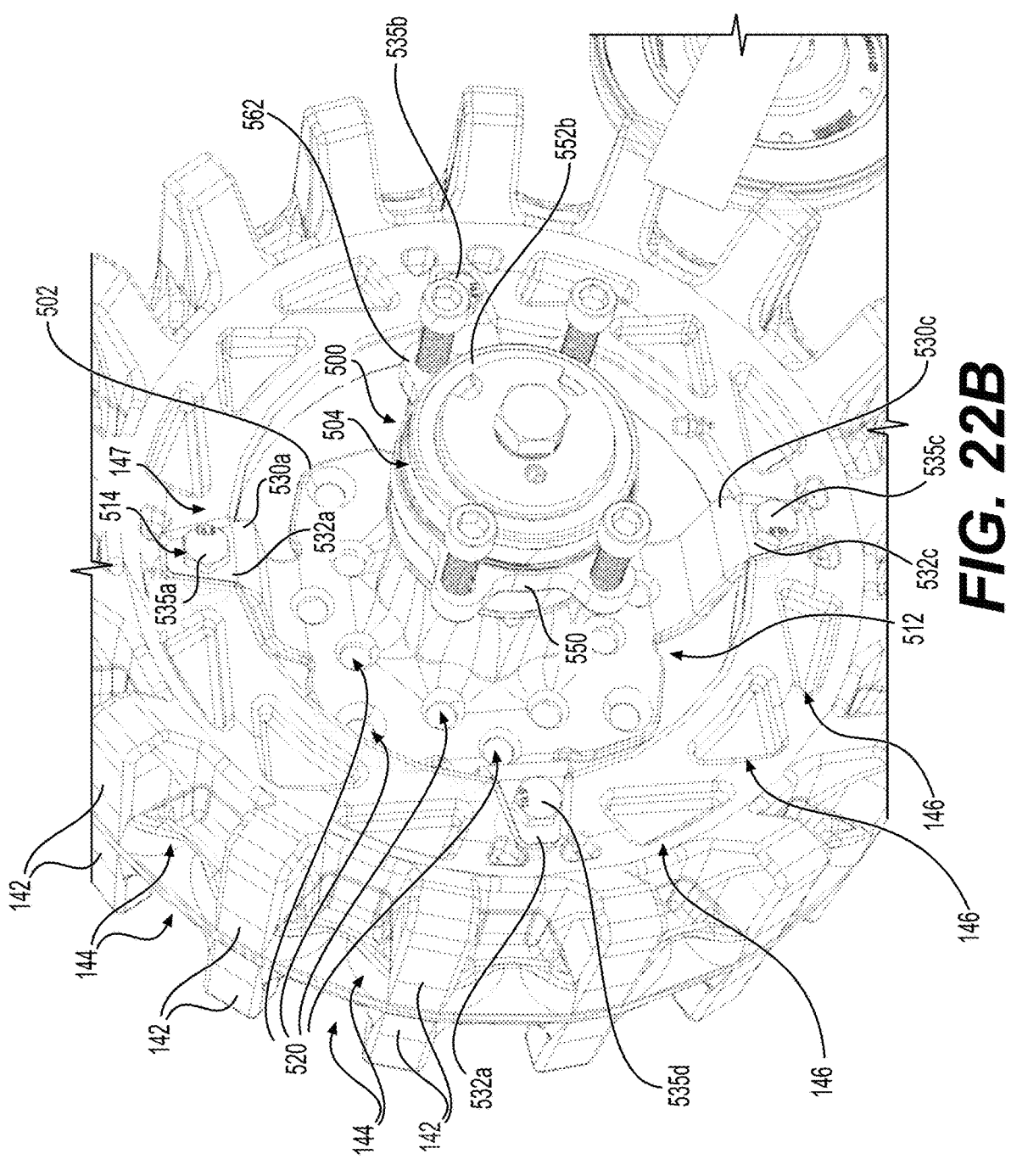
FIG. 22B is a close-up perspective view taken from a top, rear, right side of the drive wheel assembly of FIG. 21A and a mounting attachment according to the present technology.
Figure 34:
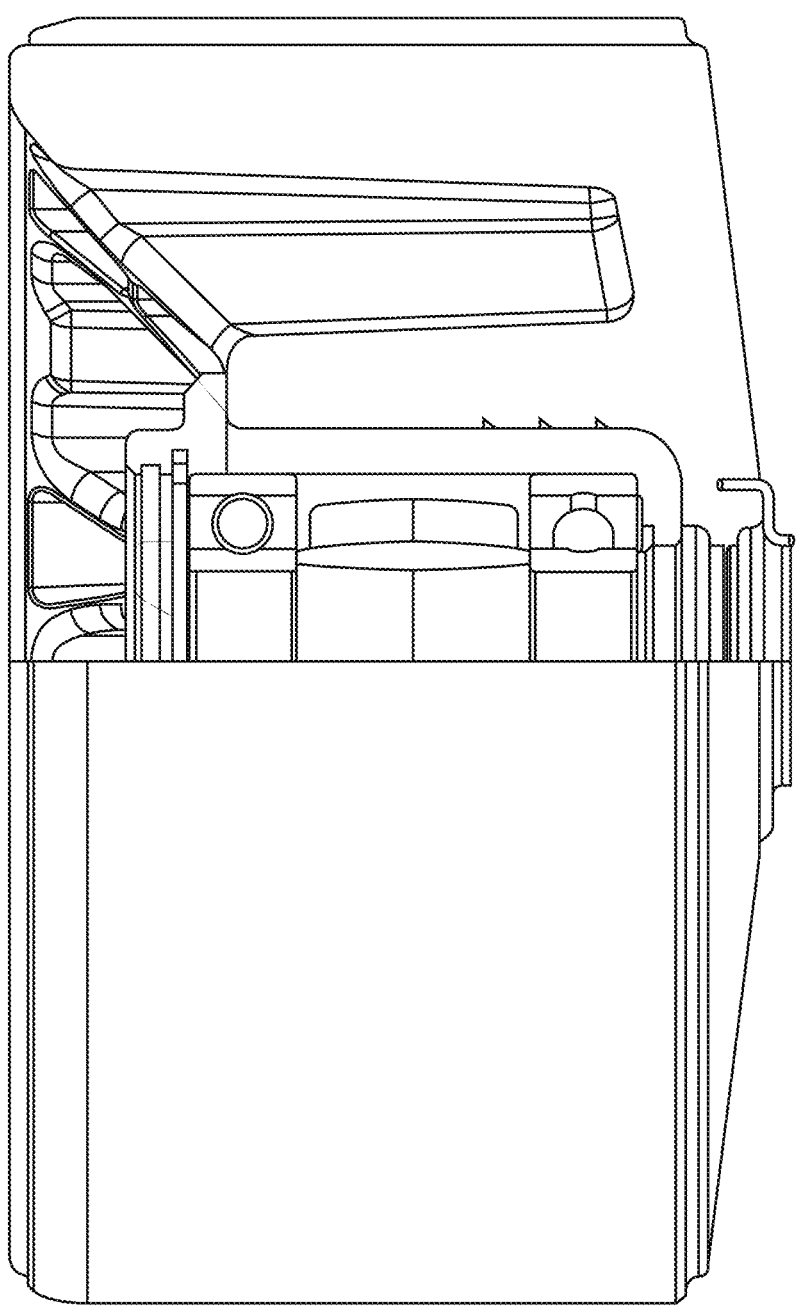
FIG. 34 is perspective view of a cross-section of a support wheel having a protective cover assembly according to another embodiment of the present technology.

Extending generally perpendicularly from the seal engaging portion 462, the connecting portion 464 is tubular and has a diameter smaller than the outer diameter of the flange 460 and the diameter of the seal engaging portion 462. More precisely, the connecting portion 464 is configured and sized to be received in the hub aperture 310. Being that the connecting portion 464 is tubular, the connecting portion is hollow, such that the connecting portion 462 is configured to, in some embodiments, as shown in FIG. 34, receive therein components such as bearings. In the embodiment shown in FIG. 34, the outer cap is integral with the wheel. Another example where this can occur is when the protective cover assembly is connected to the drive wheel assembly 140 (FIGS. 22A and 22B).

The connecting portion 462 defines a slot 466. The hub 302 of the wheel 300 has a connector (not shown) configured to be received in the slot 466 and thereby selectively lock the outer cap 452*a* relative to the hub 302 by a bayonet fastening connection when the connecting portion 362 is received in the hub aperture 310. The connecting portion 464 is thus configured to mechanically interlock the outer cap 452a to the hub 302. Other connecting and interlocking configurations are contemplated. For instance, in some embodiments, the slot could be defined in the hub 302 and the connector could be on the connecting portion 464.

To connect the protective cover assembly 450 according to the present embodiment to one of the wheels 300a, 300b, 300c, 300d, 300e, 300f, 300g, 300h, the sealing member 454, is connected to the outer cap 452a, and then the outer cap 452a is received in the hub aperture 310. The outer cap 452a is rotated until the connector of the hub 302 is received in the slot 466. When this occurs, the outer flange 462 simultaneously abuts the outer side (i.e., side opposite to the longitudinal center plane of the track system 20c) of the one of the wheel to which it is connected, thereby locking the outer cap 452a relative to the hub 302.

The sealing member 454, when compressed by connecting the outer cap 452 to the wheel 300, is configured to urge the outer cap 452 away from the wheel 300, thereby loading the connection between the connecting portion 464 and the hub 302. The sealing member 454 seals the outer side of the wheel to which its connected, and prevents water, debris, dust and other substances from entering the hub aperture 310. The outer cap 452a can selectively be disconnected from the hub 302.

Thus, according to the present technology, the connecting portion 464 is configured to mechanically interlock the outer cap 452a to the hub 302. In some embodiment, the outer cap 452a is made of plastic, such as nylon for example.

Figure 26A:
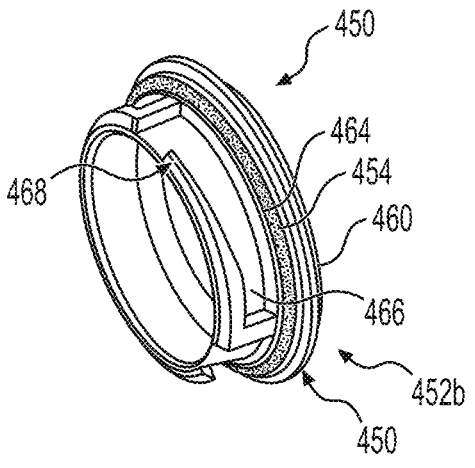
FIG. 26A is a perspective view taken from a rear, top, left side of an alternative embodiment of the protective assembly of FIG. 19A.
Figure 26B:
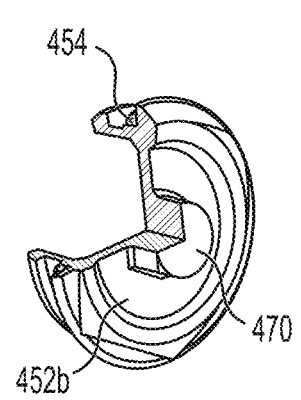
FIG. 26B is a perspective view taken from a rear, top, right side of the protective assembly of FIG. 26A.

Referring to FIGS. 26A and 26B, an alternative embodiment of the outer cap 452a, namely outer cap 452b, will be described. Features of the outer cap 452b similar to those of the outer cap 452a have been labeled with the same reference numerals and will not be described herewith again.

In this embodiment, the connecting portion 464 does not define the slot 466. Instead, the connecting portion 464 defines threads 468. In the present embodiment, the hub 302 defines threads (not shown) that are complementary to the threads 468 such that the outer cap 452b can be screwed to the hub 302. In some embodiments, the connecting portion 464 could define a ramp, and the hub 302 could define a connector complementary to the ramp.

Additionally, the outer cap 452b has an interface 470 that is engageable with a tool. In some embodiments, the interface 470 is configured to be manually engaged. The outer cap 452 can easily be screwed to the hub 302 thanks to the interface 470. In some embodiments, the outer cap 452b includes an outer member configured to engage the interface 470 and hide said interface. For instance, the outer member could define a recess configured to receive the interface 470 such that the outer member is connected to the outer cap 452b. The outer cap 452b can be unscrewed from the hub 302. It is understood that the interface 470 may be different, such as a recess configured to receive a tool, or configured to provide an effective grip for manual engagement.

Figure 27:
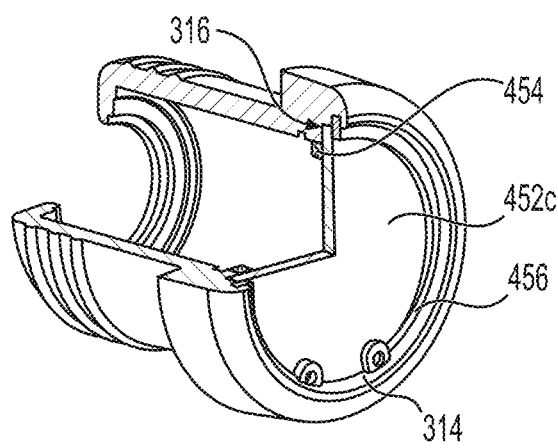
FIG. 27 is a perspective view taken from a rear, top, right side of an alternative embodiment of the protective assembly of FIG. 19A.

Referring to FIG. 27, an alternative embodiment of the outer caps 452a, 452b is shown, namely outer cap 454c. In this embodiment, the connecting portion 464 is omitted, and the protective cover assembly 450 further includes a retaining member 456. To connect to outer cap 454c to the hub 302, the sealing member 454 is connected to the outer cap 454c by the seal engaging portion 462, then the outer cap 454c and the sealing member 454 are received in the receiving portion 316 of the sleeve (i.e., in this embodiment, the sleeve and the protective seal assembly 450 have been combined). Then the retaining member 456 is received in the groove 314 to retain the protective cover assembly 450 in place. The retaining member 456 and the outer cap 452 can be resiliently deformed to disconnect from the hub 302. In this embodiment, the sleeve in which the outer cap 452b is received has lips 301 configured to engage with, and seal to, the wheel hub 302.

Turning back to FIGS. 19A and 19B, an alternative embodiment of the outer caps 452a, 452b, 452c namely 452d, is shown. Features of the outer cap 452d that are similar to those of the outer caps 452a, 452b, 452c have been labeled with the same reference numerals and will not be described in detail herewith.

The outer cap 452d is configured to connect to the hub 302 by a snap-fit action. More precisely, the outer cap 452d has an abutting portion 475 that is configured to engage a shoulder 312 of the hub 302, thereby locking the outer cap 452d to the hub 302. The outer cap 452d also has the seal engaging portion 462, which the sealing member 454 tightly surrounds. The outer cap 452 can be resiliently deformed to disconnect from the hub 302.

According to the present embodiment, the protective cover assembly 450 provides a seal to the wheel to which it is connected, while being selectively removable therefrom. As such, the protective cover assembly 450 according to the present technology allows for easy access components disposed within the hub 302.

In some embodiments, because the wheels are connected to the axle by the selectively connected fastener 303, the wheel itself can be replaced without required any specialized tools.

Additionally, the protective cover assembly 450 allows for easy cleaning of wheel 300 to which its connected. Indeed, often times, track systems 20c and features thereof, can get dirty. For instance, wheels can accumulate snow, mud, rocks and/or sand thereon. Cleaning these wheels with a power washer is generally not recommended by manufacturers of conventional wheels, as water can infiltrate within their hubs 302 and impact the bearings received therein. The protective cover assembly 450 allows for cleaning the wheels and other features of the track system 20c with a power washer, such that cleaning is facilitated. Visual inspection of some components (e.g. bearings) is also facilitated by selective removal of the protective cover assembly 450.

Furthermore, track systems are often used in environments where portions thereof are submerged in water, snow and/or mud. The protective cover assemblies 450 of the present technology are particularly useful in such environments to extend life of the bearings protected by the protective cover assemblies 450 are connected.

Drive Wheel

Figure 21A:
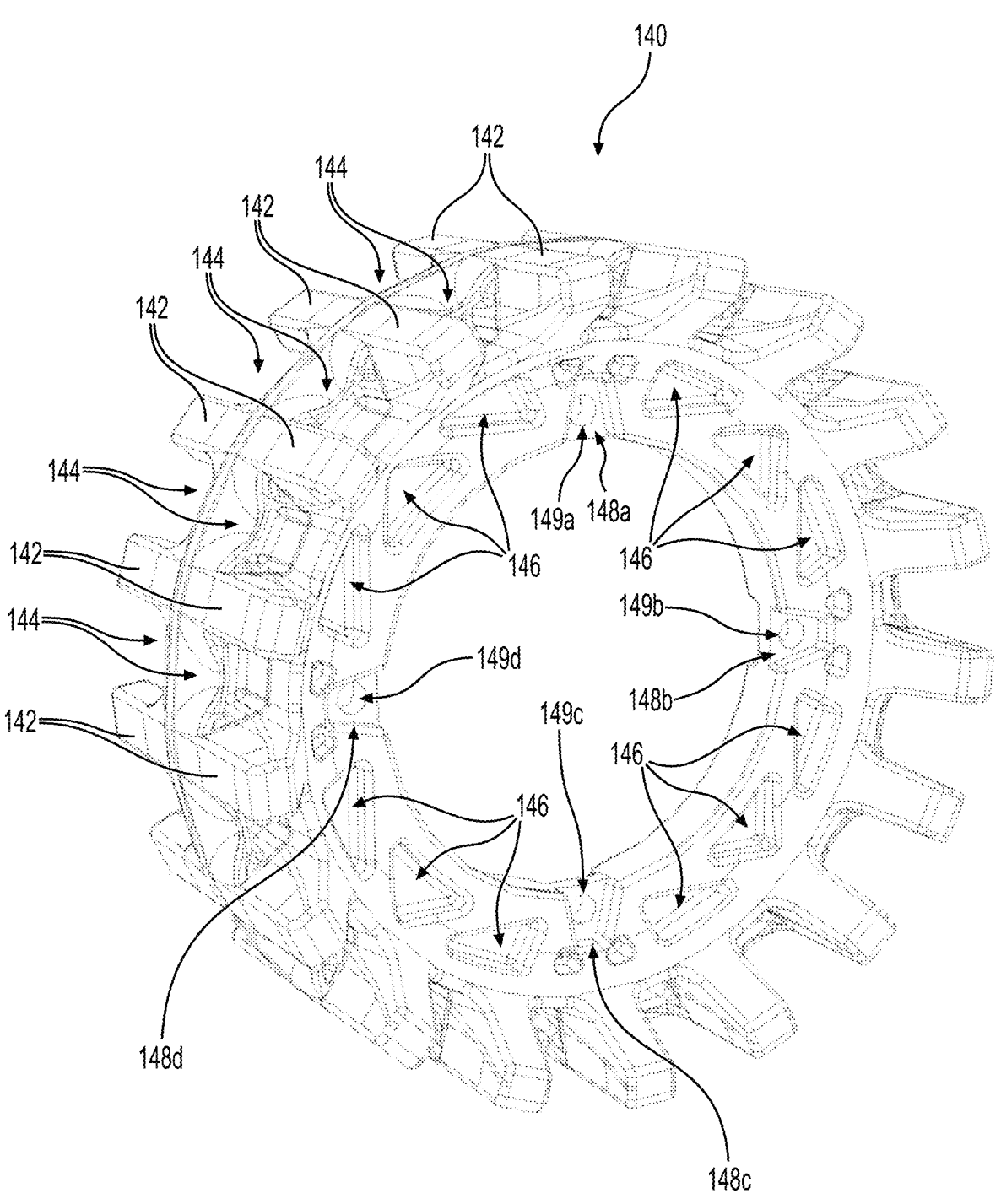
FIG. 21A is a perspective view taken from a rear, top, right side of a drive wheel assembly of the track systems of FIG. 1A.
Figure 21B:
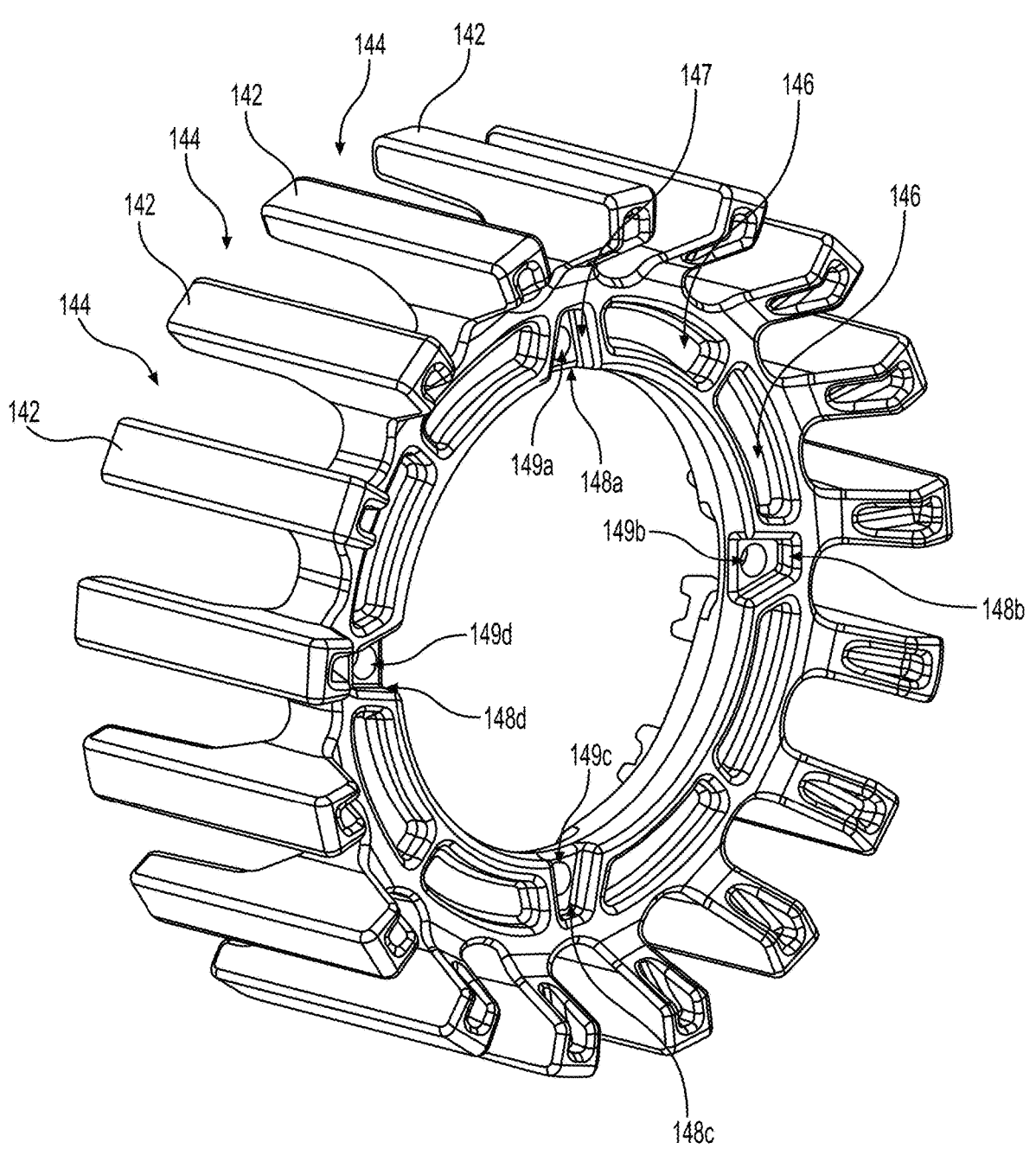
FIG. 21B is a further perspective view taken from a rear, top, right side of a drive wheel assembly of the track systems of FIG. 1A.

Referring particularly to FIGS. 1, 21A and 21B, the drive wheel assembly 140 will now be described in greater detail. Once again, it is understood that the features described with reference to the drive wheel assembly 140 can also apply to the drive wheel assembly 40. The drive wheel assembly 140, which is operatively connected to the rear axle 15b of the ATV 10, is rotatable about an axis of rotation 141 for driving the endless track 124. In this embodiment, the axis of rotation 141 is co-axial with the rear axle 15b. Thus, upon rotation of the rear axle 15b, the drive wheel assembly 140 rotates, which, in turn, engages with the lugs 610 of the endless track 124 to drive the track system 20c.

Figure 21C:
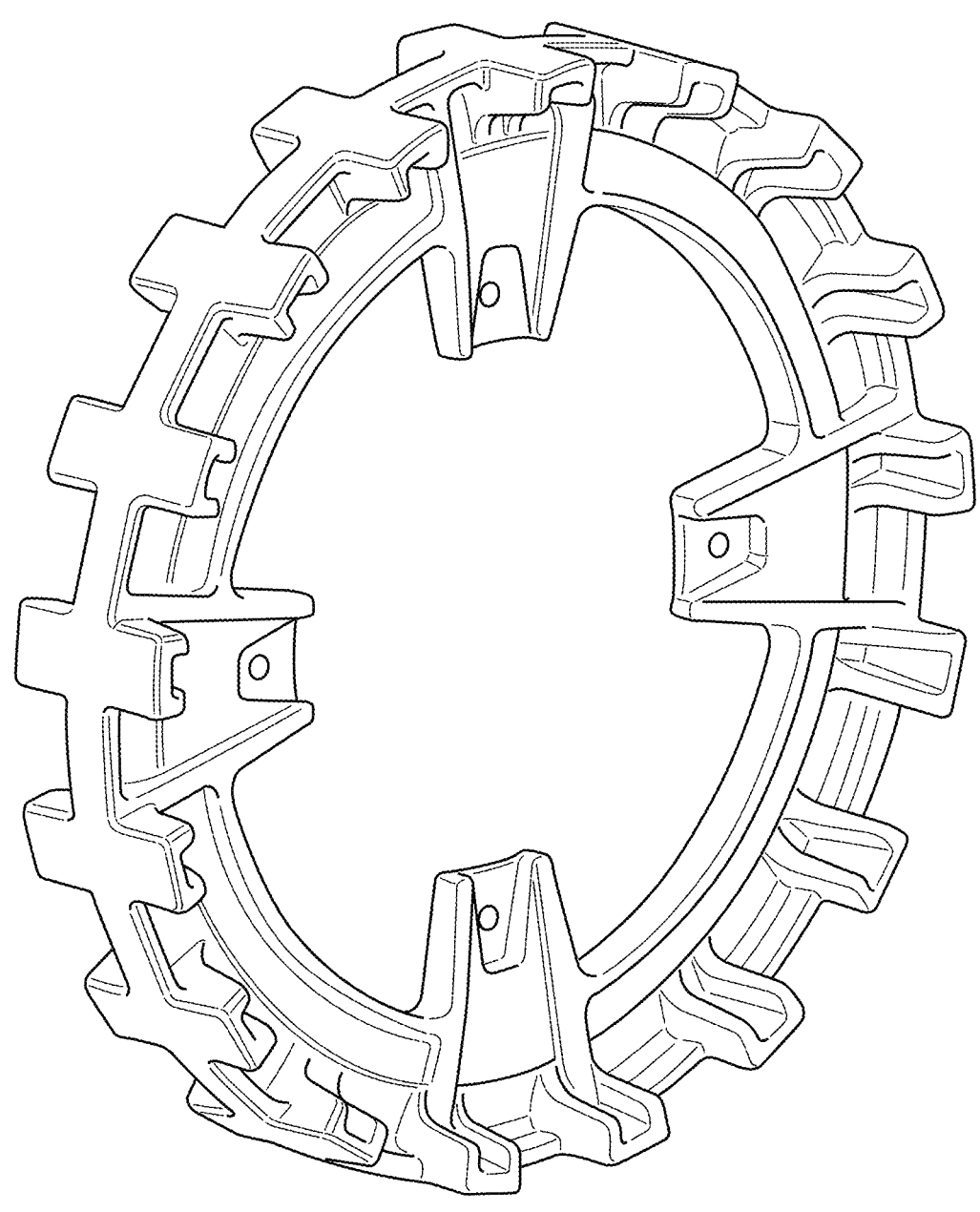
FIG. 21C is a is a perspective view taken from a rear, top, right side of a drive wheel assembly of the prior art.

The drive wheel assembly 140 includes a plurality of teeth 142 distributed circumferentially along a rim thereof. The teeth 142 extend laterally and are generally wider than conventional drive wheel assemblies of recreational vehicles (see FIG. 21C). As will be described below, this can help reduce stresses in the endless track 124. The drive wheel assembly 140 defines a plurality of recesses 144 configured to receive the lugs 610 of the endless track 124. Each one of the plurality of recesses 144 is defined between two adjacent teeth 142.

The drive wheel assembly 140 also defines cavities 146 on lateral sides thereof. The presence of the cavities 146 result in reducing the amount of material required to manufacture the drive wheel assembly 140 thereby reducing a weight of the drive wheel assembly 140. This can reduce costs for manufacturing the drive wheel assembly, and, to some extent, reduce energy consumption of the track system 20c. The cavities 146 change from the embodiment of the drive wheel assembly 140 shown in FIG. 21A to the embodiment of the drive wheel assembly 140 shown in FIG. 21B.

The drive wheel assembly 140 also has a connecting interface 147. The connecting interface 147 defines four recesses 148a, 148b, 148c, 148d and four apertures 149a, 149b, 149c, 149d. The apertures 149a, 149b, 149c, 149d are respectively defined within the four recesses 148a, 148b, 148c, 148d. The apertures 149a, 149b, 149c, 149d are configured to receive fasteners so that the drive wheel assembly 140 can connect to a mounting attachment 500, which will be described in greater detail below.

It is contemplated that in some embodiments, the drive wheel assembly 140 could be configured differently. For example, in embodiments where the endless track 124 defines recesses or apertures, the drive wheel assembly 140 could have radially extending teeth configured to be received in the recesses or apertures of the endless track 124. As yet another example, in some embodiments, the drive wheel assembly 140 could frictionally engage an inner side 600 of the endless track 124, thereby frictionally driving the endless track 124.

The drive wheel assembly 140 is made of polymeric material such as High Density Polyethylene (HDPE). In other embodiments, the drive wheel assembly 140 could be made of UHMW or UHMW-PE.

Mounting Attachment

Referring to FIGS. 22A, 22B, 23 and 24, the mounting attachment 500, which is configured to connect the track system 20c to the ATV 10, will now be described. More specifically, the mounting attachment 500 connects to the driving axle of the ATV 10 to which the track system 20c is operatively connected (rear axle 15b), to the frame 130 and to the drive wheel assembly 140.

The mounting attachment 500 includes a spindle 502 and a hub assembly 504. The mounting attachment 500 also includes a cover 580, which, as will be described below, could be replaced with the protective cover assembly 450 described hereabove. In some embodiments of the mounting attachment 500, the cover 580 could be omitted.

Figure 23:
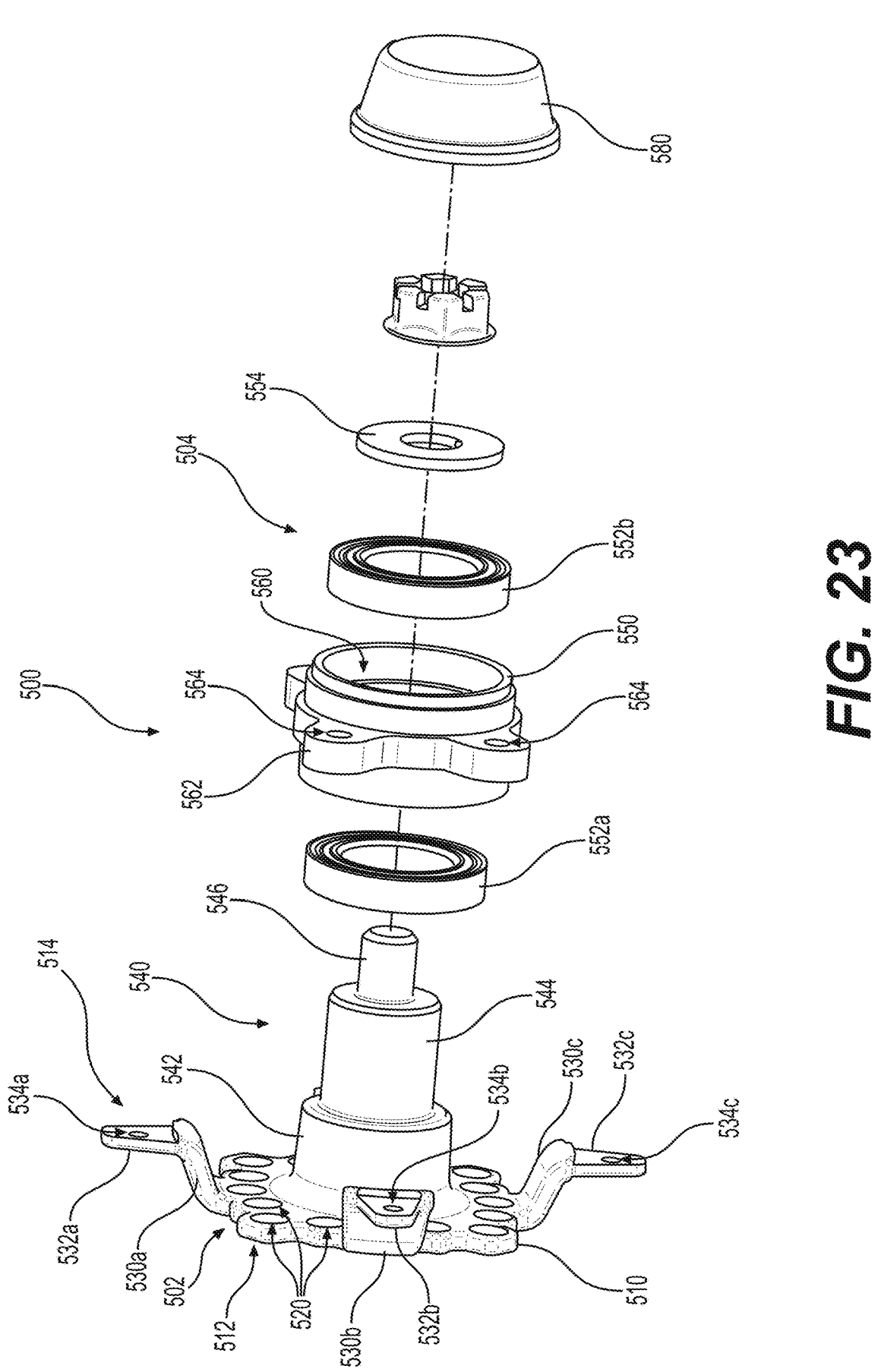
FIG. 23 is an exploded view of the mounting attachment of FIG. 22B.
Figure 24:
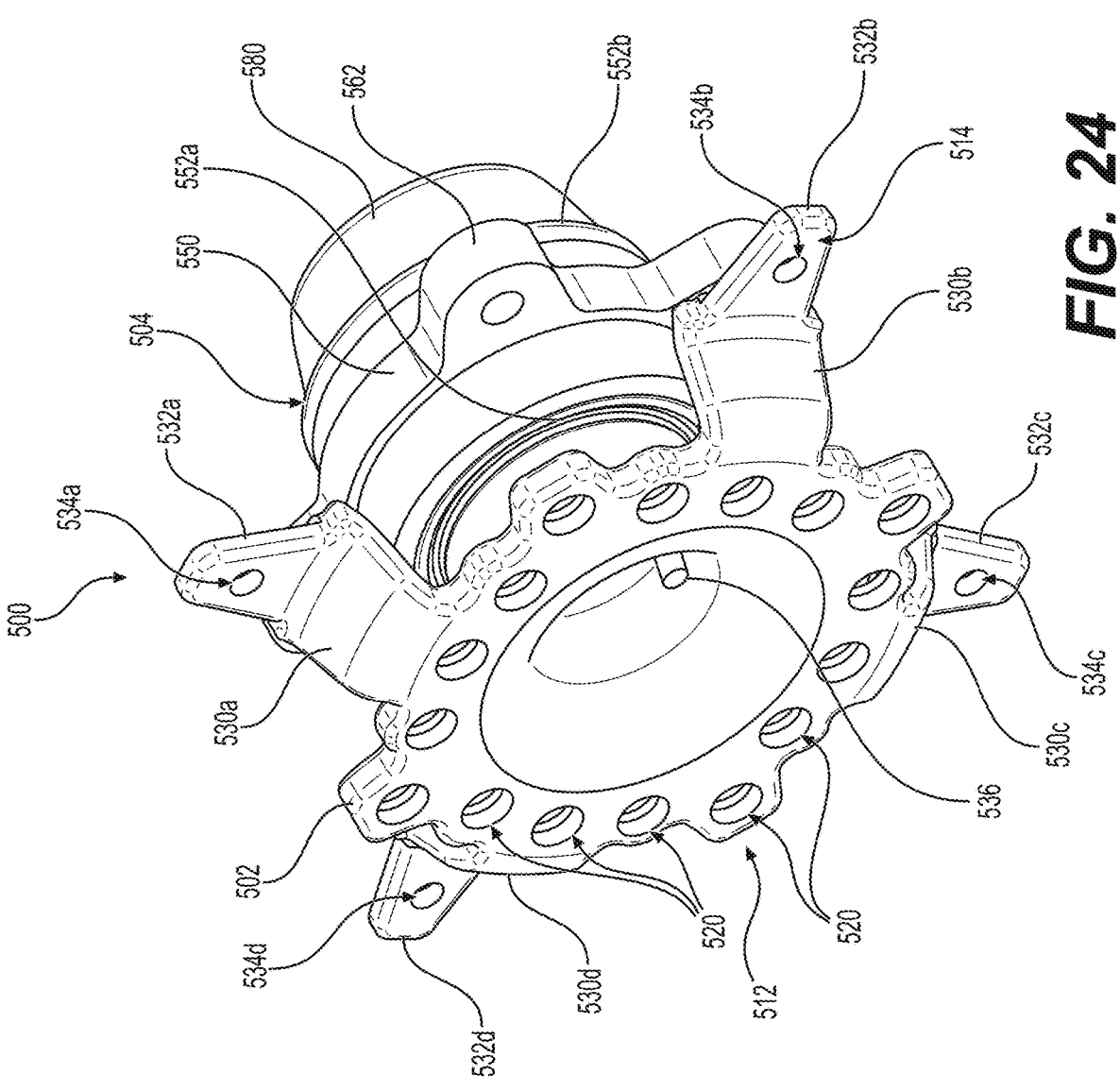
FIG. 24 is a perspective view taken from a top, rear, left side of the mounting attachment of FIG. 22B.

As best seen in FIGS. 23 and 24, the spindle 502 has a base portion 510 having a vehicle interface 512 and a driving wheel interface 514. The spindle 502 also has a shaft portion 540 that extends generally perpendicularly from the base portion 510.

The vehicle interface 512 defines a plurality of apertures 520 that are configured to receive fasteners therein. The vehicle interface 512 is configured to connect to a spindle (not shown) of the axle to which the drive wheel assembly 140 connects (i.e., rear axle 15b). The plurality of apertures 520 are disposed in such a way that the vehicle interface 512 is connectable to various spindles having different configurations. In other words, the vehicle interface 512 of the mounting attachment 500 enables a connection between the track system 20c and a variety of vehicles.

The driving wheel interface 514 includes four connecting members 530a, 530b, 530c, 530d that extend from the base portion 510 generally in the same direction as the shaft portion 550. The four connecting members 530a, 530b, 530c, 530d each have, respectively, a radially extending segment 532a, 532b, 532c, 532d. The radially extending segments 532a, 532b, 532c, 532d each define, respectively, an aperture 534a, 534b, 534c, 534d configured to receive a fastener therethrough. As will be described below, the driving wheel interface 514 is configured to engage with the connecting interface 147 of the drive wheel assembly 140. In some embodiments, the driving wheel interface 514 could have more or less connecting members, radially extending segments and apertures, so long as the driving wheel interface 514 of the spindle 502 is complementary to the connecting interface 147 of the drive wheel assembly 140.

The spindle 502 also includes a mechanical fitting 536 (shown in FIG. 24 and commonly referred to as "grease fitting", "grease zerk", "zerk fitting", "alemite fitting") to feed lubricant (e.g., grease) into the hub assembly 504 using a grease gun (not shown). The mechanical fitting 536 is strategically located to ease the maintenance of the mounting attachment 500. In the present embodiment, the mechanical fitting 536 is located on the internal side of the spindle 502. This can be advantageous for maintenance, as the mechanical fitting 536 is easily accessible without having to disassemble the mounting attachment 500 nor the hub assembly 504.

The shaft portion 540 is configured to be received in the hub assembly 504. The shaft portion 540 has a base section 542, an intermediate section 544 and a distal section 546. The base section 542 has a larger diameter than the diameter of the intermediate and that of the distal section 544, 546, and the intermediate section 544 has a larger diameter than the diameter of the distal section 546. It is contemplated that in some embodiments, the base, intermediate section and distal sections 542, 544, 546 could all have the same diameter. In the present embodiment, the change in diameter from one section to another can help to position the hub assembly 504 and features thereof.

The hub assembly 504 includes a hub housing 550, bearings 552a, 552b and a sealing member 554. In some embodiments, there could be only one bearing or three or more bearings. In other embodiments, there could be two or more sealing members.

The hub housing 550 defines an aperture 560 configured to receive the bearings 552a, 552b and the sealing member 554 therein. The hub housing 550 has a frame interface 562 that is configured to connect to the frame 130. More precisely, the frame interface 562 defines four apertures 564 configured to receive fasteners therein. It is contemplated that in other embodiments, the frame interface 562 could define more or less than four apertures so long as the frame interface 562 is connectable to the frame 130.

In some embodiments, the hub assembly 504 is a standalone assembly which includes the hub housing 550 having the frame interface 562, the two bearing 552a, 552b and the sealing member 554. It is contemplated that in some embodiments, there could be only one bearing and/or there could be more than one sealing member. In some embodiments, the hub assembly 504 is a standard automotive hub assembly, and other features of the mounting attachment 500 are configured, shaped, and sized to operatively connect with the hub assembly 504. Standard automotive hub assemblies are typically thoroughly tested, optimized and produced in high volume such that they are generally less costly while being durable. Using standard parts can thus reduce costs of the mounting attachment 500.

As shown in FIGS. 23 and 24, the mounting attachment 500 also includes the protective cover 580 which is configured to cover the side opposite to the spindle 502 to prevent dust and debris from entering the hub assembly 504. In some embodiments, the protective cover 580 could be omitted, as the frame 130 acts as a protective cover for the hub assembly 504, covering the hub assembly 504 from the side opposite to the spindle member 502 and sealing it from dust and debris via a resilient sealing member such as an O-ring or a gasket disposed between the frame 130 and the hub assembly 504. It is understood that in some embodiments, the protective cover 580 may be one of the embodiments of protective cover 450, or may comprise some features of said embodiments.

Referring to FIGS. 22A and 22B, a method for operatively connecting the drive wheel assembly 140, the mounting attachment 500 and the frame 130 will now be briefly described.

The method includes connecting the hub assembly 504 to the spindle 502.

The method also includes connecting the mounting attachment 500 to the spindle of the rear axle 15b. This can be done by the vehicle interface 512. More precisely, fasteners are received through the apertures 520 and are connected to the spindle of the rear axle 15b.

The method also includes connecting the mounting attachment 500 to the drive wheel assembly 140. The connecting interface 147 of the drive wheel assembly 140 engages with the drive wheel interface 514 of the spindle 502 of the mounting attachment 500. More precisely, the radially extending segments 532a, 532b, 532c, 532d are respectively received in the recesses 148a, 148b, 148c, 148d, and fasteners 535a, 535b, 535c, 535d are respectively received in the apertures 149a, 149b, 149c, 149d of the drive wheel assembly 140 as well as respectively received in the apertures 534a, 534b, 534c, 534d. Thus, the mounting attachment 550 is removably connected to the drive wheel assembly 140. It is contemplated that in some embodiments, the mounting attachment 500 could not be removably connected to the frame 130. For instance, the mounting attachment 500 could be welded to the drive wheel assembly 140, or could be integral with the drive wheel assembly 140, but the hub assembly 504 could still be removably connected to the spindle 502.

The method also includes connecting the mounting attachment 500 to the frame 130. The mounting interface 562 of the hub housing 550 is connected to the frame 130. More precisely, fasteners 565a, 565b, 565c, 565d are received through the apertures 564 of the mounting interface 562 and through aperture defined in the frame (not shown) thereby connecting the mounting attachment to the frame 130. Thus, the mounting attachment 550 is removably connected to the frame 130. In some embodiments, the mounting attachment 500 could not be removably connected to the frame 130.

The method also includes applying tension in the endless track 124 using the tensioner 170.

It is understood that the steps of the above method can be generally be performed in various orders and could include more or less steps.

Being that the hub assembly 504 is removably connected to the spindle 502, maintenance operations of the hub assembly 504 are facilitated, because when required, the hub assembly 504 can easily be removed from the mounting attachment 500, which can also easily be removed from the frame 130. As such, maintenance operations of the mounting attachment 500 according to the present technology are easier than when compared with conventional hub assemblies that are forced fitted into a cavity of a frame of a track system.

A method for removing the hub assembly 504 from the mounting attachment 500 will now be briefly described.

The method includes loosening tension in the endless track 124 using the tensioner 170.

The method includes disconnecting the mounting attachment 500 from the frame 130. More precisely, the mounting interface 562 of the hub housing 550 is disconnected from the frame 130 by removing the fasteners 565a, 565b, 565c, 565d from the apertures 564 of the mounting interface 562 and the apertures defined in the frame.

The method also includes disconnecting the mounting attachment 500 from the driving wheel assembly 140. More precisely, the fasteners 535a, 535b, 535c, 535d are removed from the apertures 149a, 149b, 149c, 149d of the drive wheel assembly 140 and the apertures 534a, 534b, 534c, 534d of the spindle 502.

The method also includes disconnecting the hub assembly 504 from the spindle 502.

It is understood that the steps of the above method can be generally be performed in various orders and could include more or less steps. For instance, steps regarding alignment of the frame 130 relative to the hub assembly 504 and alignment of the track 124 relative to the frame 130.
Endless Track Referring to FIGS. 28 to 31, 32A, 32B and 33, the endless track 124 will now be described in greater detail. The endless track 124 includes an inner side 600 and an outer side 602 opposite the inner side 600.

The inner side 600 faces the support wheel assemblies 150a, 150b, 150c, 150d, the front and rear idler wheel assemblies 160a, 160b and the drive wheel assembly 140.

The endless track 124 has, extending from the inner side 600, a plurality of lugs 610. The lugs 610 are longitudinally spaced and are arranged in a single row that is substantially centered along the widthwise direction of the endless track 124. The lugs 610 could be arranged differently in other embodiments. For instance, there could be two laterally spaced sets of longitudinally spaced lugs 610. The lugs 610 are configured to engage with the teeth 142 of the drive wheel assembly 140 to drive the endless track 124 (i.e., transmit motion from the drive wheel assembly 140 to the endless track 124, and thus the track system 20c). The lugs 610 are also configured to engage with the support wheel assemblies 150a, 150b, 150c, 150d and the front and rear idler wheel assemblies 160a, 160b to guide the endless track 124. As such, the lugs 610 can be referred to as "driving projections and/or guiding projections". Thus, each of the lugs 610 is configured to do at least one of: driving the endless track 124 and guiding the endless track 124.

Figure 30:
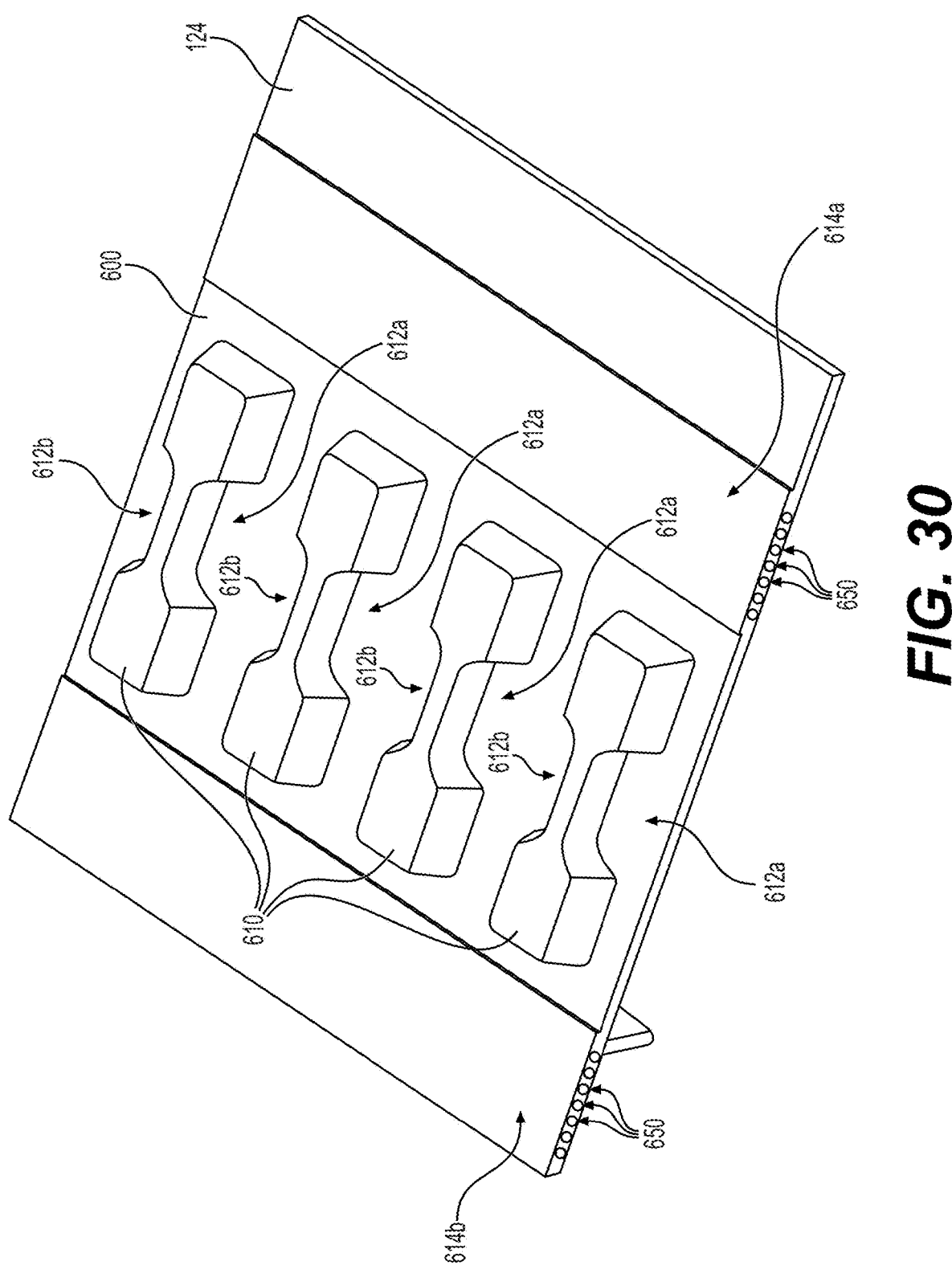
FIG. 30 is a close-up of an inner side of the endless track of FIG. 28.

In the embodiment shown in FIG. 30, each of the lugs 610 defines front and rear recesses 612a, 612b. The front and rear recesses 612a, 612b are configured to reduce material required to manufacture the endless track 124 and thus optimize manufacturing costs. In addition to the front and rear recesses 612, 612b, other weight relief features such as cut-outs, pockets, cavities, and/or apertures could be present in the lugs 610 It is understood that other configurations of the endless track 124 are considered as well. For example, only some lugs 610 could have the front and rear recesses, and/or only some lugs 610 could have the weight relief features.

On either side of lugs 610, the inner side 600 has wheel path 614a and wheel path 614b, on which the left and right wheels of the support and idler wheel assemblies 150a, 150b, 150c, 150d, 160c, 160d respectively roll. Each of the wheel paths 614a, 614b extend adjacent to the lugs 610.

Figure 28:
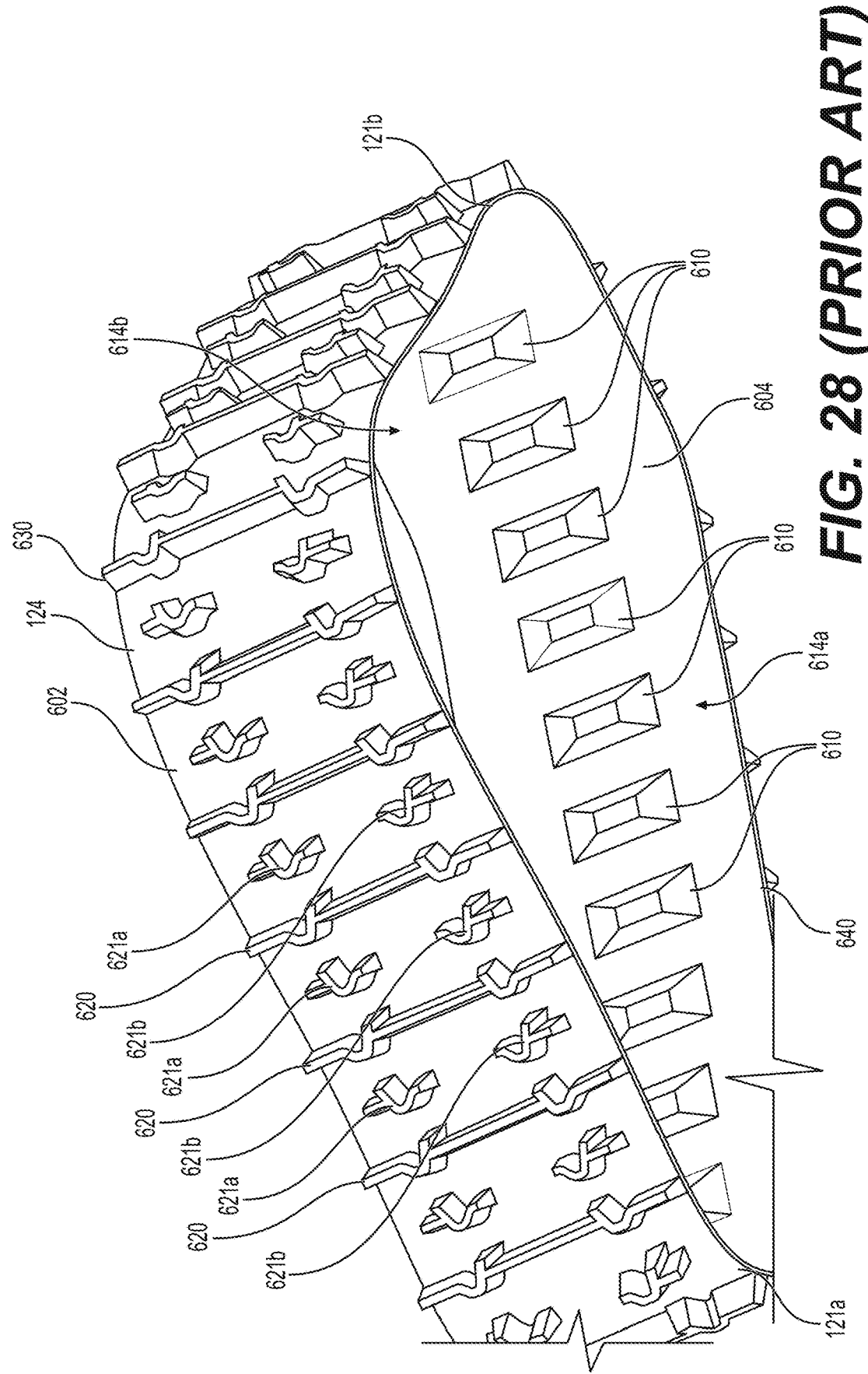
FIG. 28 is a perspective view taken from a front, top, left side of an endless track of the track systems of FIG. 1A in accordance of an embodiment of the present technology.
Figure 29:
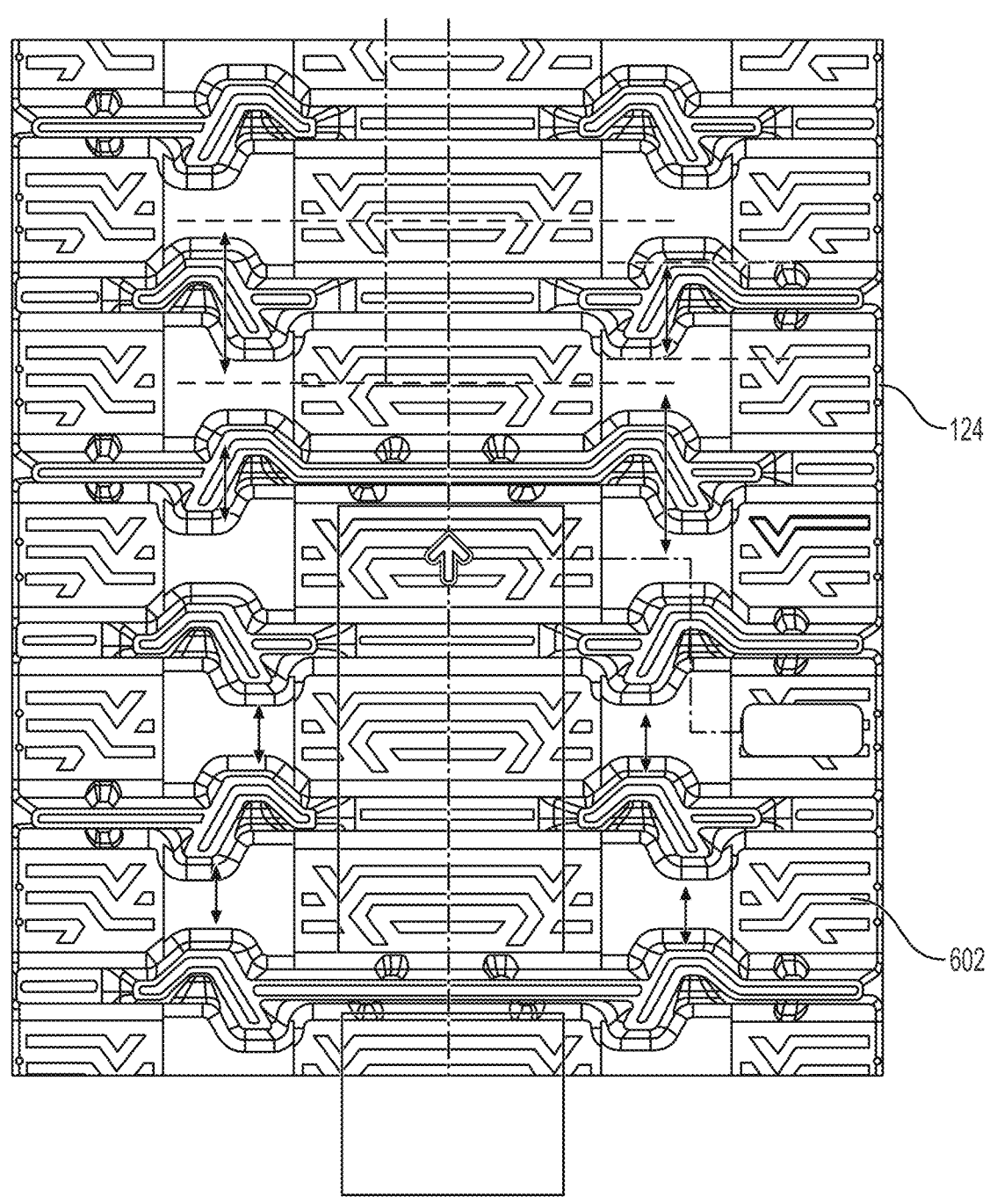
FIG. 29 is a close-up of an outer side of the endless track of FIG. 28.

Referring to FIGS. 28 and 29, the outer side 602 of the endless track 124, which is configured to engage the ground, includes a plurality of traction projections 620 and a plurality of traction projection 621a, 621b. The traction projections 620, 621a, 621b extend from the outer side 602. The traction projections 620, 621a, 621b, which can be referred to as "traction lugs", are configured to engage the ground to enhance traction. Thus, in some instances, the traction projections 620, 621a, 621b could be configured to penetrate the ground to enhance traction. As will be described below, the size, the shape, and the pattern of the traction projections 620, 621a, 621b according to the present endless track 124, have been optimized for enhanced traction. It is understood however that the present embodiment is only an example, and other configurations are contemplated without departing from the scope of the present technology.

The traction projections 620 are longitudinally spaced and extend in the widthwise direction of the endless track 124. The traction projections 621a, 621b are disposed between two longitudinally spaced traction projections 620. The traction projections 621a, 621b are laterally spaced. Being that the traction projections 621a, 621b are laterally spaced, a distance between a center of two adjacent traction 620 is twice the pitch of the traction projections 620, 621a, 621b, which can enhance traction. Indeed, the longer a "snow bloc" is, the more shear area it is possible to obtain, such that a longer snow bloc has more shear than a shorter snow bloc of the same depth, provided that both snow blocs are sufficiently deep. Additionally, as shown in FIGS. 28 and 29 (prior art), the tractions projections 620, 621a, 621b are asymmetrical from a center plane of the endless track 124, where the center plane extends in the longitudinal direction. This asymmetry can help reduces chances of the track system 20c from getting stuck.

Figure 32:
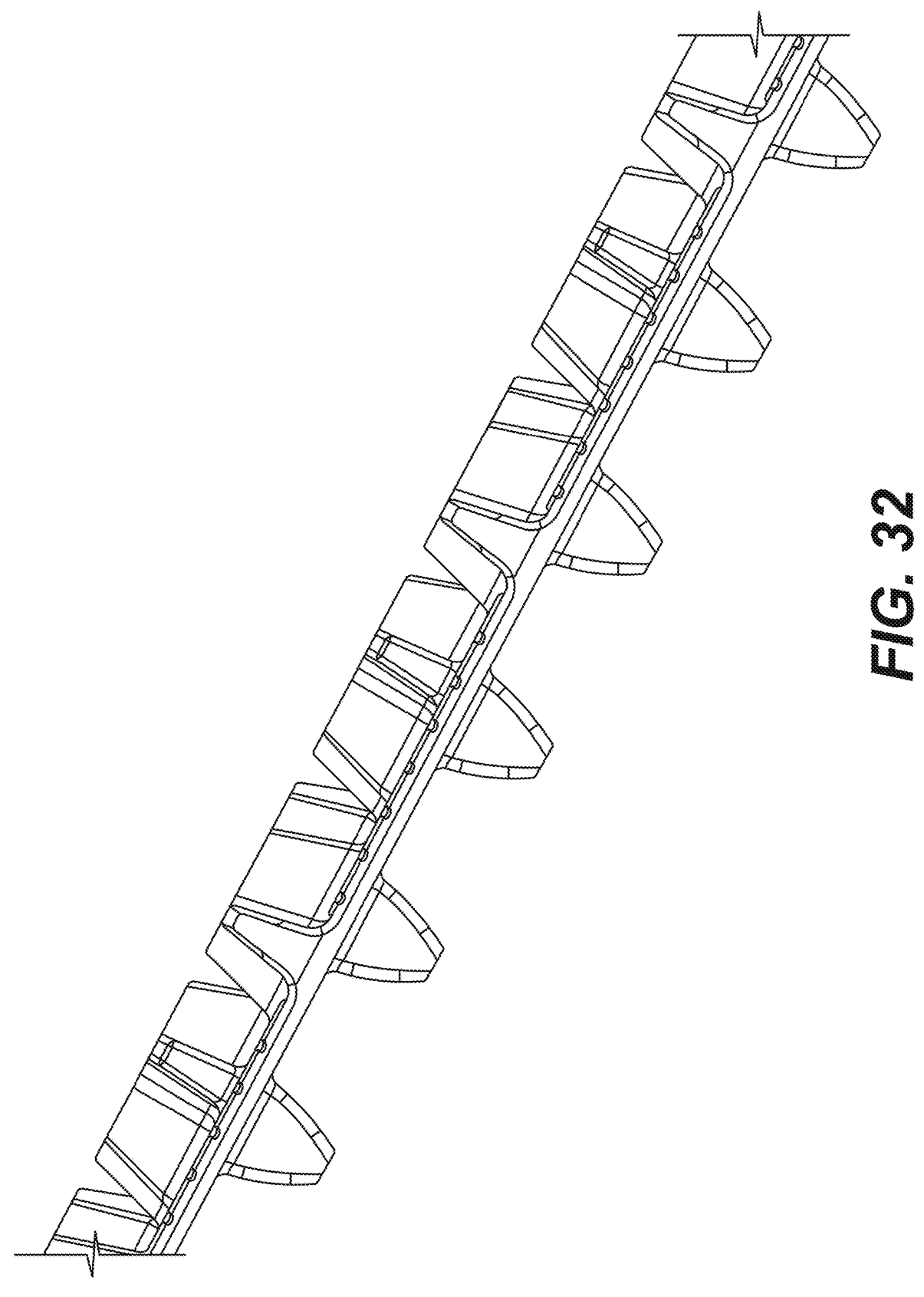
FIG. 32 is a left side elevation view of a portion of the endless track of FIG. 28.
Figure 33:
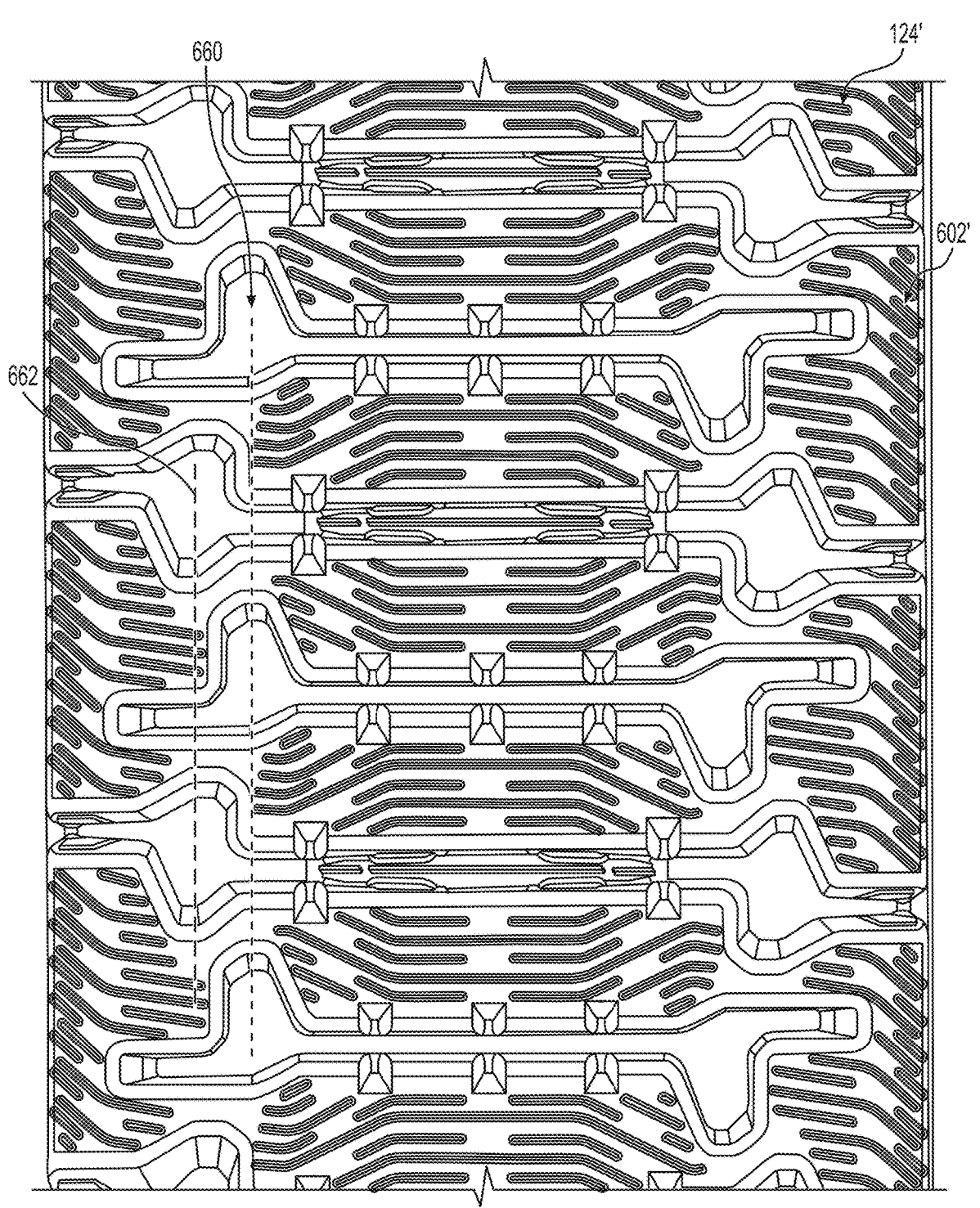
FIG. 33 is a close-up of an outer side of an alternative embodiment of the endless track of FIG. 28.

Referring to FIGS. 32 and 33, an alternative embodiment of the endless track 124 is shown, namely endless track 124'. Features of the endless track 124' similar to those of the endless track 124 have been labeled with the same reference numerals and will not be described again. More specifically, the inner side 600 of the endless track 124' is the same as the inner side 600' of the endless track 124.

Turning back to FIG. 30 and the endless track 124, between the inner and outer sides 600, 602, the endless track 124 is free of laterally extending reinforcing members, but does have longitudinal cables 650 (shown in FIG. 30) extending therethrough. The longitudinal cables 650 are disposed below the wheel paths 614a, 614b.

The endless track 124 has a top run 630 which extends between the front longitudinal end 121a and the rear longitudinal end 121b of the track system 20c, over the drive wheel assembly 140, and a bottom run 640 which extends between the front longitudinal end 121a and the rear longitudinal end 121b of the track system 20c, under the front and rear idler wheel assemblies 160a, 160b. The bottom run 640 of the endless track 124 defines an area of contact of the endless track 124 with the ground. As mentioned above, the area of contact bears a majority of a load sustained by the track system 20c. The area of contact is sometimes referred to as a "contact patch" of the endless track 124 with the ground.

The endless track 124 is elastomeric in that the endless track 124 includes elastomeric material allowing the endless track 124 to flex around the support wheel assemblies 150a, 150b, 150c, 150d, the front and rear idler wheel assemblies 160a, 160b and the drive wheel assembly 140. The elastomeric material of the endless track 124 can include any polymeric material with suitable elasticity. In the present embodiment, the elastomeric material includes rubber. Each of the lugs 610 is an elastomeric in that each of the lugs 610 includes elastomeric material. In the present embodiment, each of the traction projections 620 is an elastomeric traction projection in that the each of the traction projections 620 includes elastomeric material.

Figure 31A:
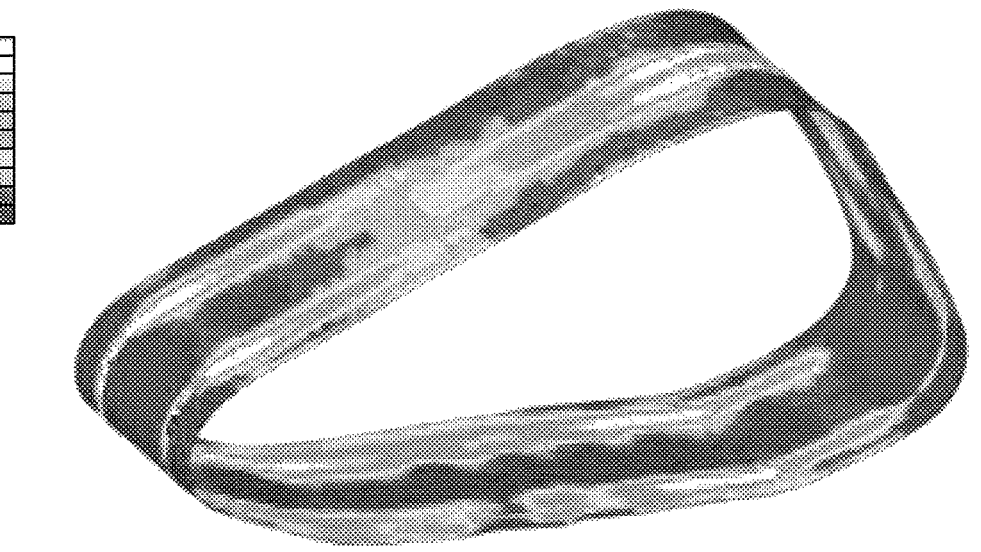
FIG. 31A is a perspective view taken from a front, top, left side of an endless track engaging with a drive wheel according to the prior art, with stresses present within the endless track being shown.
Figure 31B:
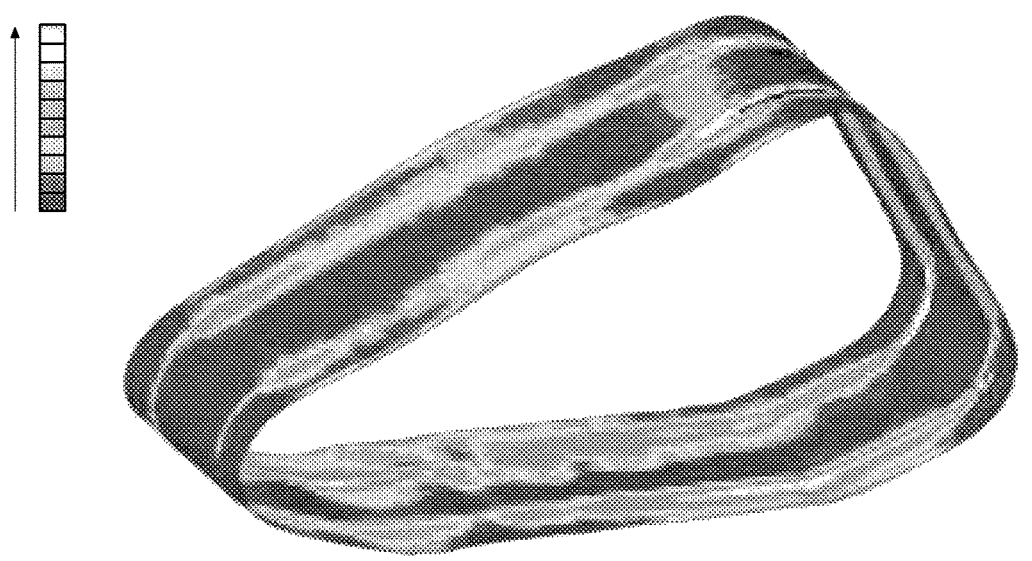
FIG. 31B is a perspective view taken from a front, top, left side of the endless track of FIG. 28, with stresses present within the endless track being shown.

As mentioned above, the drive wheel assembly 140 has teeth that are wider than conventional drive wheel assemblies. This, as shown in FIGS. 31A and 31B, result in reducing stresses within the endless track 124. FIG. 31A shows stresses within an endless track used with a narrow drive wheel assembly whereas FIG. 31B shows stresses within an endless track used with the drive wheel assembly 140 according to the present technology.

Referring to FIG. 31A, with conventional drive wheel assemblies having narrower teeth, endless tracks are subject to important shear stresses, which results in wear and tear. Indeed, during use with narrower wheel assemblies, when the endless track is under tension, wheel assemblies having laterally spaced wheels apply loads on the sides of the endless track (i.e., wheel paths 164a, 164b). Thus, the wheel assemblies apply tensile forces along a length of the endless track 124 (i.e., along wheel paths 164a, 164b), whereas traction forces applied by teeth of a drive wheel assembly are generally disposed centrally along the endless track 124, thereby causing shear stresses.

Referring to FIG. 31B, according to the present technology, shear stresses in the endless track 124 are substantially reduced. This is because the traction forces applied by the wider teeth 142 of the drive wheel assembly 140 are aligned with the tensile forces applied by the support and idler wheel assemblies 150a, 150b, 150c, 150d, 160a, 160b, thereby reducing shear stresses within the endless track.

This configuration of the endless track 124 and the teeth 142 of the drive wheel assembly 140 is new in track systems in the recreational sector, as the traction required for recreational vehicles is much less than traction required for heavier vehicles like harvesters. There are various advantages to the present technology.

Referring to FIG. 33, the endless track 124' has different inertias when folding and unfolding, because the idler wheels are narrower, so they are not bending as much rubber as the larger wheels. Thus, stress is reduced in the endless track 124 by having the narrower wheels. The wide wheels are bending a large section. The narrow wheels are bending a narrow section such that everything outside this section is bent approximately 90% of the real curve, reducing stress compared to wide wheel.

Modifications and improvements to the above-described embodiments of the present invention may become apparent to those skilled in the art. The foregoing description is intended to be exemplary rather than limiting. The scope of the present invention is therefore intended to be limited solely by the appended claims.

The invention claimed is:

1. A protective cover assembly connectable to a wheel of a track system, the wheel having a hub defining a hub aperture, the protective cover assembly comprising:

an outer cap received in the hub aperture for obstructing the hub aperture and for covering an end of a shaft disposed in the hub aperture, the outer cap comprising:

a flange configured to obstruct the hub aperture; and a connecting portion extending from the flange, the connecting portion configured to be at least partially received in the hub aperture, the connecting portion having a first connector; and a sealing member configured to sealingly connect the outer cap to the wheel;

wherein the hub has a second connector selectively connectable to the first connector; and wherein in response to the first and second connectors being connected, the outer cap being secured relative to the hub.

2. The protective cover assembly of claim 1, wherein the protective cover assembly is selectively connectable to the wheel of the track system.

3. The protective cover assembly of claim 1, wherein the first connector has an interlocking feature complementary to an interlocking feature of the hub, for interlocking the outer cap with the hub.

4. The protective cover assembly of claim 1, wherein a connecting portion of the outer cap is configured to receive a wheel axle and at least one bearing assembly.

5. The protective cover assembly of claim 1, further comprising a retaining member configured to be received in the hub aperture, the retaining member retaining the outer cap and the sealing member in the hub aperture.

\* \* \* \* \*